US012488398B1

(12) United States Patent
Yoder et al.

(10) Patent No.: US 12,488,398 B1
(45) Date of Patent: Dec. 2, 2025

(54) SYSTEMS AND METHODS FOR CUSTOM AND REAL-TIME VISUALIZATION, COMPARISON AND ANALYSIS OF INSURANCE AND REINSURANCE STRUCTURES

(71) Applicant: Lockton Re, LLC, Kansas City, MO (US)

(72) Inventors: Claude David Yoder, Newtown, CT (US); David Robert Lytz, Avondale, PA (US); Adam James Troyer, Chicago, IL (US); Adam Joseph Braithwaite, Huntington, NY (US)

(73) Assignee: Lockton Re, LLC, Kansas City, MO (US)

( * ) Notice: Subject to any disclaimer, the term of this patent is extended or adjusted under 35 U.S.C. 154(b) by 0 days.

(21) Appl. No.: 18/650,531

(22) Filed: Apr. 30, 2024

Related U.S. Application Data

(63) Continuation of application No. 18/241,579, filed on Sep. 1, 2023, now Pat. No. 12,020,333, which is a continuation of application No. 17/545,836, filed on Dec. 8, 2021, now Pat. No. 11,783,427.

(60) Provisional application No. 63/122,807, filed on Dec. 8, 2020.

(51) Int. Cl.
*G06Q 40/08* (2012.01)
*G06Q 30/0201* (2023.01)

(52) U.S. Cl.
CPC ......... *G06Q 40/08* (2013.01); *G06Q 30/0201* (2013.01); *G06Q 2220/10* (2013.01)

(58) Field of Classification Search
CPC ...................................................... G06Q 40/08
USPC ............................................................. 705/4
See application file for complete search history.

(56) References Cited

U.S. PATENT DOCUMENTS

| | | | |
|---|---|---|---|
| 5,956,691 | A | 9/1999 | Powers |
| 10,002,392 | B2 | 6/2018 | Sweeney et al. |
| 11,783,427 | B1 | 10/2023 | Yoder et al. |
| 12,020,333 | B1 | 6/2024 | Yoder et al. |

(Continued)

OTHER PUBLICATIONS

Koi, Chang H. et al. "Interactive Visualization of Healthcare Data Using Tableau", Healthc Inform Res. 2017, Oct.; 23(4):349-354.

(Continued)

*Primary Examiner* — Cho Yiu Kwong
(74) *Attorney, Agent, or Firm* — Nyemaster Goode P.C.

(57) ABSTRACT

Computing systems and methods of visually creating and visually analyzing proposed insurance or reinsurance constructs by providing an overall insurance or reinsurance structure creation and analysis system that includes an insurance/reinsurance visual design structure interface displayed to a user on a design construction user interface display presented to a user via a display of a user computing device having a user input device and the display having a plurality of coverage layer types visually illustrated on the design construction user interface display outside of a graphical diagram. The graphic diagram depicts at least one rectangular-shaped coverage structure layer that creates a proposed insurance or reinsurance construct and corresponds to one of the plurality of coverage layer types visually illustrated on the design construction user interface display outside of the graphical diagram.

20 Claims, 53 Drawing Sheets

(56) References Cited

U.S. PATENT DOCUMENTS

| | | | | |
|---|---|---|---|---|
| 2011/0153368 | A1 | 6/2011 | Pierre et al. | |
| 2016/0307274 | A1* | 10/2016 | Sweeney ................ | G06Q 40/08 |
| 2017/0213292 | A1 | 7/2017 | Sweeney et al. | |

OTHER PUBLICATIONS

Wikipedia, Drag and drop, Captured on Aug. 22, 2019 by Internet Archive Wayback Machine (Year 2019).

* cited by examiner

| | GROSS | CEDED | NET |
|---|---|---|---|
| DEPOSIT PREMIUM | $0 | -$2.2M | -$2.2M |
| PREMIUM | $0 | -$2.3M | -$2.3M |
| EXPENSE | $0 | $0 | $0 |
| EXPECTED LOSS | $6.7M | -$685.8K | -$6.0M |
| STD DEV OF LOSS | $7.8M | $3.6M | $5.1M |
| EXPECTED UNDERWRITING RESULT | -$6.7M | -$1.6M | -$8.3M |
| EXPECTED LOSS RATIO | NA | 30.3% | -265.1% |
| EXPECTED COMBINED RATIO | NA | 30.3% | -265.1% |

186

240

PRFTDATA.COM/CLIENTS/40/YEARS/34/PROGRAMS/287/STRUCTURE/441/LOB/5/ANALYSIS/EXPLORE

GUEST

EXPLORE PORTFOLIOS

XXXXXXX | YEARS 2021 | PROGRAMS CASUALTY | STRUCTURE XL ONLY | LOB GL US ALL OTHER

TABLE GRAPH

GROSS LOSS DISTRIBUTION

| PERCENTILE | RETURN PERIOD | ATTRITIONAL | LARGE | CAT | TOTAL | EXPENSE | UNDERWRITING RESULT |
|---|---|---|---|---|---|---|---|
| 99.9% | 1000 | 0 | 67,197,995 | 0 | 153,499,629 | 0 | -153,499,629 |
| 99.8% | 500 | 0 | 62,447,475 | 0 | 147,848,061 | 0 | -147,848,061 |
| 99.6% | 250 | 0 | 57,369,866 | 0 | 140,742,347 | 0 | -140,742,347 |
| 99.5% | 200 | 0 | 56,404,709 | 0 | 137,881,008 | 0 | -137,881,008 |
| 99.0% | 100 | 0 | 51,446,181 | 0 | 129,880,615 | 0 | -129,880,615 |
| 98.0% | 50 | 0 | 46,466,409 | 0 | 119,861,062 | 0 | -119,861,062 |
| 96.0% | 25 | 0 | 40,965,321 | 0 | 110,160,948 | 0 | -110,160,948 |
| 90.0% | 10 | 0 | 33,106,683 | 0 | 96,102,202 | 0 | -96,102,202 |
| 80.0% | 5 | 0 | 26,911,531 | 0 | 84,558,033 | 0 | -84,558,033 |
| 50.0% | 2 | 0 | 17,450,548 | 0 | 65,653,589 | 0 | -65,653,589 |
| | MEAN | 0 | 19,213,585 | 0 | 68,309,724 | 0 | -68,309,724 |
| | STD DEV | 0 | 10,466,490 | 0 | 20,998,852 | 0 | -20,998,852 |
| | CV | 00.0% | 54.5% | 00.0% | 30.7% | 00.0% | -30.7% |

FIG. 39

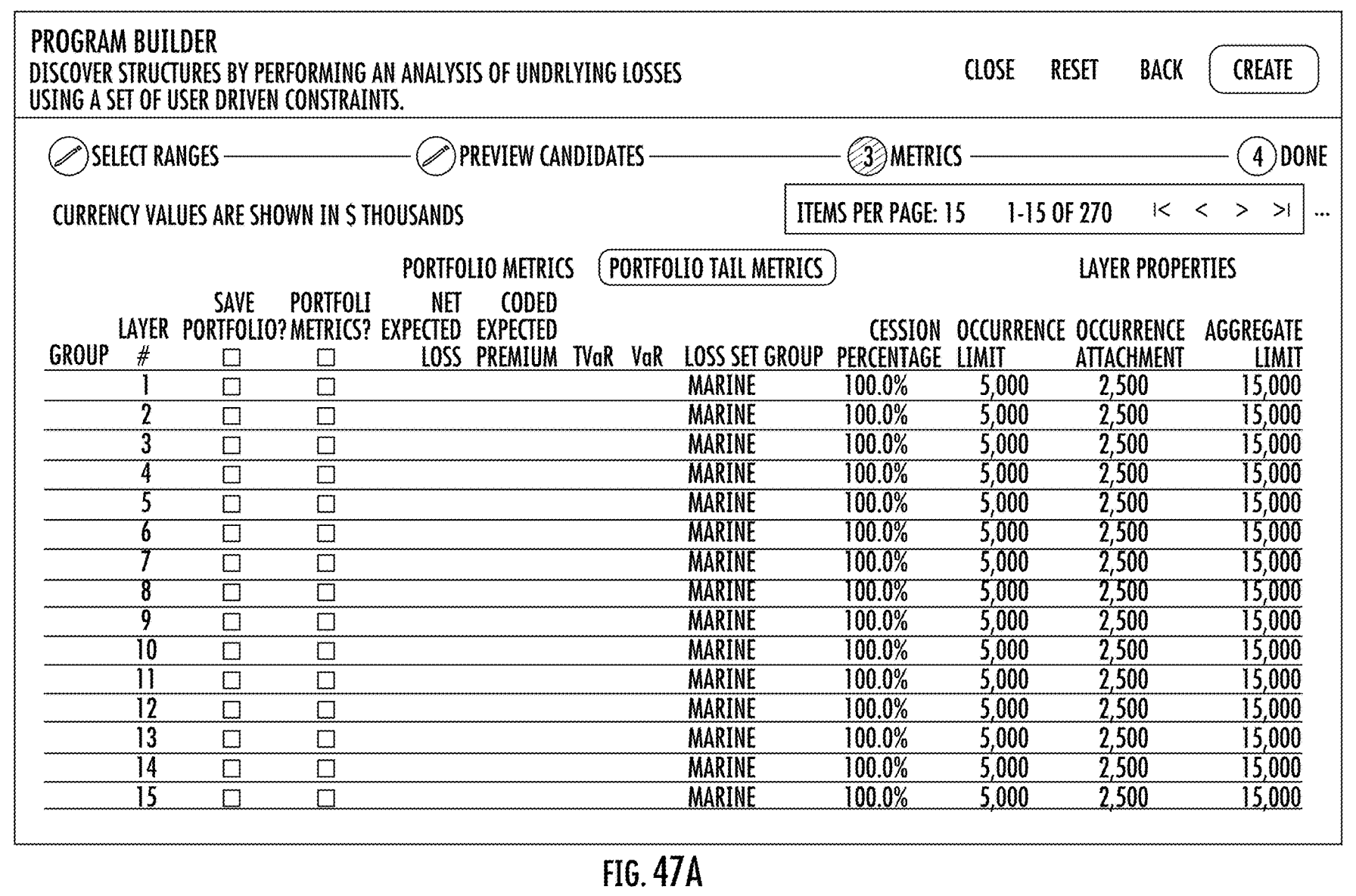

PROGRAM BUILDER
DISCOVER STRUCTURES BY PERFORMING AN ANALYSIS OF UNDRLYING LOSSES USING A SET OF USER DRIVEN CONSTRAINTS.

CLOSE RESET BACK CREATE

SELECT RANGES — PREVIEW CANDIDATES — 3 METRICS — 4 DONE

CURRENCY VALUES ARE SHOWN IN $ THOUSANDS

ITEMS PER PAGE: 15 1-15 OF 270 |< < > >| ...

PORTFOLIO METRICS PORTFOLIO TAIL METRICS LAYER PROPERTIES

| GROUP | LAYER # | SAVE PORTFOLIO? ☐ | PORTFOLI METRICS? ☐ | NET EXPECTED LOSS | CODED EXPECTED PREMIUM | TVaR | VaR | LOSS SET GROUP | CESSION PERCENTAGE | OCCURRENCE LIMIT | OCCURRENCE ATTACHMENT | AGGREGATE LIMIT |
|---|---|---|---|---|---|---|---|---|---|---|---|---|
| | 1 | ☐ | ☐ | | | | | MARINE | 100.0% | 5,000 | 2,500 | 15,000 |
| | 2 | ☐ | ☐ | | | | | MARINE | 100.0% | 5,000 | 2,500 | 15,000 |
| | 3 | ☐ | ☐ | | | | | MARINE | 100.0% | 5,000 | 2,500 | 15,000 |
| | 4 | ☐ | ☐ | | | | | MARINE | 100.0% | 5,000 | 2,500 | 15,000 |
| | 5 | ☐ | ☐ | | | | | MARINE | 100.0% | 5,000 | 2,500 | 15,000 |
| | 6 | ☐ | ☐ | | | | | MARINE | 100.0% | 5,000 | 2,500 | 15,000 |
| | 7 | ☐ | ☐ | | | | | MARINE | 100.0% | 5,000 | 2,500 | 15,000 |
| | 8 | ☐ | ☐ | | | | | MARINE | 100.0% | 5,000 | 2,500 | 15,000 |
| | 9 | ☐ | ☐ | | | | | MARINE | 100.0% | 5,000 | 2,500 | 15,000 |
| | 10 | ☐ | ☐ | | | | | MARINE | 100.0% | 5,000 | 2,500 | 15,000 |
| | 11 | ☐ | ☐ | | | | | MARINE | 100.0% | 5,000 | 2,500 | 15,000 |
| | 12 | ☐ | ☐ | | | | | MARINE | 100.0% | 5,000 | 2,500 | 15,000 |
| | 13 | ☐ | ☐ | | | | | MARINE | 100.0% | 5,000 | 2,500 | 15,000 |
| | 14 | ☐ | ☐ | | | | | MARINE | 100.0% | 5,000 | 2,500 | 15,000 |
| | 15 | ☐ | ☐ | | | | | MARINE | 100.0% | 5,000 | 2,500 | 15,000 |

FIG. 47A

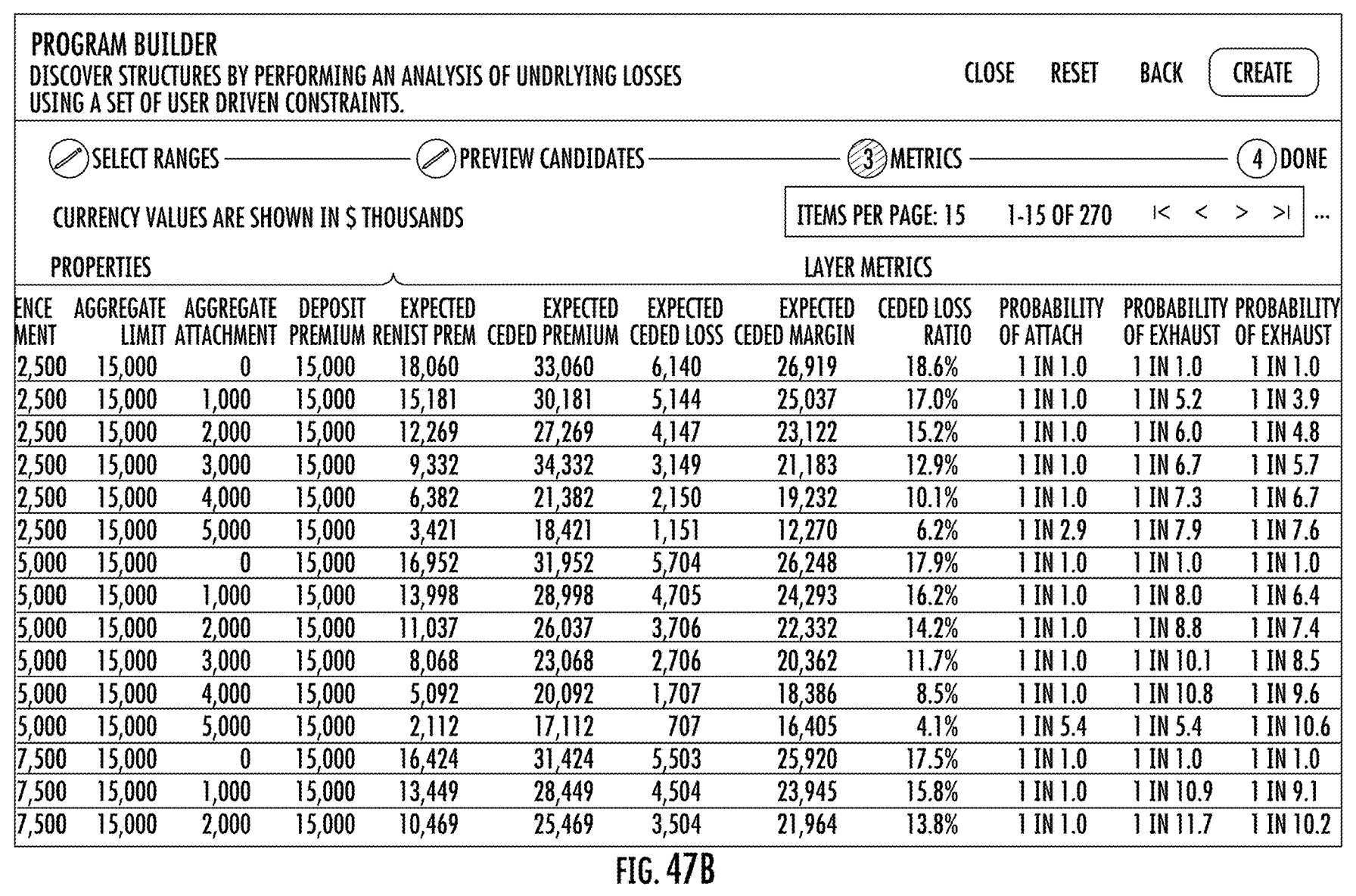

PROGRAM BUILDER

DISCOVER STRUCTURES BY PERFORMING AN ANALYSIS OF UNDRLYING LOSSES USING A SET OF USER DRIVEN CONSTRAINTS.

CLOSE RESET BACK CREATE

SELECT RANGES — PREVIEW CANDIDATES — 3 METRICS — 4 DONE

CURRENCY VALUES ARE SHOWN IN $ THOUSANDS

ITEMS PER PAGE: 15 1-15 OF 270 |< < > >| ...

| PROPERTIES | | | | LAYER METRICS | | | | | | | |
|---|---|---|---|---|---|---|---|---|---|---|---|
| ENCE MENT | AGGREGATE LIMIT | AGGREGATE ATTACHMENT | DEPOSIT PREMIUM | EXPECTED RENIST PREM | EXPECTED CEDED PREMIUM | EXPECTED CEDED LOSS | EXPECTED CEDED MARGIN | CEDED LOSS RATIO | PROBABILITY OF ATTACH | PROBABILITY OF EXHAUST | PROBABILITY OF EXHAUST |
| 2,500 | 15,000 | 0 | 15,000 | 18,060 | 33,060 | 6,140 | 26,919 | 18.6% | 1 IN 1.0 | 1 IN 1.0 | 1 IN 1.0 |
| 2,500 | 15,000 | 1,000 | 15,000 | 15,181 | 30,181 | 5,144 | 25,037 | 17.0% | 1 IN 1.0 | 1 IN 5.2 | 1 IN 3.9 |
| 2,500 | 15,000 | 2,000 | 15,000 | 12,269 | 27,269 | 4,147 | 23,122 | 15.2% | 1 IN 1.0 | 1 IN 6.0 | 1 IN 4.8 |
| 2,500 | 15,000 | 3,000 | 15,000 | 9,332 | 34,332 | 3,149 | 21,183 | 12.9% | 1 IN 1.0 | 1 IN 6.7 | 1 IN 5.7 |
| 2,500 | 15,000 | 4,000 | 15,000 | 6,382 | 21,382 | 2,150 | 19,232 | 10.1% | 1 IN 1.0 | 1 IN 7.3 | 1 IN 6.7 |
| 2,500 | 15,000 | 5,000 | 15,000 | 3,421 | 18,421 | 1,151 | 12,270 | 6.2% | 1 IN 2.9 | 1 IN 7.9 | 1 IN 7.6 |
| 5,000 | 15,000 | 0 | 15,000 | 16,952 | 31,952 | 5,704 | 26,248 | 17.9% | 1 IN 1.0 | 1 IN 1.0 | 1 IN 1.0 |
| 5,000 | 15,000 | 1,000 | 15,000 | 13,998 | 28,998 | 4,705 | 24,293 | 16.2% | 1 IN 1.0 | 1 IN 8.0 | 1 IN 6.4 |
| 5,000 | 15,000 | 2,000 | 15,000 | 11,037 | 26,037 | 3,706 | 22,332 | 14.2% | 1 IN 1.0 | 1 IN 8.8 | 1 IN 7.4 |
| 5,000 | 15,000 | 3,000 | 15,000 | 8,068 | 23,068 | 2,706 | 20,362 | 11.7% | 1 IN 1.0 | 1 IN 10.1 | 1 IN 8.5 |
| 5,000 | 15,000 | 4,000 | 15,000 | 5,092 | 20,092 | 1,707 | 18,386 | 8.5% | 1 IN 1.0 | 1 IN 10.8 | 1 IN 9.6 |
| 5,000 | 15,000 | 5,000 | 15,000 | 2,112 | 17,112 | 707 | 16,405 | 4.1% | 1 IN 5.4 | 1 IN 5.4 | 1 IN 10.6 |
| 7,500 | 15,000 | 0 | 15,000 | 16,424 | 31,424 | 5,503 | 25,920 | 17.5% | 1 IN 1.0 | 1 IN 1.0 | 1 IN 1.0 |
| 7,500 | 15,000 | 1,000 | 15,000 | 13,449 | 28,449 | 4,504 | 23,945 | 15.8% | 1 IN 1.0 | 1 IN 10.9 | 1 IN 9.1 |
| 7,500 | 15,000 | 2,000 | 15,000 | 10,469 | 25,469 | 3,504 | 21,964 | 13.8% | 1 IN 1.0 | 1 IN 11.7 | 1 IN 10.2 |

FIG. 47B

SYSTEMS AND METHODS FOR CUSTOM AND REAL-TIME VISUALIZATION, COMPARISON AND ANALYSIS OF INSURANCE AND REINSURANCE STRUCTURES

CROSS-REFERENCE TO RELATED APPLICATIONS

This application is a continuation of U.S. application Ser. No. 18/241,579, filed on Sep. 1, 2023, entitled "SYSTEMS AND METHODS FOR CUSTOM AND REAL-TIME VISUALIZATION, COMPARISON AND ANALYSIS OF INSURANCE AND REINSURANCE STRUCTURES," which claims priority to and benefit of U.S. application Ser. No. 17/545,836, now U.S. Pat. No. 11,783,427, filed on Dec. 8, 2021, entitled "SYSTEMS AND METHODS FOR CUSTOM AND REAL-TIME VISUALIZATION, COMPARISON AND ANALYSIS OF INSURANCE AND REINSURANCE STRUCTURES," which claims priority to and benefit of U.S. Provisional Application No. 63/122,807, filed on Dec. 8, 2020, entitled "SYSTEMS AND METHODS FOR CUSTOM AND REAL-TIME VISUALIZATION, COMPARISON AND ANALYSIS OF INSURANCE AND REINSURANCE STRUCTURES," the disclosures of which are hereby incorporated herein by reference in their entirety.

BACKGROUND

The global property and casualty (re) insurance industry provides financial protection in the event of artificial or naturally occurring events causing property damage or other damage and financial expense/loss. (Re) insurance also provides coverage for other loss events such as worker's compensation and general professional liability coverages. The various risks can take the form of any insurance policy, but often can include large corporate commercial insurance policies issued annually and/or reinsurance contracts negotiated and executed to transfer risk from one insurer to another and afford indemnity protection to insurance carriers who hold large risk portfolios to spread the risk of loss in the event of a covered event occurring. For example, a reinsurance placement may include the insurance carrier's entire book of homeowner's insurance policies in each and every state they are licensed to do business, or all of the insurance carrier's book of automobile insurance policies written in a single state. Reinsurance coverage buyers will sometime purchase reinsurance directly from reinsurance carriers, but the most sizable commercial placements are most often handled by insurance and/or reinsurance intermediary brokers who have the necessary skill and expertise to manage the complex transactions that are undertaken in these situations. Reinsurance is essentially insurance for insurance companies/insurers through contracts where reinsurers agree to indemnify the insurer/carrier for a portion or all of the loss that the insurer/carrier may incur under the insurer's/carrier's policies. The insurer/carrier ceding the risks under their policies is also referred to as the ceding company or cedent. The party that agrees to indemnify the ceding company for losses in exchange for payment of reinsurance premium is known as the reinsurer. Reinsurance intermediary brokers provide a valuable service by locating, negotiating, and procuring reinsurance coverage from reinsurers. Reinsurance functions to provide insurers solvency protection by indemnifying insurers after the insurer's payment of some or all amounts of losses paid to policyholder claimants. Reinsurance reduces the cedent's net liability on individual risks and provides catastrophe protection from large and/or multiple catastrophic losses resulting from events such as hurricanes, earthquakes, firestorms and tornadoes. Reinsurance also provides ceding companies the capacity to increase their underwriting capabilities in terms of the number and size of risks they insure. By covering the insurer against accumulated individual commitments, reinsurance allows the insurer more security for its equity and solvency. This thereby increases the insurer's ability to withstand the potentially devastating financial burden when unusual and major catastrophic events occur. Ceding companies appoint reinsurance intermediary brokers to provide reinsurance intermediary broking and analytical services to assist with planning and development of reinsurance programs and to perform the solicitation, negotiation, and placement of the requested reinsurance. During the reinsurance placement process, reinsurance intermediary brokers also provide actuarial, catastrophe modeling, capital management strategies and financial modeling support as appropriate to the ceding company's reinsurance program to assist the ceding company's risk management decision making.

Prior to the systems and methods of the present disclosure, it was not possible for a single user to create one, let alone a plurality, of reinsurance structures of proposed reinsurance programs and also evaluate them based on historical data and other actuarial information-let alone to do so in real time or virtually real time. Prior to systems of the present disclosure tower structures for reinsurance programs were typically generated out of data residing in spreadsheet form. The spreadsheet data would then require further adjustment based upon additional actuarial analysis that would typically take at least a few hours, but often days depending on the complexity of the data provided and availability of an actuary or actuaries to perform the necessary analysis. Thereafter, new and/or additional data in a spreadsheet would be provided and new graphical representations of the coverages selected for the reinsurance program were generated again to display to the reinsurance intermediary broker and/or potential ceding company.

SUMMARY

According to an aspect, the systems of the present disclosure involve unique and synergistically effective methods for graphically creating and displaying complex data of insurance/reinsurance structures in a graphical user interface that is easily and geometrically, visually constructed by the user and thereafter evaluating the user-constructed insurance/reinsurance structures in real-time or substantially real-time based on past insurance events and other data, which can include data stored in the system for all users as well as segregated user specific data. In doing so, the systems of the present disclosure provide unique graphical user interfaces and overall solutions to the challenges in the insurance and reinsurance industry that heretofore had required extensive time and human actuarial input to construct and analyze and then reconstruct and reanalyze when changes were desired by a broker, cedent, or other party. The improved systems of the present disclosure allow the users to intuitively construct and modify insurance/reinsurance structures and provide unique visual analytical systems to allow all users, including non-actuarial users, to easily and on-demand/in-real time evaluate the insurance/reinsurance structures created in the system without actuarial intervention/input. The systems of the present disclosure further typically allow users to securely submit and track insurance/reinsurance auctions and request for quotes without leaving the system of the present disclosure or transferring data manually to another system, which often causes error. The systems of the present disclosure further typically securely keep originally provided actuarial data from a particular cedent and accessible to users with the appropriate authorization, typically a user associated with the particular cedent or a user from the broker.

Another aspect of the present disclosure includes a method of visually creating and visually analyzing proposed insurance or reinsurance constructs. The steps include providing an overall insurance or reinsurance structure creation and analysis system that includes an insurance/reinsurance visual design structure interface displayed to a user on a design construction user interface display presented to a user via a display of a user computing device comprising a user input device and the display comprising a plurality of coverage layer types visually illustrated on the design construction user interface display outside of a graphical diagram. The graphic diagram typically depicts a percentage of covered loss in a range of from 0% to 100% along a first axis and a financial value of an insurable loss along a second axis. The first and second axis are typically at 90 degrees from one another and at least one rectangular-shaped coverage structure layer that creates a proposed insurance or reinsurance construct. The at least one rectangular-shaped structure layer corresponds to one of the plurality of coverage layer types visually illustrated on the design construction user interface display outside of the graphical diagram. The method typically further includes the step of creating an overall insurance or reinsurance structure by creating each of the at least one rectangular-shaped structure layers within the graphical diagram by the user selecting one of the plurality of coverage layer types using the user input device to create a user selected coverage layer type and moving the user selected coverage layer type to a position within the graphical diagram and thereby create the at least one rectangular-shaped structure layer. Each of the at least one rectangular-shaped structure layer within the graphical diagram typically may be removed from the graphical diagram by the user and each of the at least one rectangular-shaped structure layer within the graphical diagram typically include a boundary where coverage is exhausted, a boundary coverage attaches, a lower coverage share percentage boundary, and an upper coverage share percentage boundary that are each moveable and selectably positioned within the graphical diagram by the user after the at least one rectangular-shaped structure layer is positioned within the graphical diagram. The totality of the at least one rectangular-shaped structure layers form the overall insurance or reinsurance structure created by the user. The method further typically includes the step of visually analyzing at least one user interactive, graphical or pictorial insurance or reinsurance analysis and review display system displayed to a user accessible via activation of a link presented to the user on the design construction user interface display for visually analyzing the likely efficacy of the overall insurance or reinsurance structure created by the user typically using a fixed (i.e. unchanged after initially simulated) loss set of future probability of loss(es) based on historical insurable loss event data received from a ceding party and optionally further using a separate historical event loss data set from a second data source without resimulation of the probability of losses. Other actuarial data beyond historical loss data may also optionally be included when forming the fixed loss set of future probability of loss(es). The at least one user interactive, graphical or pictorial insurance or reinsurance analysis and review display system is typically chosen from: (1) a layer modeling diagram graphically depicting values of the at least one rectangular-shaped structure layers along an X-axis and a Y-axis and a surface area size display of a third value; (2) a stochastically modeled simulated trial diagram graphically and visually showing the efficacy at least 100,000 historical loss event probabilities; and/or (3) an animated trial three-dimensional graphical depiction of the effect of one or a plurality of user defined loss scenarios on the overall insurance or reinsurance structure created by the user wherein each of the at least one rectangular-shaped structure layers are shown as a hollow cuboid when coverage has not been utilized in the scenario and the cuboid shape fills as coverage is utilized such that the cuboid animates as if a volume of the cuboid is filling as coverage is utilized for each of the one or the plurality of user defined loss scenarios.

Another aspect of the present disclosure generally includes a tangible computer readable storage medium that stores program instructions that implements a method of visually creating and visually analyzing proposed insurance or reinsurance constructs. The steps of the method include providing an overall insurance or reinsurance structure creation and analysis system that includes an insurance/reinsurance visual design structure interface displayed to a user on a design construction user interface display presented to a user via a display of a user computing device comprising a user input device and the display comprising a plurality of coverage layer types visually illustrated on the design construction user interface display outside of a graphical diagram. The graphic diagram typically depicts a percentage of covered loss in a range of from 0% to 100% along a first axis and a financial value of an insurable loss along a second axis. The first and second axis are typically at 90 degrees from one another and at least one rectangular-shaped coverage structure layer that creates a proposed insurance or reinsurance construct. The at least one rectangular-shaped structure layer corresponds to one of the plurality of coverage layer types visually illustrated on the design construction user interface display outside of the graphical diagram. The method typically further includes the step of creating an overall insurance or reinsurance structure by creating each of the at least one rectangular-shaped structure layers within the graphical diagram by the user selecting one of the plurality of coverage layer types using the user input device to create a user selected coverage layer type and moving the user selected coverage layer type to a position within the graphical diagram and thereby create the at least one rectangular-shaped structure layer. Each of the at least one rectangular-shaped structure layer within the graphical diagram typically may be removed from the graphical diagram by the user and each of the at least one rectangular-shaped structure layer within the graphical diagram typically include a boundary where coverage is exhausted, a boundary coverage attaches, a lower coverage share percentage boundary, and an upper coverage share percentage boundary that are each moveable and selectably positioned within the graphical diagram by the user after the at least one rectangular-shaped structure layer is positioned within the graphical diagram. The totality of the at least one rectangular-shaped structure layers form the overall insurance or reinsurance structure created by the user. The method further typically includes the step of visually analyzing at least one user interactive, graphical or pictorial insurance or reinsurance analysis and review display system displayed to a user accessible via activation of a link presented to the user on the design construction user interface display for visually analyzing the likely efficacy of the overall insurance or reinsurance structure created by the user typically using a fixed (i.e. unchanged after initially simulated) loss set of future probability of loss(es) based on historical insurable loss event data received from a ceding party and optionally further using a separate historical event loss data set from a second data source without resimulation of the probability of losses. Other actuarial data beyond historical loss data may also optionally be included when forming the fixed loss set of future probability of loss(es). The at least one user interactive, graphical or pictorial insurance or reinsurance analysis and review display system is typically chosen from: (1) a layer modeling diagram graphically depicting values of the at least one rectangular-shaped structure layers along an X-axis and a Y-axis and a surface area size display of a third value; (2) a stochastically modeled simulated trial diagram graphically and visually showing the efficacy at least 100,000 historical loss event probabilities; and/or (3) an animated trial three-dimensional graphical depiction of the effect of one or a plurality of user defined loss scenarios on the overall insurance or reinsurance structure created by the user wherein each of the at least one rectangular-shaped structure layers are shown as a hollow cuboid when coverage has not been utilized in the scenario and the cuboid shape fills as coverage is utilized such that the cuboid animates as if a volume of the cuboid is filling as coverage is utilized for each of the one or the plurality of user defined loss scenarios.

Yet another aspect of the present disclosure includes a method of visually creating proposed insurance or reinsurance constructs. The steps of the method include providing an overall insurance or reinsurance structure creation system that includes an insurance/reinsurance visual design structure interface displayed to a user on a design construction user interface display presented to a user via a display of a user computing device comprising a user input device and the display comprising a plurality of coverage layer types visually illustrated on the design construction user interface display outside of a graphical diagram. The graphic diagram typically depicts a percentage of covered loss in a range of from 0% to 100% along a first axis and a financial value of an insurable loss along a second axis. The first and second axis are typically at 90 degrees from one another and at least one rectangular-shaped coverage structure layer that creates a proposed insurance or reinsurance construct. The at least one rectangular-shaped structure layer corresponds to one of the plurality of coverage layer types visually illustrated on the design construction user interface display outside of the graphical diagram. The method further typically includes the step of creating an overall insurance or reinsurance structure by creating each of the at least one rectangular-shaped structure layers within the graphical diagram by the user selecting one of the plurality of coverage layer types using the user input device to create a user selected coverage layer type and moving the user selected coverage layer type to a position within the graphical diagram and thereby create the at least one rectangular-shaped structure layer. Each of the at least one rectangular-shaped structure layer within the graphical diagram typically may be removed from the graphical diagram by the user and each of the at least one rectangular-shaped structure layer within the graphical diagram typically include a boundary where coverage is exhausted, a boundary coverage attaches, a lower coverage share percentage boundary, and an upper coverage share percentage boundary that are each moveable and selectably positioned within the graphical diagram by the user after the at least one rectangular-shaped structure layer is positioned within the graphical diagram. The totality of the at least one rectangular-shaped structure layers form the overall insurance or reinsurance structure created by the user.

These and other aspects, objects, and features of the present invention will be understood and appreciated by those skilled in the art upon studying the following specification, claims, and appended drawings.

BRIEF DESCRIPTION OF THE DRAWINGS

In the Drawings:

FIG. 39 is a tabulated display of an exemplary gross loss distribution of modeled loss by type for a given coverage event, in this case, line of business.

FIGS. 47A and 47B show an exemplary metrics table displayed to a user for each of the possible generated layers for a layer of the reinsurance/insurance tower.

DETAILED DESCRIPTION

Figure 1:
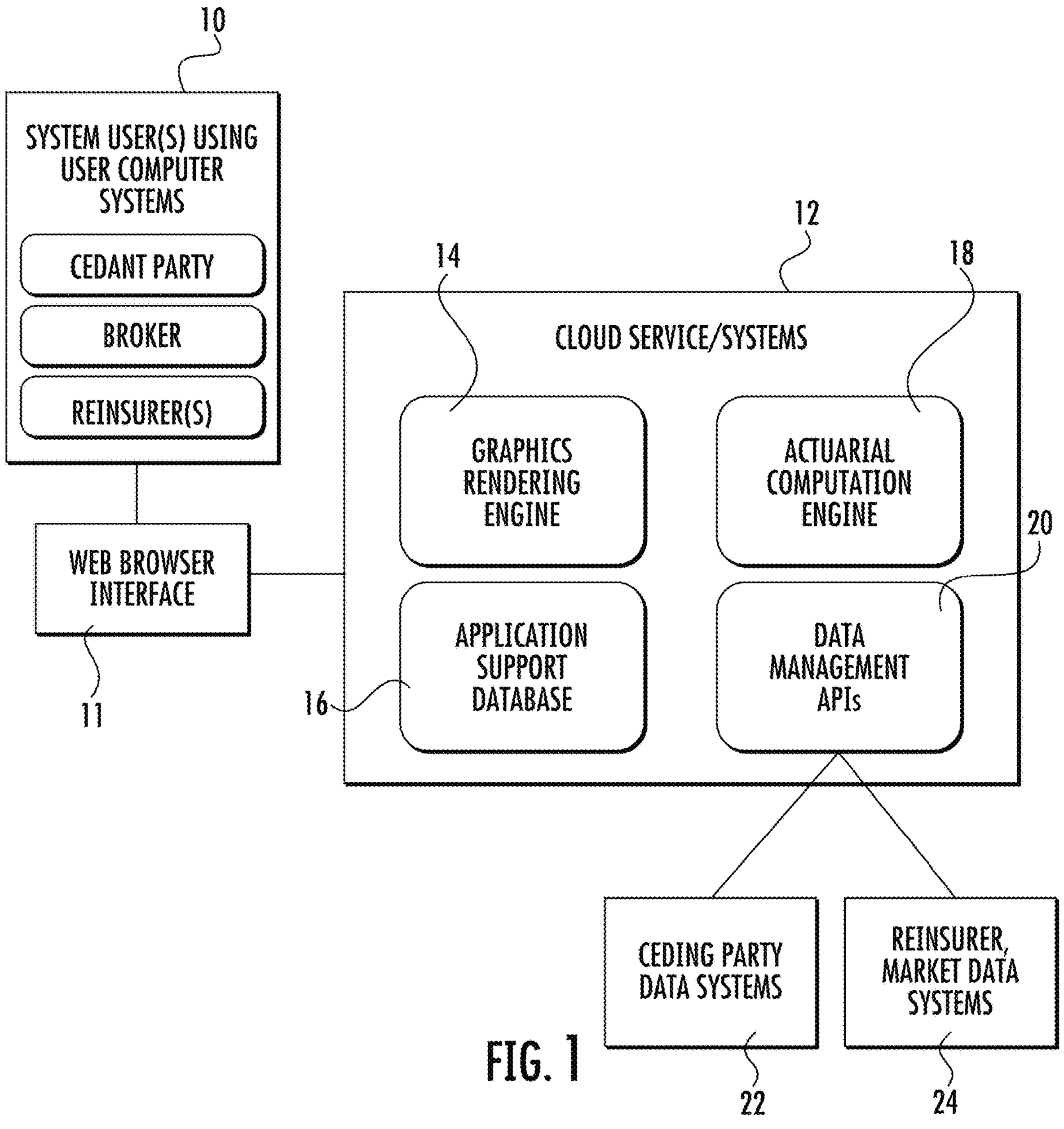
FIG. 1 is a general construction of a systems environment for a real-time visualization, comparison and user selection of insurance or reinsurance structures according to an aspect of the present disclosure.

For purposes of description herein, it is to be understood that the invention may assume various alternative orientations, except where expressly specified to the contrary. It is also to be understood that the specific devices and processes illustrated in the attached drawings, and described in the following specification are simply exemplary embodiments of the inventive concepts. Hence, specific dimensions and other physical characteristics relating to the embodiments disclosed herein are not to be considered as limiting, unless the claims expressly state otherwise.

It is important to note that the construction and arrangement of the elements of the systems and other aspects of the present disclosure shown in the exemplary embodiments are illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures/systems within the scope of the present disclosure. The exemplary structures/systems and processes disclosed herein are for illustrative purposes and are not to be construed as limiting.

It is also to be understood that variations and modifications can be made on the aforementioned structures and methods without departing from the concepts of the present invention.

As discussed above, the systems of the present disclosure generally involve unique and synergistically effective methods for graphically creating and displaying complex data of insurance/reinsurance structures in a graphical user interface that is easily and geometrically, visually constructed by the user and thereafter evaluating the user-constructed insurance/reinsurance structures in real-time or substantially real-time based on past insurance events and other data, which can include data stored in the system for all users as well as segregated user specific data. In doing so, the systems of the present disclosure provide unique graphical user interfaces and overall solutions to the challenges in the insurance and reinsurance industry that heretofore had required extensive time and human actuarial input to construct and analyze and then reconstruct and reanalyze when changes were desired by a broker, cedent, or other party. The improved systems of the present disclosure allow the users to intuitively construct and modify insurance/reinsurance structures and provide unique visual analytical systems to allow all users, including non-actuarial users, to easily and on-demand/in-real time evaluate the insurance/reinsurance structures created in the system without actuarial intervention/input. The systems of the present disclosure further typically allow users to securely submit and track insurance/reinsurance auctions and request for quotes without leaving the system of the present disclosure or transferring data manually to another system, which often causes error. The systems of the present disclosure further typically securely keep originally provided actuarial data from a particular cedent and accessible to users with the appropriate authorization, typically a user associated with the particular cedent or a user from the broker. The graphical user interfaces and systems of the present disclosure are shown generally in FIGS. 1-48B.

One way the systems of the present disclosure uniquely are able to provide real-time solutions to the user heretofore not possible when creating reinsurance tower structures occurs by not re-simulating future losses after the structures are created. Instead of re-simulating future losses after each modification of a proposed reinsurance structure, data from at least one data source, typically the cedent, and optionally historical loss data from a second or plurality sources may be used to calculate and define a fixed defined loss set of the probability of losses that may occur in the future based on the historical data from the first and/or second (subsequent) sources. Any number of additional subsequent sources of data may be added to the systems of the present disclosure to provide a more accurate simulation of future loss(es). The data used is not limited to just data from the potential cedent user, but rather includes additional data that resides on the system for use by any user. The fixed defined loss set is used in the process and allows the systems to function in real time. The fixed defined loss set may be updated periodically with new or additional historical loss data to create a revised fixed defined loss set, but the fixed, defined loss set is one feature that enables the system to provide financial analysis of reinsurance constructs in real-time. Simulations of the effect(s) of modifications to insurance structures created by the user do not need to be rerun after each edit to a reinsurance structure when using the systems of the present disclosure to analyze one or more reinsurance structures.

The systems of the present disclosure are generally directed toward systems and methods of processing and displaying database objects in a variety of different user-determined ways to create/build one or more insurance/reinsurance coverage structures and thereafter simulate a variety of events and/or otherwise evaluate the created insurance coverage structures created against one another. Typically, the constructs may be further customized via weighted metrics and the analysis customized in a variety of user selected ways to provide real-time feedback/estimated effects of the coverage structure to the user based on prior insurable event data. The systems of the present disclosure also typically allow the user to request quotes from one or a plurality of insurance/reinsurance provider(s) after the user has evaluated the potential coverage structures. As shown in FIG. 1, the users 10 of the systems of the present disclosure are typically a cedent party, a broker of insurance or reinsurance, and/or a reinsurer(s). The user 10 typically uses a web browser interface 11 to access and interact with the systems of the present disclosure; however, other application systems such as a mobile application system or local based application that resides on the user's computer may also be used. The systems of the present disclosure are typically remote "cloud" server-based computer systems 12 accessed by a user via a wired or wireless signal connection from a local computing device. A server is a computer or device in a network that is used to provide services to other computers or devices in the network. The cloud based systems 12 of the present disclosure typically employ a graphics rendering engine 14, an application support database 16, an actuarial computation engine 18, and one or more Data Management Application Programming Interfaces (APIs) that facilitate interaction and standardization of input received from ceding party data systems 22 and reinsurer and/or market data systems from third parties in automatic fashion so as to enable the systems of the present disclosure to incorporate precisely the same data even when the data may not be referenced in an identical manner. Heretofore, standardizing the various data provided by different data sources of insurance/reinsurance providers was not possible since data is often identified or entitled by different terms or references. The API's of this aspect of the present disclosure map the data from any new data participant in the system to map the data of the new data participant and what a particular term or field is called by the new participant to the standardized term for the same data within the systems of the present disclosure.

An exemplary user computer system 10 will typically be a desktop or mobile computing device. The user's computer systems of the present disclosure generally include a processor, at least one user input device, and a display. The processors of a user system according to the present disclosure may include any type of processor including, but not limited to, an ASIC processor or a RISC processor. It can be an FPGA or other logic or gate array. The processor can also include graphic processing unit (GPU) resources. The user's computer system typically includes at least one processor, but often may include a plurality of processors. The processor typically communicates with various other peripheral devices using some kind of a computer bus subsystem that transfers data between component inside a computer or between computers or peripherals used in connection with the computer system. These peripheral devices may include, but are not limited to, a memory storage subsystem including, memory devices and a file storage subsystem, the user interface input devices, the user interface output devices, and at least one network interface subsystem. The input and output devices allow user interaction with computer system. A network interface system provides an interface to outside networks, including an interface to corresponding interface devices in other computer systems. The network interface system may enable wired and/or wireless interface of data. The interface of data may be via a WiFi®, cellular or other wireless data system. In the case of the systems of the present disclosure, network(s) can be any one or any combination of Local Area Network (LAN), Wide Area Network (WAN), WiMAX, Wi-Fi®, telephone network, wireless network, point-to-point network, star network, token ring network, hub network, mesh network, peer-to-peer connections like Bluetooth, Near Field Communication (NFC), Z-Wave, ZigBee, or other appropriate configuration of data networks, including the Internet.

Exemplary user interface input devices may include a keyboard; mouse; trackball; touchpad; joystick; graphics tablet; a scanner; a touch sensitive screen that may be incorporated into a display or displays; audio input devices such as voice recognition systems and microphones; and any other device that provides a way for a user or users to provide/input information into a computer system. In general, use of the term "input device" is intended to include all possible types of devices and ways to input information into computer system.

User interface output devices may include, but are not limited to, a display subsystem, a printer, a fax machine, or non-visual displays such as audio output devices. The display subsystem may include any monitor or display device, a projection device, or some other mechanism for creating a visible image to the user. The user computing systems of the present disclosure may also provide non-visual output such as audio alone or in conjunction with the visual display(s) used. In general, the term "output device" in connection with the systems of the present disclosure mean any and all possible types of devices and ways to output information from computer system to the user or to another machine or computer system.

The storage subsystem(s) of the present disclosure may store programming and data constructs that provide the functionality of some or all of the modules and methods described herein. However, typically the systems of the present disclosure do not require any software to be run locally on the user's computer systems. Any operating system or software modules that might be present for use in connection with the systems of the present disclosure are generally executed by processor alone or in combination with other processors.

The memory subsystem used in the storage subsystem can include a number of memories including a main random-access memory (RAM) for storage of instructions and data during program execution and could include a read only memory (ROM) in which fixed instructions are stored. A file storage subsystem can provide persistent storage for program and data files, and may include a hard disk drive, a floppy disk drive along with associated removable media, a CD-ROM drive, a DVD-ROM drive an optical drive, or removable media cartridges. The modules implementing the functionality of certain implementations may be stored by file storage subsystem in the storage subsystem, or in other machines accessible by the processor.

The user's computer system and the other computer systems utilized in implementation of the systems methods and devices of the present disclosure may be of varying types including: a workstation, server, computing cluster, blade server, server farm, or any other data processing system or computing device. Due to the ever-changing nature of computers and networks, the description of a computer system herein is intended to be exemplary only and as one example. Many other configurations of computer systems are possible having more or fewer components than the computer systems described above and herein.

The exemplary technology stack or technology infrastructure/data ecosystem typically used for implementing the systems, methods and user displays of the present disclosure includes a variety of systems that will be described in more detail below. In addition to the user's local computer systems, which include a user systems hardware discussed above, a system of the present disclosure typically employs a platform built upon leading edge, cloud server-based internet/web technologies and is constructed to provide, for the first time, user generated, real-time risk analytics and proprietary reinsurance scenario modeling through a variety of different innovative user-driven visualizations. These visualizations include the ability to select from a plurality of different types of reinsurance or other insurance coverage types onto a graphical display for creating insurance/reinsurance coverage structures; the ability to shape the insurance/reinsurance coverage layers of the overall structure(s) being built using a user input such as the user's finger if a touch sensitive display is used or a mouse and have the rectangular (when displayed in two dimensions) or cuboid (when displayed in three dimensions) snap to the nearest whole number value interval of the system; manipulate the shape and thereby the parameters of each layer of the coverage structure; provide real-time animated scenario modeling for the constructed coverage structures and the effect of one or more events on the coverage structure by programmably passing details of the structure(s) to the systems of the present disclosure and using the actuarial computation engine, application support database information and graphics rendering engine to display the effect of selected events on the structure. The systems of the present disclosure also have the ability to display the results of the hypothetical events graphically and/or using animation and thereby compare the efficacy of different layers of a given structure and/or different layers in multiple structures. For example, the systems of the present disclosure show the user effects of insurance between layers of different coverage structures. Not only can the systems of the present disclosure provide such real-time user driven visualizations, the systems provide the ability to do so across multiple different scenarios simultaneously and/or in group evaluations as well.

The user interface and experience typically utilizes a programming platform for the systems of the present disclosure, such as ANGULAR®. ANGULAR® is type-script based open-source web application framework. The platform/framework employed for the systems of the present disclosure is typically one suitable for building SPA (single page applications) with Typescript. The systems of the present disclosure also typically employ a framework for building reactive applications in ANGULAR® or other programming platform. One such framework that may be employed in the systems of the present disclosure is NgRx. Use of NgRx for building reactive applications in ANGULAR® offers a variety of benefits including: state management, clean component architecture, entity collection management, integration with the Angular Router and efficient developer tooling. NODE.JS®, a JAVASCRIPT® runtime built on the CHROME® web browser's V8 JavaScript engine, is employed on the backend for real time web services and other features. To construct the interactive insurance coverage structure designs, which will be discussed in more detail later herein, the systems of the present disclosure make use of D3.js, three .js and other modern visualization libraries. D3.js is a JavaScript library for visualizing data with HTML, SVG and CSS. The systems and methods of the present disclosure are also typically built upon RESTful (Representational State Transfer), which is a software architectural style that defines a set of constraints to be used for creating Web services. Web services that conform to the REST architectural style, called RESTful Web services, provide interoperability between computer systems on the internet. RESTful Web services allow the requesting systems to access and manipulate textual representations of Web resources by using a uniform and predefined set of stateless operations. The RESTful APIs used in the context of the present disclosure are used for programmatic interaction with a database of extensive reinsurance and insurance data and related insurance covered event data provide real-time analytics tools such as the VERISK™ ANALYZE RE™ platform. The interaction of the visualization tools and the specific database of catastrophic event and reinsurance/insurance data and other data within the database of the ANALYZE RE™ platform, produces for the first time, real-time actuarial modeling results using the visualization tools invented in the context of the present disclosure. The integrated computing systems of the present disclosure are standardized on Microsoft Azure and make use of a variety of components, including .NET C#, the Azure CDN for blob storage and further make use of a Microsoft SQL Server for application support database purposes.

The systems of the present disclosure first require a user to securely sign onto the system. The systems of the present disclosure employ a variety of best practices towards securing user access as well as confidential data in transit and at rest. Any user of the systems of the present disclosure must be authenticated and there is absolutely no public access. For general single page applications, tokens are acquired by a JavaScript or TypeScript app running in the browser and use a framework like ANGULAR®, REACT®, or VUE™. The systems of the present disclosure fit this pattern and, in turn, also leverage the MSAL.js MICROSOFT® authentication library. User authentication is accomplished through the Microsoft Identity Platform v2 endpoint with OpenID Connect. Internal Lockton users are authenticated against our own Azure AD tenant and external partner users are authenticated against their own Azure AD tenant. Through this approach we are able to inherit the unique security requirements for business colleagues across different companies. The systems of the present disclosure also typically employ an additional/optional implementation in a backend web service that issues JSON web tokens via the systems of the present disclosure's .NET Core framework where encrypted credentials are verified and tokens are issued in cases where an Azure AD identity provider may not be available.

Security of the user and any company specific information added and utilized in the context of the present disclosure is significant. The security keeps financial and other proprietary information from public and competitor use. In the context of the present disclosure, the systems typically include SQL Server row level security that is implemented on all partner-specific tables in the application support database of the systems of the present disclosure. Two types of predicates can be employed here: filter predicates (automatically filtering data for read operations) and block predicates (prevents write operations). Both are invoked when creating the Security Access Policy. Custom authorizations within a partner configuration are typically employed in the systems of the present disclosure to constrain the permissions (endpoints, read/write ops, etc.) based on different roles and privileges. Database requests are also user-specific for proprietary or confidential data where appropriate, meaning this type of data is not retrieved using a service account that can access all databases. Systems of the present disclosure may also leverage the Azure Key Vault for sensitive application settings like connection strings, etc.

Figure 2:
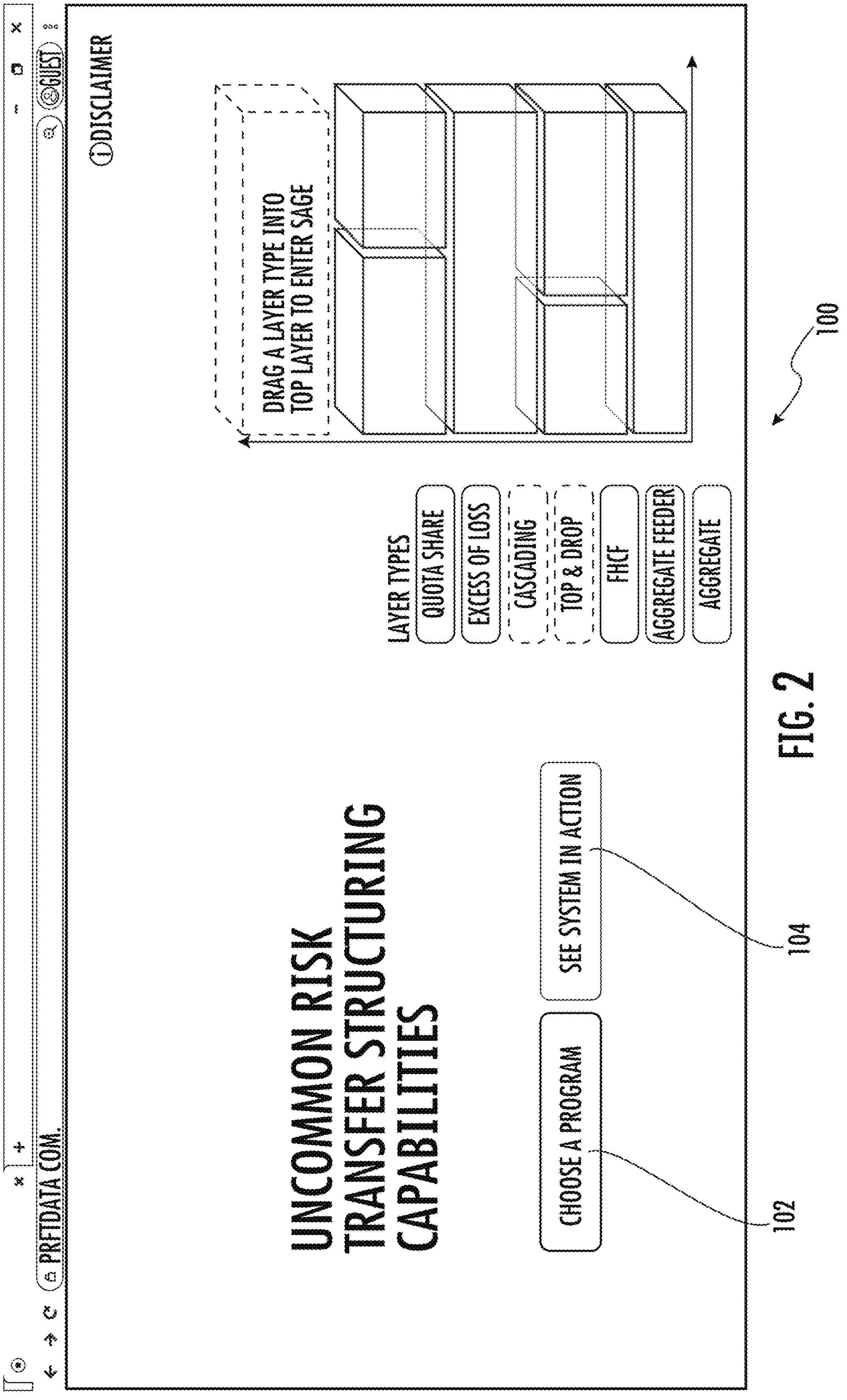
FIG. 2 is a home landing page for an exemplary system according to an aspect of the present disclosure.

Using the user's own computer system, user will first use their internet browser, typically a GOOGLE CHROME®, to access an initial portal entry page for a system of the present disclosure. That initial login page will ask for the user's login credentials, including their identification and password. The user credentials will define the company resources available within the system to user. These credentials may differ, based on the role of the user. For example, the information available may be different for a broker or an actuary. Once the user is logged in and has securely logged into a system of the present invention, typically the user will be greeted by a home-landing page 100, such as that shown in FIG. 2. From this initial home-landing page 100, the user can select a link to choose a program 102 or a separate link 104 to access a tutorial which will educate the user on various actions available in the system of the present disclosure. The educational piece shown in FIG. 2 is an exemplary coverage insurance/reinsurance coverage tower constructed of various types of coverages. As will be discussed in greater detail below, the design of these insurance/reinsurance structures are typically done in at least two dimensions, if not in three dimensions, or may be independently created by the user.

Figure 3:
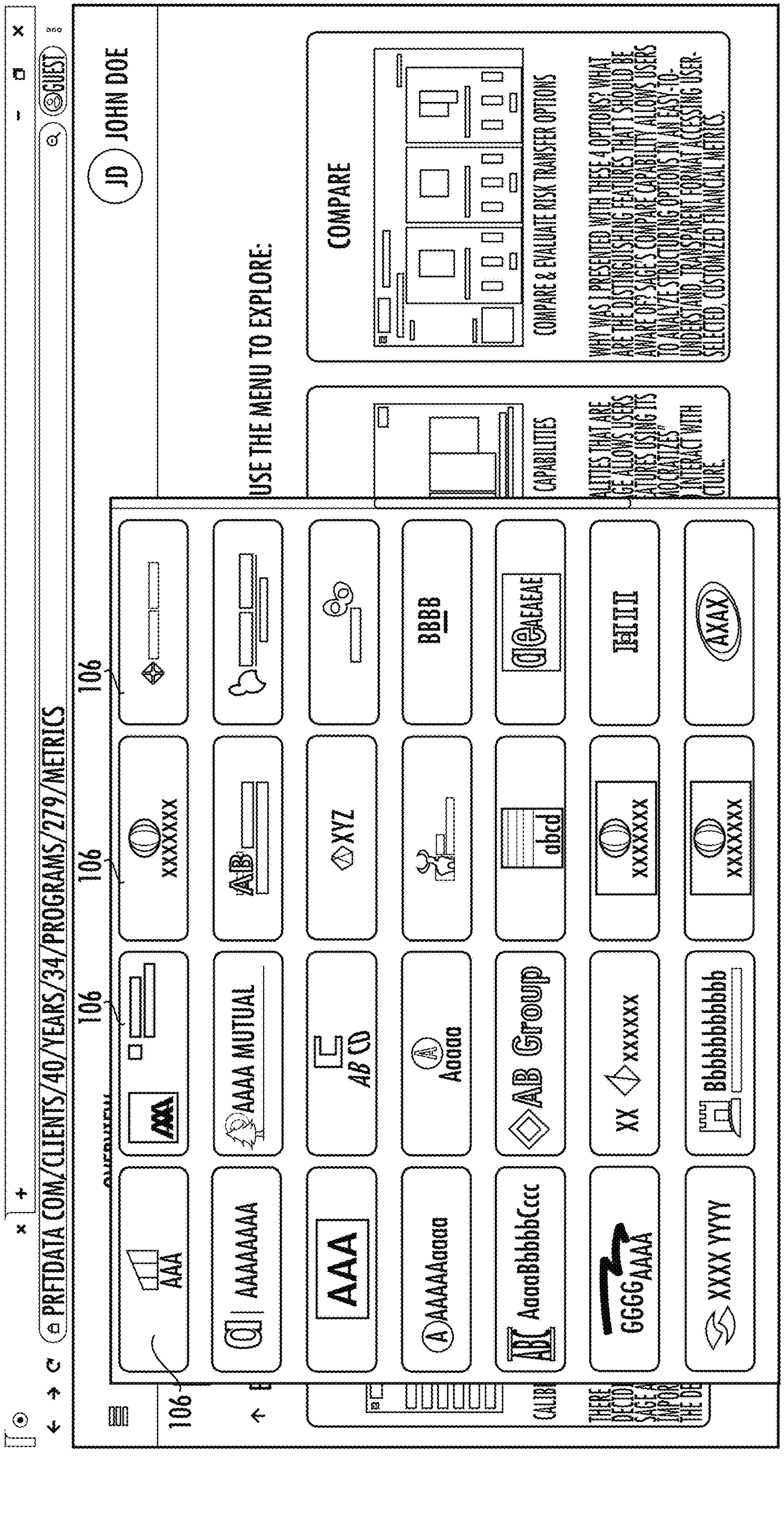
FIG. 3 is an exemplary carrier selection page according to an aspect of the present disclosure.
Figure 29:
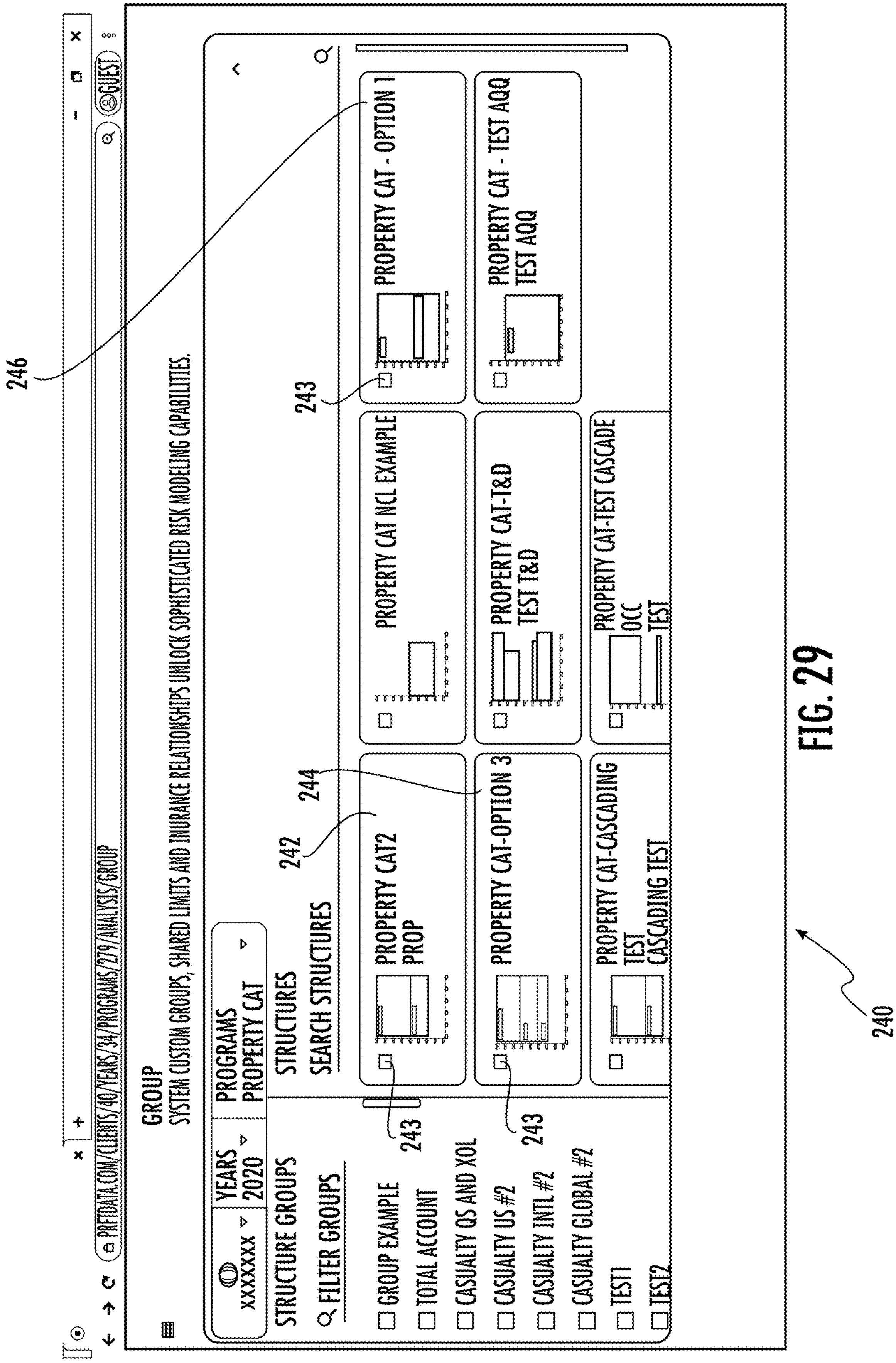
FIG. 29 is a "grouping" tab graphical user interface according to an aspect of the present disclosure that allows a user to group together hypothetical coverage structures together, typically based on coverage type across multiple geographical locations or based on coverage type.

Once the "Choose a Program" link, shown in FIG. 2, is activated, depending on the user's credentials, specific insurance/reinsurance carrier information is shown. In the case of FIG. 3, numerous possible user groups are shown because the user, who is logged into the system, is an operator of the system as a whole, and not a typical user from a client insurance company. When a user is from a particular company, access will be given to only that company's data to ensure confidentiality of the information therein. This allows all three parties, the carrier, the broker, which is typically the operator of a system, according to the present disclosure, and actuaries to review and adjust the data of a particular company within the system. Data from one company is completely segregated within the systems of the present disclosure from the data of another company. Again, the broker and the broker's internal actuary may have access to a plurality or all of the different insurance carrier's information, but individual carriers would not have access to any information from another carrier. If multiple carriers are shown, the user may select one of the carrier icons 106, which will take the user to an overview page, shown in FIG. 4. The user overview summary of action/selection graphical user interface screen 108 typically contains at least four brief descriptions/summaries, one for each main sub-system/analytical tool available to a user, according to an aspect of the present disclosure. A metric action link/summary 110, a design link/summary 112, a group link/summary 114 and a compare link/summary 116 are typically predominantly displayed, along with images of various exemplary screens and written text describing the actions undertaken when selecting these actions. For example, linking through the metrics link 110 will take the user to the metrics customization page shown in exemplary form in FIG. 5. Clicking the design link 112 directs a user to the initial design screen, which is exemplary release shown in FIG. 10. Activating the group link/summary 114 directs the user to a graphical user interface for selecting various groups of proposed coverages, which initial screen is generally shown in FIG. 29. Finally, activating the compare Link 116 directs a user to the compare functions of the systems of the present disclosure, which are shown in the exemplary compare graphical user interface screen of FIG. 38. Each of these systems are subsystems of the overall systems of the present disclosure and work synergistically together to provide meaningful feedback and unique graphical user interfaces linked to data points/sets of data heretofore not available to a user.

Regarding the metrics functions, as discussed above, activating link 110 causes the user's computer system to display a metrics page of the system of the present disclosure. The metrics page 118, shown in FIG. 5, allows the user to select the year for analysis via drop-down menu 120 and also select the program via the program drop-down menu 122. As shown, the year selected is 2020, and the program is a property and casualty program. Within the metrics page, a user can select potential reinsurers that may be appropriate candidates for a cedent to select. For example, the reinsurers may be an incumbent (a carrier the reinsurer selected in a previous year) or a target market to provide advisory information to casualty line in a particular geographic area. The reinsurer's objective is to elect business parties of interest and then calibrate various factors. The calibrated factors will then carry through the remaining analysis of the systems of the present disclosure throughout the user's evaluations of these programs including, but not limited to, into the program builder and visualization aspects of the present disclosure. For example, various weighted broker factors may be selected by the broker and the cedent. To do so, the user may click the selection boxes adjacent to the reinsurers, as either the incumbent (boxes 124), or as a target market (boxes 126), or both. Thereafter, one or more factors may be selected by the user to weight these factors in the analysis. In the example shown, the factors include an expected loss multiplier 128, a ceded margin percentage 130, a standard deviation percentage 132, and a market pricing factor 134. Each of these values can be adjusted by selecting the data field box and providing user input of numerical data entries to alter the values. Of course, while these four particular factors are shown, a variety of other factors might also be included or included instead of these four factors. The factors shown may be adjusted, based on the type of program, as well.

Figure 6:
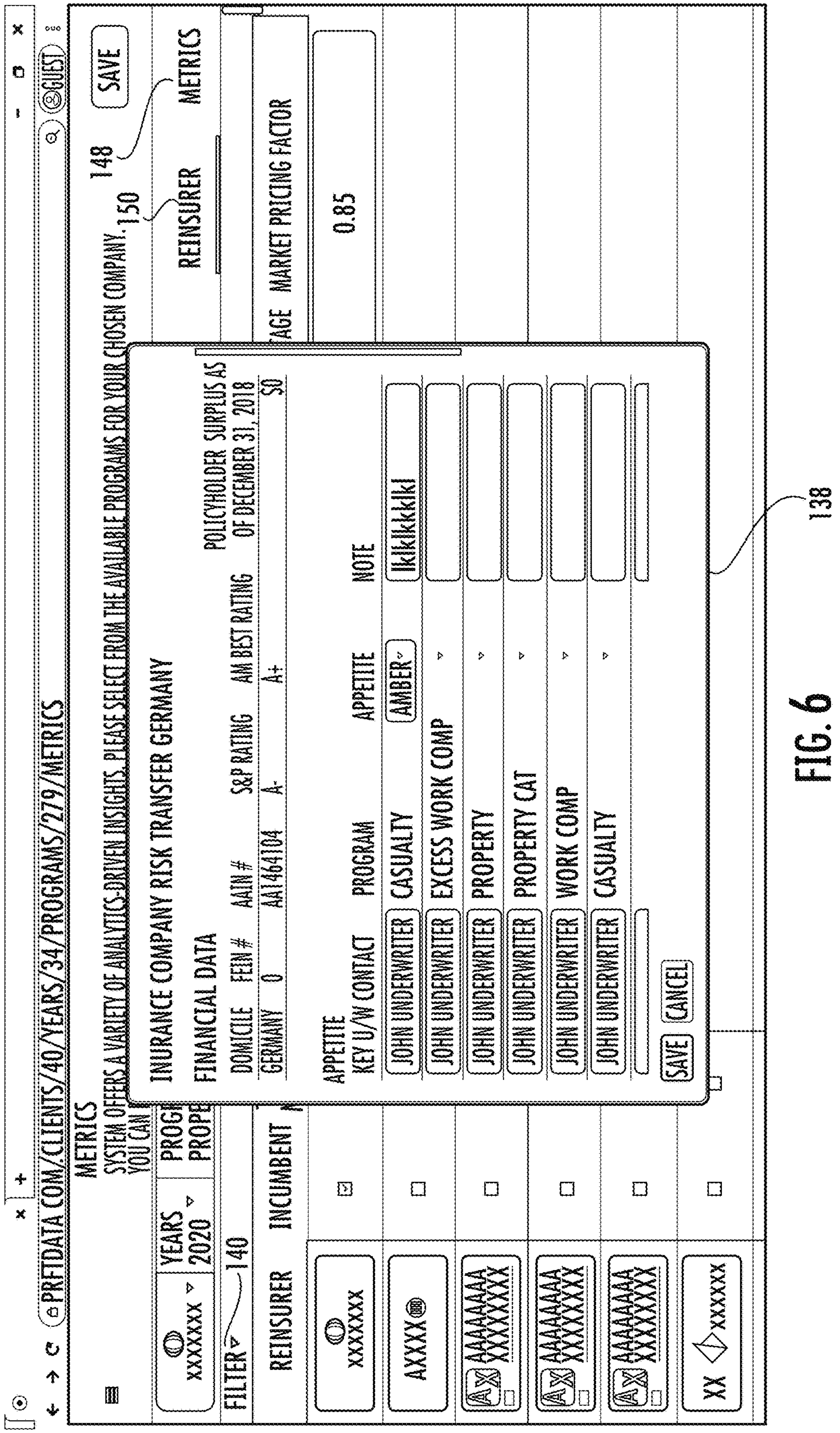
FIG. 6 is a graphic user interface display for data entry for an appetite of risk adjustment made for any particular cedent and/or broker according to an aspect of the present disclosure.
Figure 7:
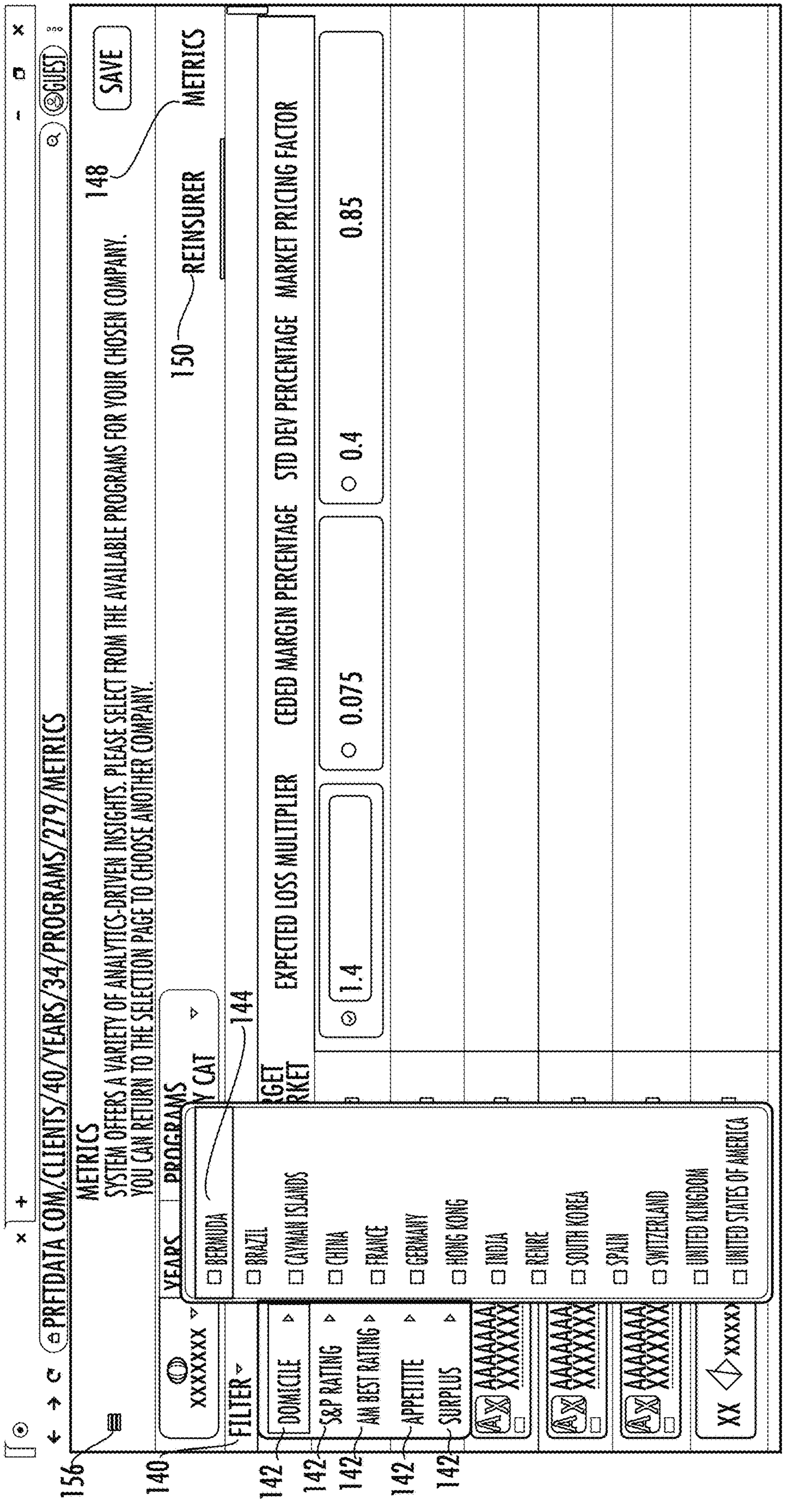
FIG. 7 is a metric filtering display screen that shows various filtering options that will filter the metrics display based on one or more selected criteria according to an aspect of the present disclosure.

As shown in FIG. 6, activating the associated link 136 with a given reinsurer, opens a detailed window view that shows information about the reinsurer. The exemplary information displayed within the pop-up window 138 is typically completed by the cedent and/or the broker. The information generally includes the reinsurer's appetite for risk, as well as the underwriter's name and program type and any other additional notes that the cedent and/or broker may want to include. By selecting the filter link 140 (as shown in FIG. 7) activates a main filtering menu 141 that contains a plurality of selectable filtering factors 142, where each filtering factor 142 calls up a different submenu 144 of selectable filtering options relevant to the particular filtering factor 142. In the filtering, shown in FIG. 7, the domicile of the reinsured is being filtered in the various geographic areas displayed. The filter for the reinsurer may be based on a variety of factors, including appetite for risk or coverage, or standard importers or AM best rating or geographic location. Surplus is typically the quantity threshold for a policy. For purposes of the present disclosure, surplus is the amount by which an insurer's or reinsurer's assets exceeds its liabilities. It is the equivalent of an owner's equity in standard accounting terms. The ratio of an insurer's or reinsurer's premium written to its surplus is often a key measure of its solvency.

All of the information discussed above is accessed via the reinsurer's submenu tab 150. Activating the metrics submenu 148 displays numerous weighting factors for different metrics to the user in the metrics waiting/customization input screen 146 (See FIG. 8). This weighting of factors (KEIs) allows the cedent to customize the metrics that are displayed in the system later, when the user is comparing various insurance/reinsurance structures and animations created by the user within the system. The system takes a blend of these metrics that are of interest and lets the individual user weight them on a percentage basis. The toggle switches 152 enable and disable the various factors in the individual data entry fields 154 provide the weighted percentage for this metric within the system. Significantly, these analytical tools are provided in the forefront through this interface to the cedent from a broker's actuarial. Activation of the stacked line icon 156, which is typically displayed on each graphical user interface of the systems of the present disclosure to provide quick navigation to various parts of the systems to the user, displays the quick menu 158 showing in FIG. 9. The quick menu typically provides a quick access to all parts of the system of the present disclosure. As can be seen, the drop-down menu allows the user to quickly jump from the metrics subsystem into the design, group, compare or other sub-menus within the system.

Figure 5:
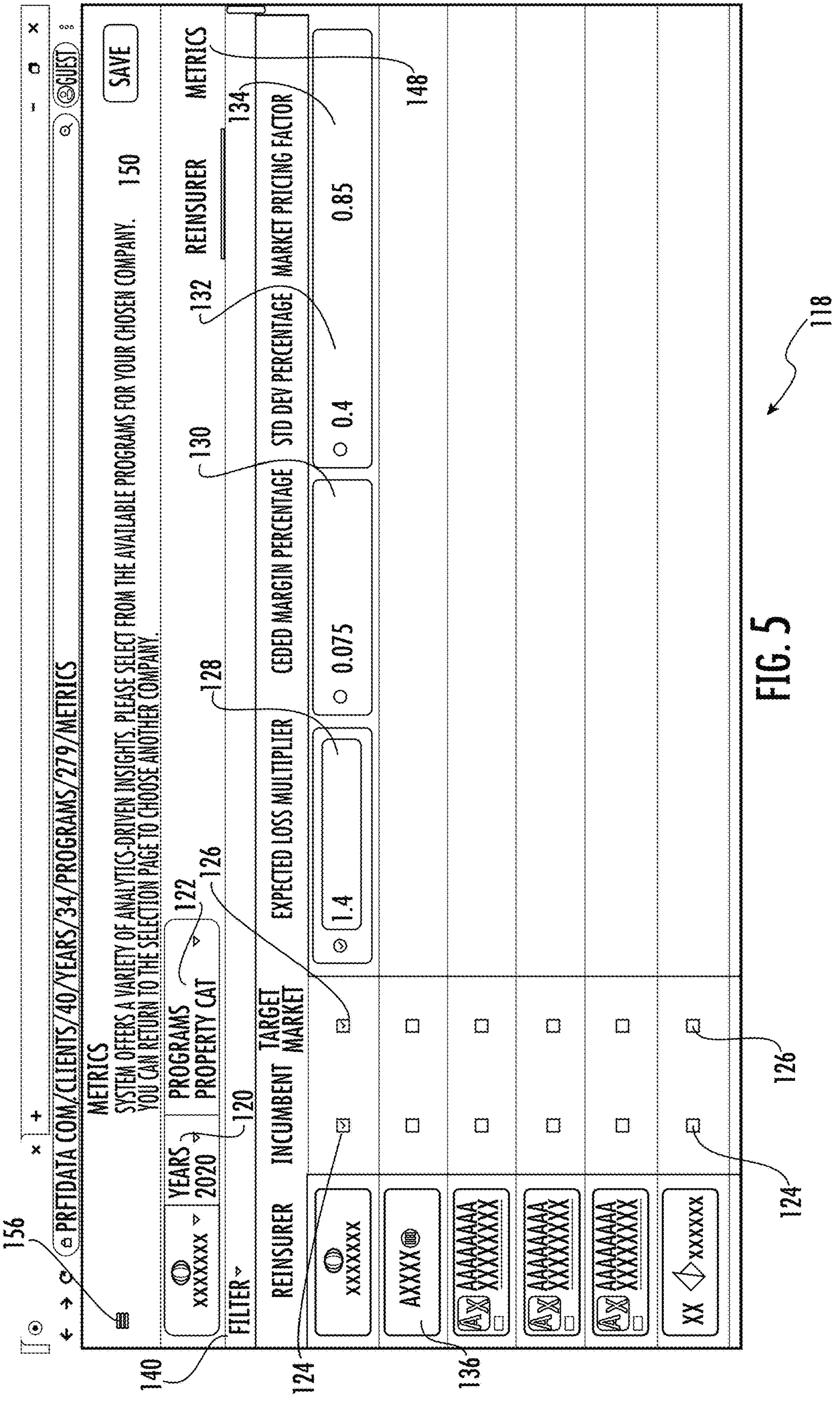
FIG. 5 is a metric main display screen showing the user interactive graphical user interface for adjusting and weighting various broker factors and calibrating the systems to the broker's particular needs according to an aspect of the present disclosure.
Figure 8:
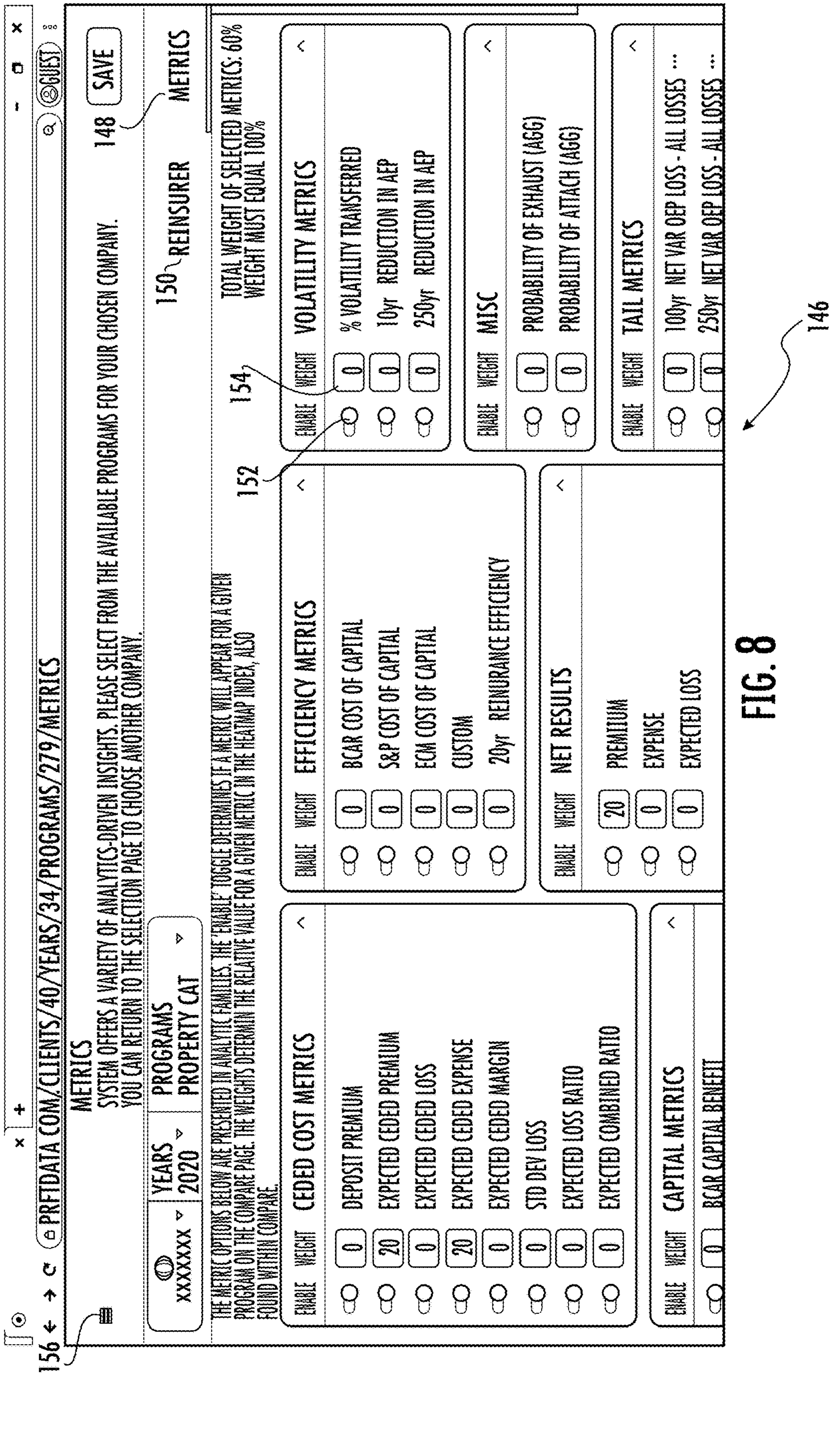
FIG. 8 is metrics weighting and customization input screen according to an aspect of the present disclosure.
Figure 9:
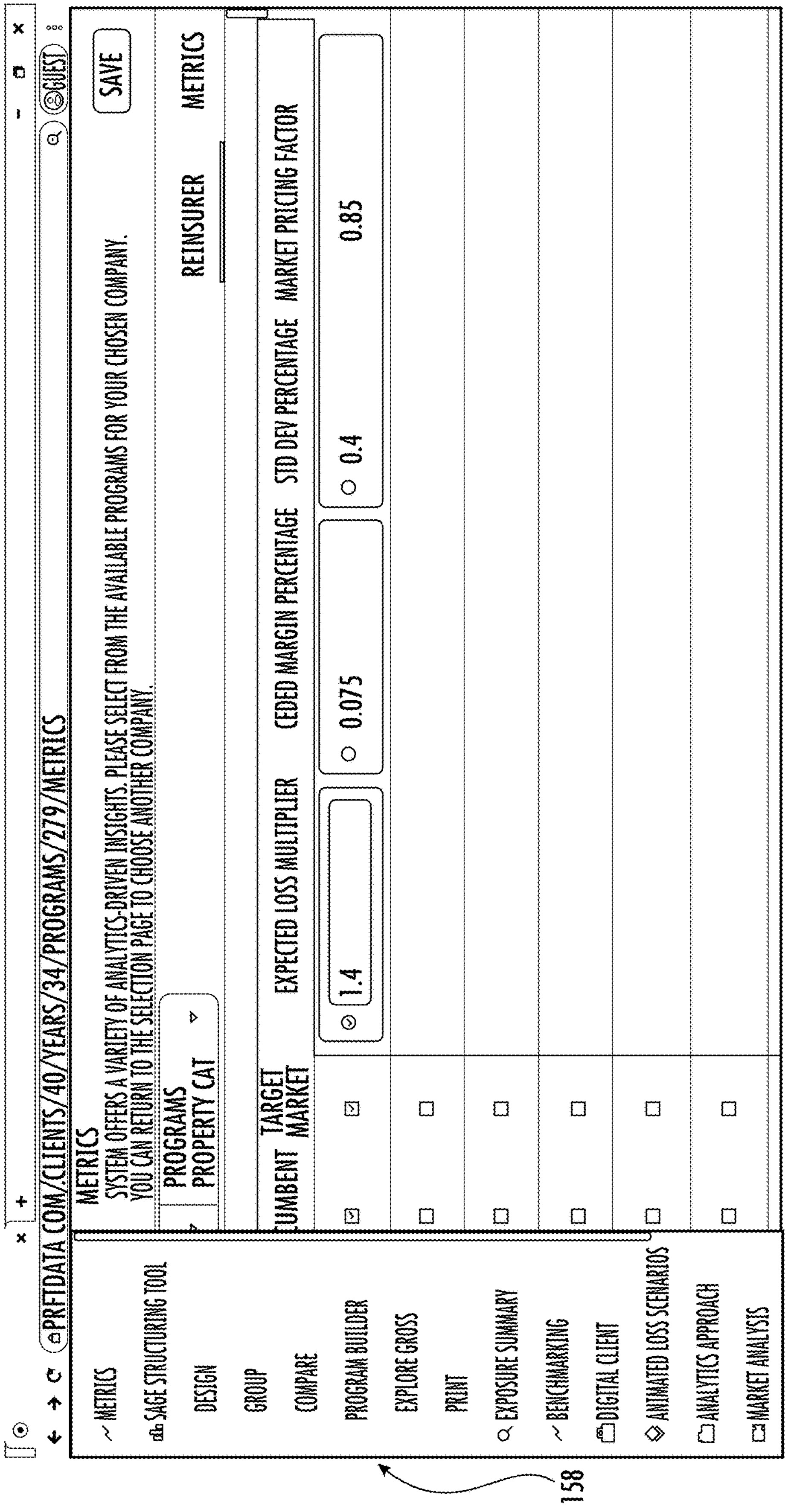
FIG. 9 is a display of the metrics main display's access menu to the main menu of a system according to an aspect of the present disclosure.

The displays shown in FIGS. 5 and 8 may be accessed via tabs 150 and 148 respectively. The input display screen of FIG. 5 provides interfaces for establishing reinsurer relations. The input display screen of FIG. 8 provides selectable preferred metric options for use in connection with the overall system. The user selects which reinsurers are defined as incumbents (existing reinsurer) or target markets (desirable new reinsurer) relative to the selected carrier (client), year, and program (line of business). The user then elects one of three technical premium calculation approaches to be used for estimation with each chosen carrier (incumbent and/or target market) for later use in other aspects of the systems of the present disclosure. The "Metrics" tab 148 is organized into analytical "families" that can be expanded or collapsed for easy viewing purposes and within each there is a series of controls presented for customizing metric results in other parts of the systems of the present disclosure when analyzing reinsurance constructs, for example. The first control is a toggle 152 which determines if a given metric is or is not included on the "Compare" page view (See FIG. 38, for example) when comparing the financial impact of different reinsurance structure options. The second control is a data entry field 154 allowing the user to assign weights, as fractions of 100%, to each metric for the purpose of calibrating a custom metric weighted average rank feature depicted in other parts of the systems of the present disclosure. Choices made in both Metrics subsections are written to an API for database storage when the user clicks the "Save" button. There are dozens of key metrics to consider when deciding which coverage structure optimizes risk transfer. Uniquely, the systems of the present disclosure allow users to select those metrics most important to them and features them throughout the decision-making process within the system.

Figure 10A:
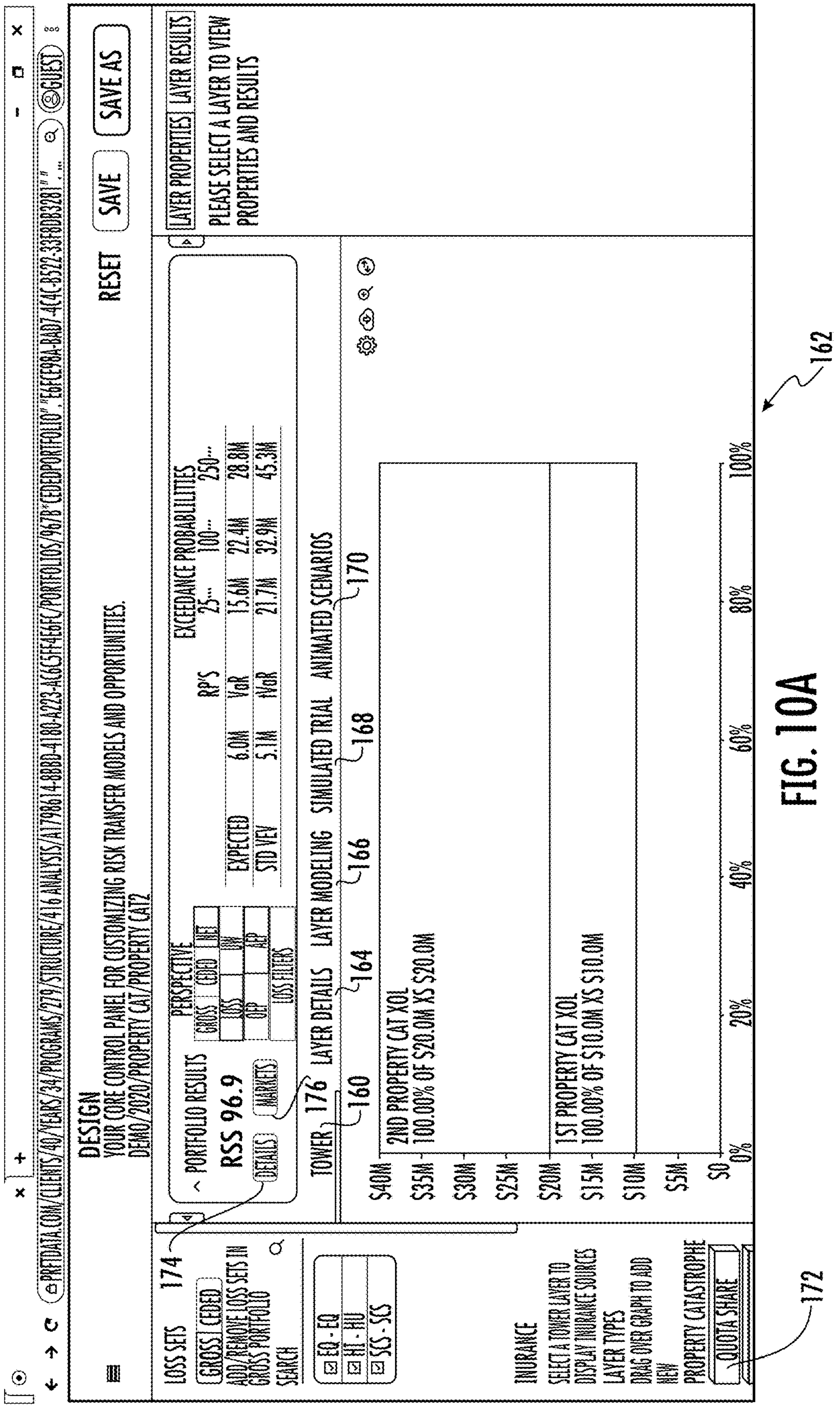
FIG. 10A is a first part of an insurance/reinsurance structure creation/design graphical user interface tool according to an aspect of the present disclosure.
Figure 10B:
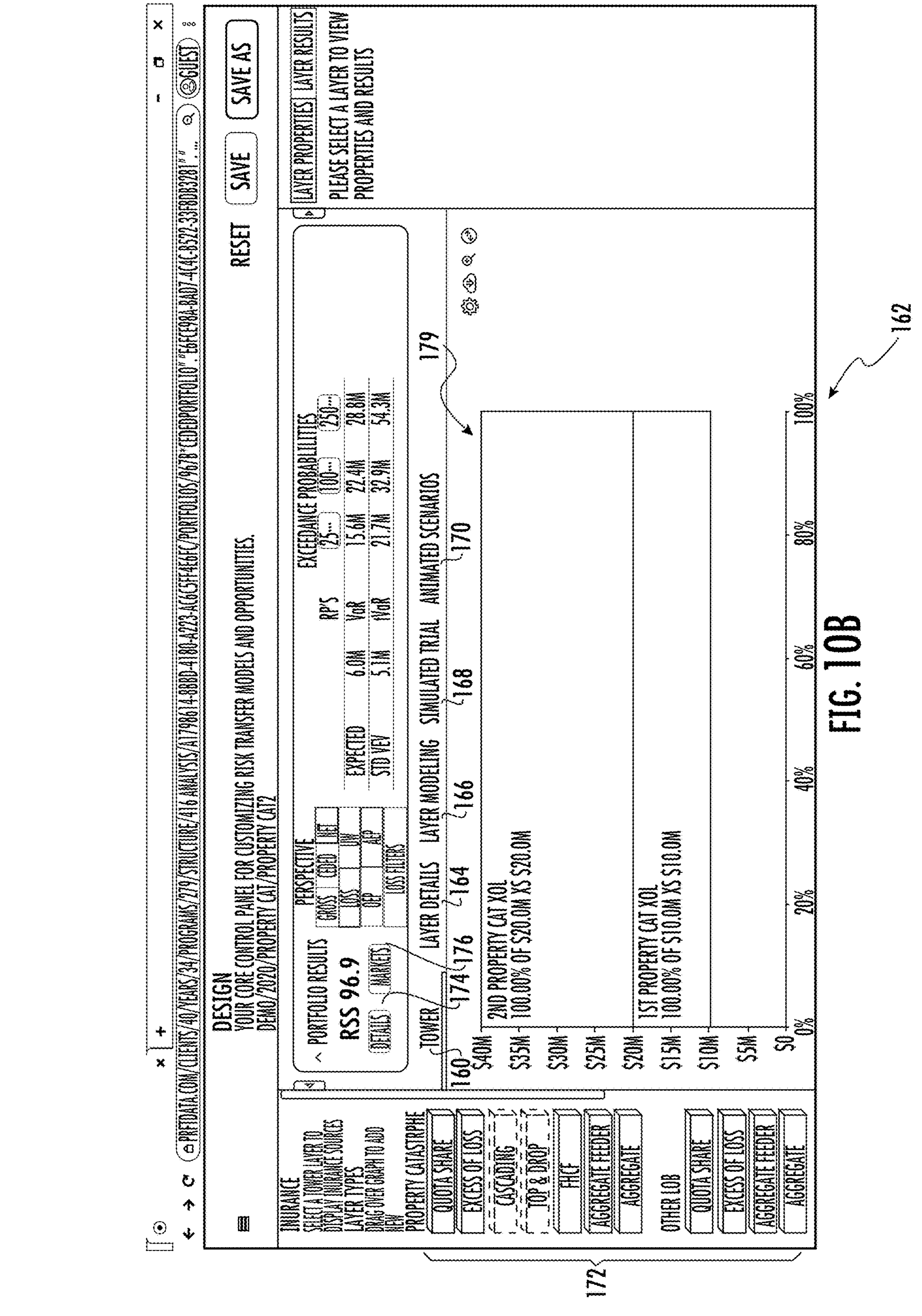
FIG. 10B is a second part of an insurance/reinsurance structure creation/design graphical user interface tool action to an aspect of the present disclosure.

As shown in FIGS. 10A and 10B, the design page of the systems of the present disclosure, displays a variety of details, but centers around the construction of at least one, but can include a plurality of different insurance/reinsurance structures, which are generated under the tower sub-menu tab 160. The main design page 162 includes a variety of different sub-tabs and information display sections. The tabs typically include a tower tab 160 and a layer details tab 164. During construction of a proposed insurance/reinsurance structure, the user may select a type of coverage from the left column (FIGS. 10A-B). The types of coverage are represented by differently colored and labeled boxes 172. Exemplary selections under the property and catastrophe tab include a quota share coverage, excess of loss coverage, cascading loss coverage, top and drop coverage, FHCF (Florida Hurricane Catastrophe Fund), aggregate feeder, and aggregate coverage. The "Other LOB", or Line of Business coverage, may also be selected. Quota share is a pro-rata reinsurance contract in which the insurer and reinsurer share premiums and losses according to a fixed percentage. Quota share reinsurance allows an insurer to retain some risk and premium while sharing the rest with an insurer, up to a predetermined maximum coverage. It is a way for an insurer to boost and preserve some of its capital. Excess of loss reinsurance is a type of reinsurance in which the reinsurer indemnifies or compensates the ceding company for losses that exceed a specified limit. Cascading coverage is a feature that provides multi-event protection where higher coverage layers drop down to cover lower layers. A "Top and Drop" contract provides a clause to reuse the top excess-of-loss layers in a reinsurance structure if the retention on the top layer is not breached by a first loss event. For example, following a catastrophic event, if the layer remains intact, it acts as a reinstatement on one or more of the lower layers (the "drop"). Top and Drop coverage enables an insurer to buy a top layer of coverage for a first loss event for a competitive premium, knowing that if the top layer capacity remains unused, it will automatically drop down to cover further events. The Florida Hurricane Catastrophe Fund (FHCF) is structured as a tax-exempt state trust fund under the direction of the State Board of Administration in the State of Florida. The purpose of the FHCF is to protect and advance the State of Florida's interests in maintaining insurance capacity in Florida by providing reimbursement to insurers for a portion of their catastrophic hurricane losses.

Figure 11:
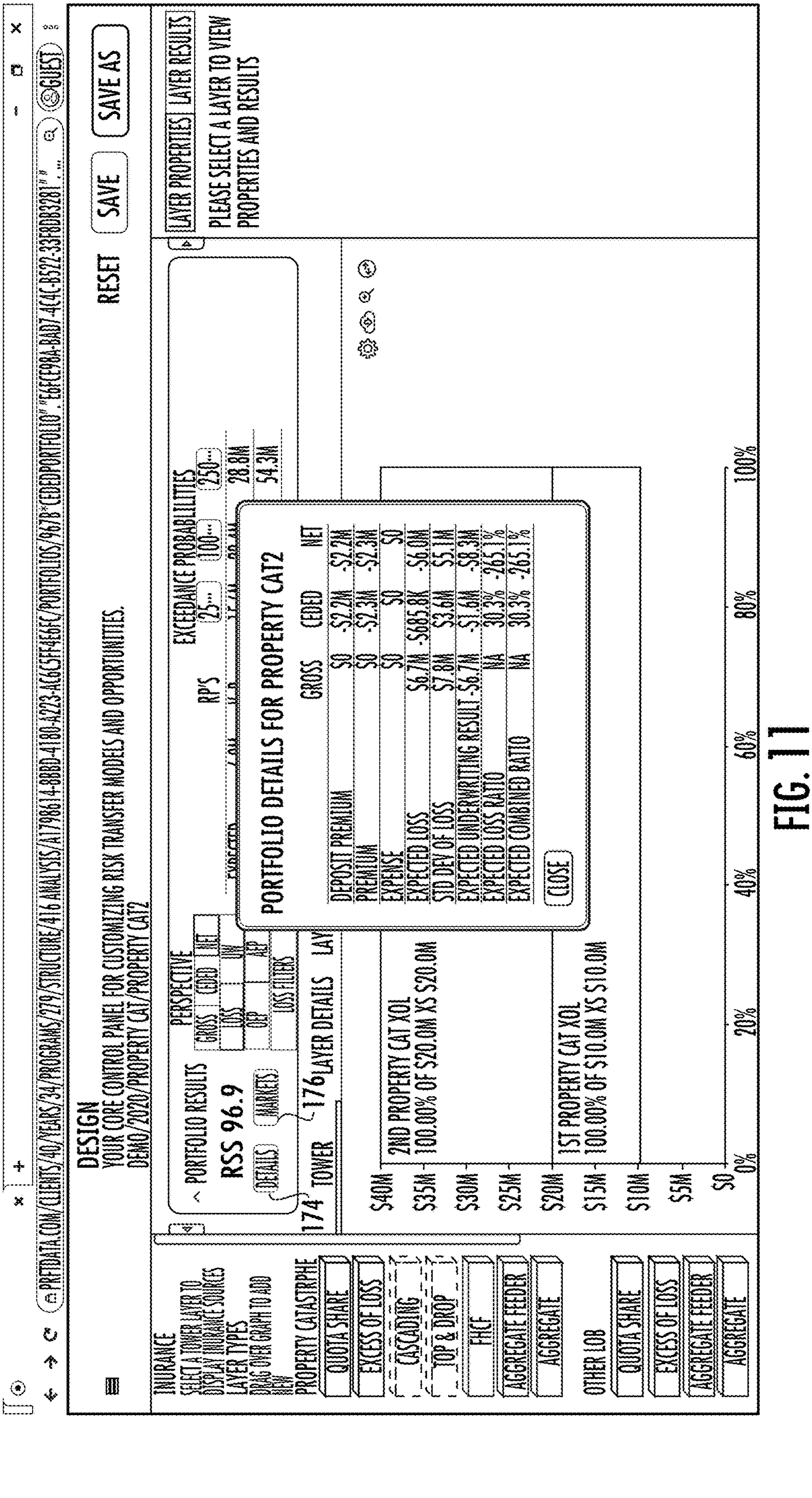
FIG. 11 is a graphical user interface and display of the details of a proposed composite tower structure of insurance/reinsurance coverage created using the coverage structure designing tool according to an aspect of the present disclosure.

During construction of the insurance/reinsurance structure, the user can select a type of coverage and drag and drop the proposed coverage onto a graphical display user interface for the structure being created. Significantly, the structure shows coverage from 0-100% and does not exceed 100% of the total coverage. The Y axis may be adjusted, depending on the amount of coverage sought. As shown in FIGS. 10A, 10B, and 11, two separate layers of property casualty insurance are shown, with one beginning at $10,000,000 and ending at $20,000,000, and the other beginning at $20,000,000 and ending at $40,000,000. Each layer of the proposed tower structure covers up to 100% of those losses. However, more complex structures, including a variety of additional layers and layers covering different percentages may be employed and analyzed using the systems of the present disclosure. Additionally, the layers may be adjusted by the user by selecting a side or corner of the graphically displayed layer and intuitively moving the selected location to a new position on the grid. Additionally, layers can be simply deleted by selecting and deleting the layers. Furthermore, upon selecting the details link, real time analytic data can be provided to the user, based on the structure created. The details in numerical, and not graphical, display form, are then shown, as graphically illustrated in FIG. 11. These are the details of the proposed composite structure created by the user and the accompanying financial numbers resultant therefrom. The systems of the present disclosure produce analytics on the capital efficiency of a proposed structure based on how a cedent organizes its book of business. Systems of the present disclosure do this in a real time fashion that is meaningful, relevant and in the vernacular of the cedent.

Figure 12:
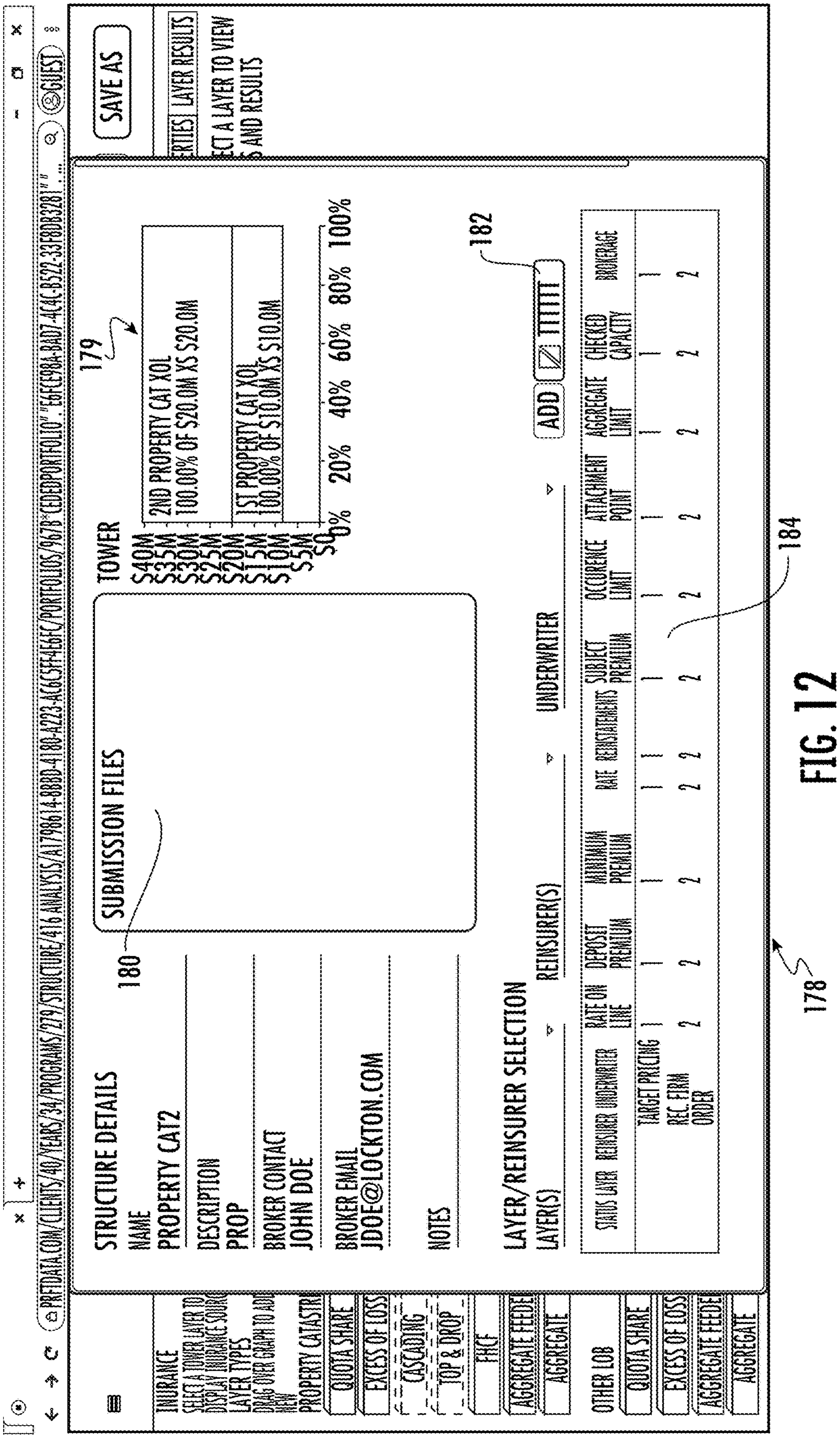
FIG. 12 is request for quote review, tracking, and evaluation graphical user interface and display according to an aspect of the present disclosure.
Figure 48A:
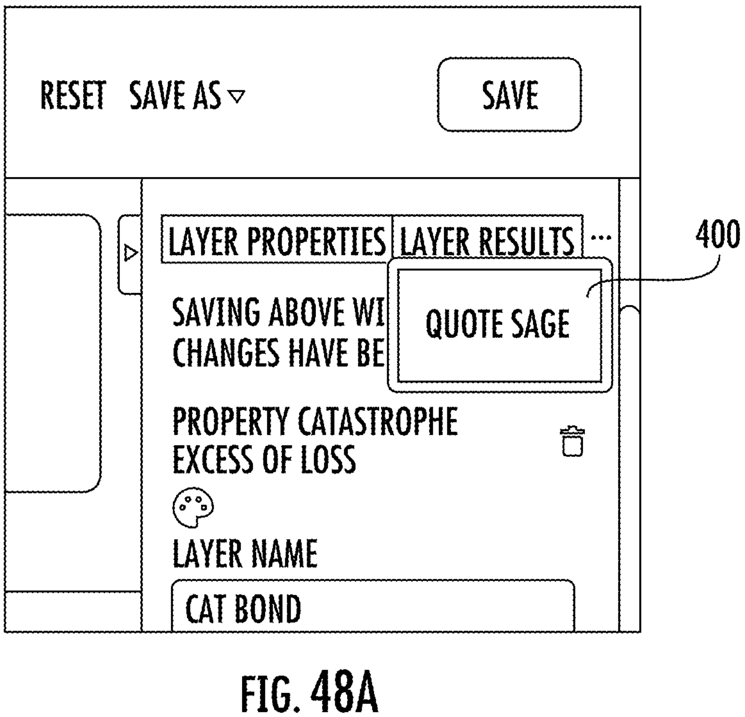
FIGS. 48A and 48B show the ability of the systems of the present disclosure to request and automatically transmit a request for quote to any of a variety of user selected markets electronically linked to the systems of the present disclosure without any further interaction from the user with other systems.
Figure 48B:
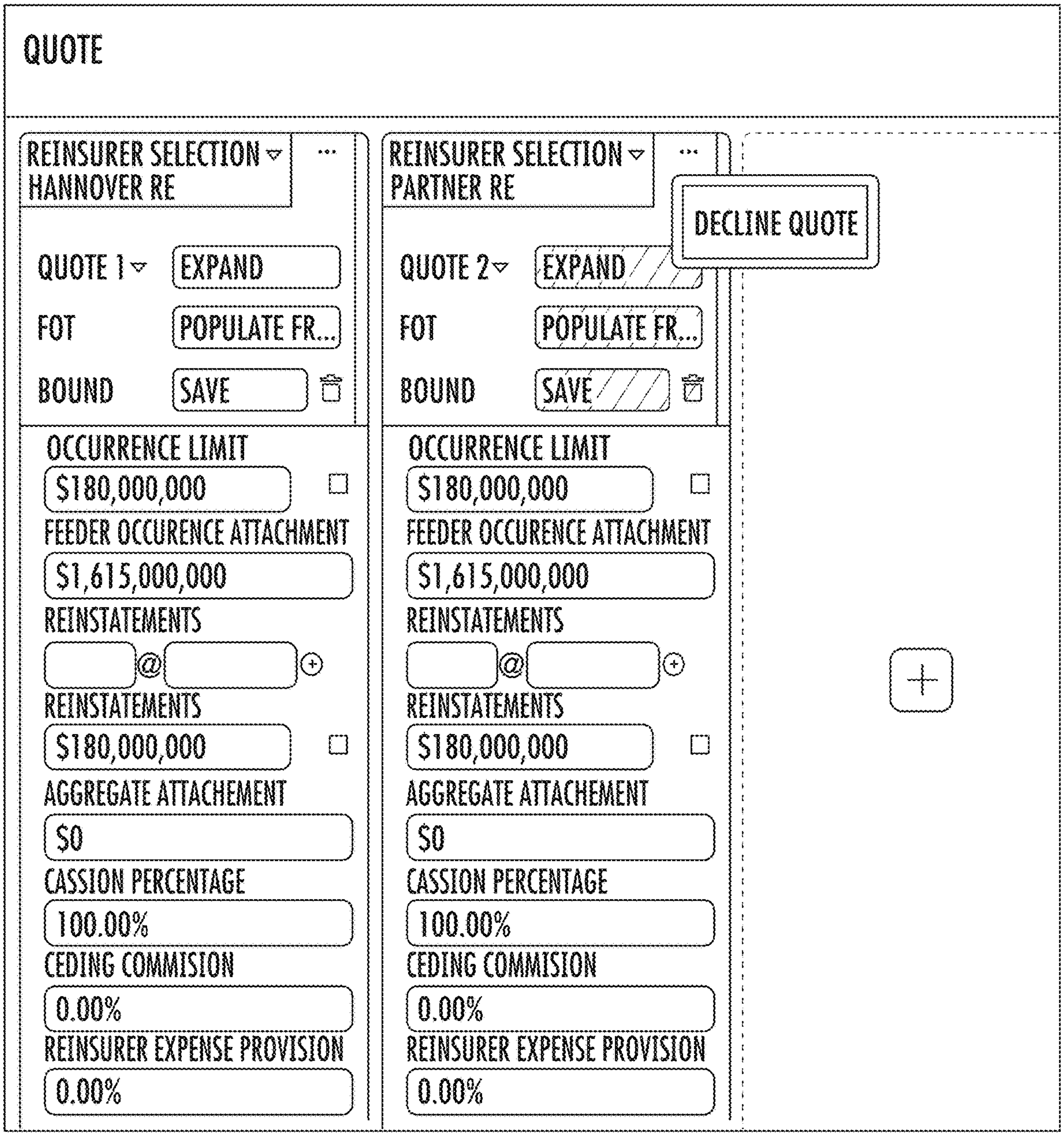

FIG. 12 shows a structure detail view 178 produced by accessing the "Markets" link 176 in FIG. 11. The submission files portion of this view 180 displays the files received from a client that are then able to be transferred to a potential reinsurance provider. The broker typically prepares these submission documents. This page also displays a graphical representation 179 of the insurance/reinsurance structure prepared by the user. Additionally, this page provides an auction service activation request link 182, which serves to send the proposed reinsurance structure to an auction, such as a double-blind auction to purchase the coverage shown graphically in the structure. The display also includes a "Tracking Table" 184 for displaying and tracking quotes received, based on the reinsurance tower structure prepared once requests for quotes are made. Quotes can be sent through the system using a client's provided information directly through the systems of the present disclosure to individual reinsurance providers or requests can be sent to a reinsurance auction service, such as Tremor. The system of the present disclosure typically communicates with an API of the auction site and is able to provide monitoring and complete auction information, all within the systems of the present disclosure. The ability to request a quote directly from the system of the present invention may be accessed through a link on each page, but in particular a link on the program builder page, typically after various adjustments to individual layers are evaluated using the system. This is shown in FIGS. 48A and 48B. FIG. 48A shows an exemplary link 400. The index and summary of the various quotes received using the systems of the present disclosure are graphically shown for evaluation and potential decline or acceptance as shown in FIG. 48B. Two quotes received are shown. The ellipsis is used to indicate more selectable information is accessible to the user. When the ellipsis is selected the pop-up ability to accept or decline (shown in FIG. 48B) may be selected and the declination or acceptance is communicated to the offering party. When declined, the information for that particular quote is typically removed from the summary of quotes received.

The data provided from the client into the system and needed to provide the reinsurance quote is encrypted. Systems of the present disclosure receive detailed information from an individual cedent or broker into the system via submission files, translate that information, which is typically provided in some database structure, often with different headings or terminology then employed by the system; however, the system translates via an API the received information from the cedent into the system of the present disclosure while maintaining the original document without alteration, such that the original document can be provided to potential reinsurance providers when a request for quote is made. In this manner, the systems of the present disclosure provide a uniform terminology for use for all cedents while maintaining data received from a given cedent or broker in its original form and intact, such that it may be provided in its original form to potential reinsurers or other providers of coverage.

Figure 13:
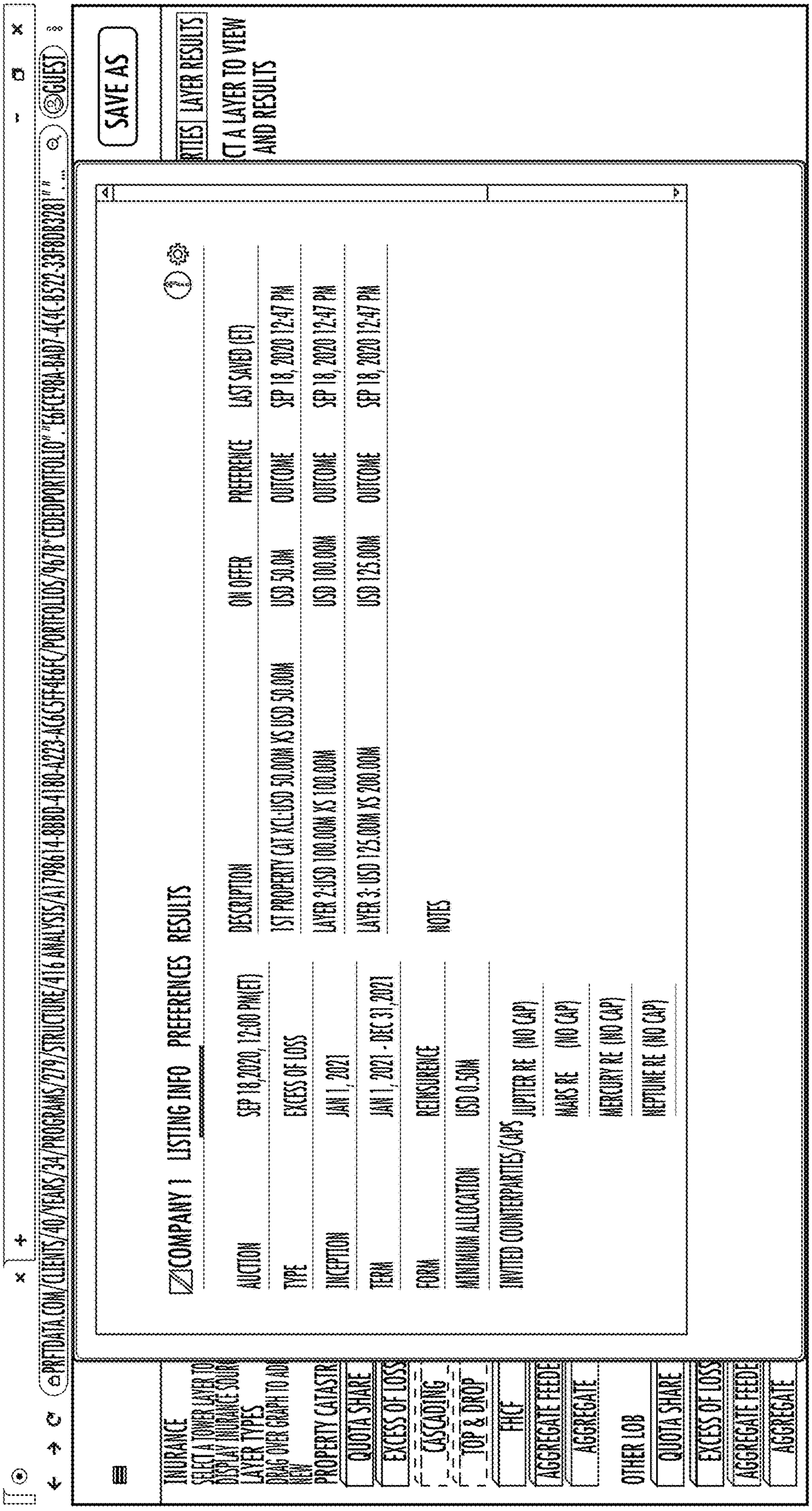
FIG. 13 is an insurance/reinsurance auction review and evaluation graphical user interface and display according to an aspect of the present disclosure.

FIG. 13 shows a reinsurance auction review and evaluation graphical user display 186 showing, entirely within the system of the present disclosure, all relevant detailed information about the auction for reinsurance coverage requested by the user for a given insurance/reinsurance structure.

Figure 14:
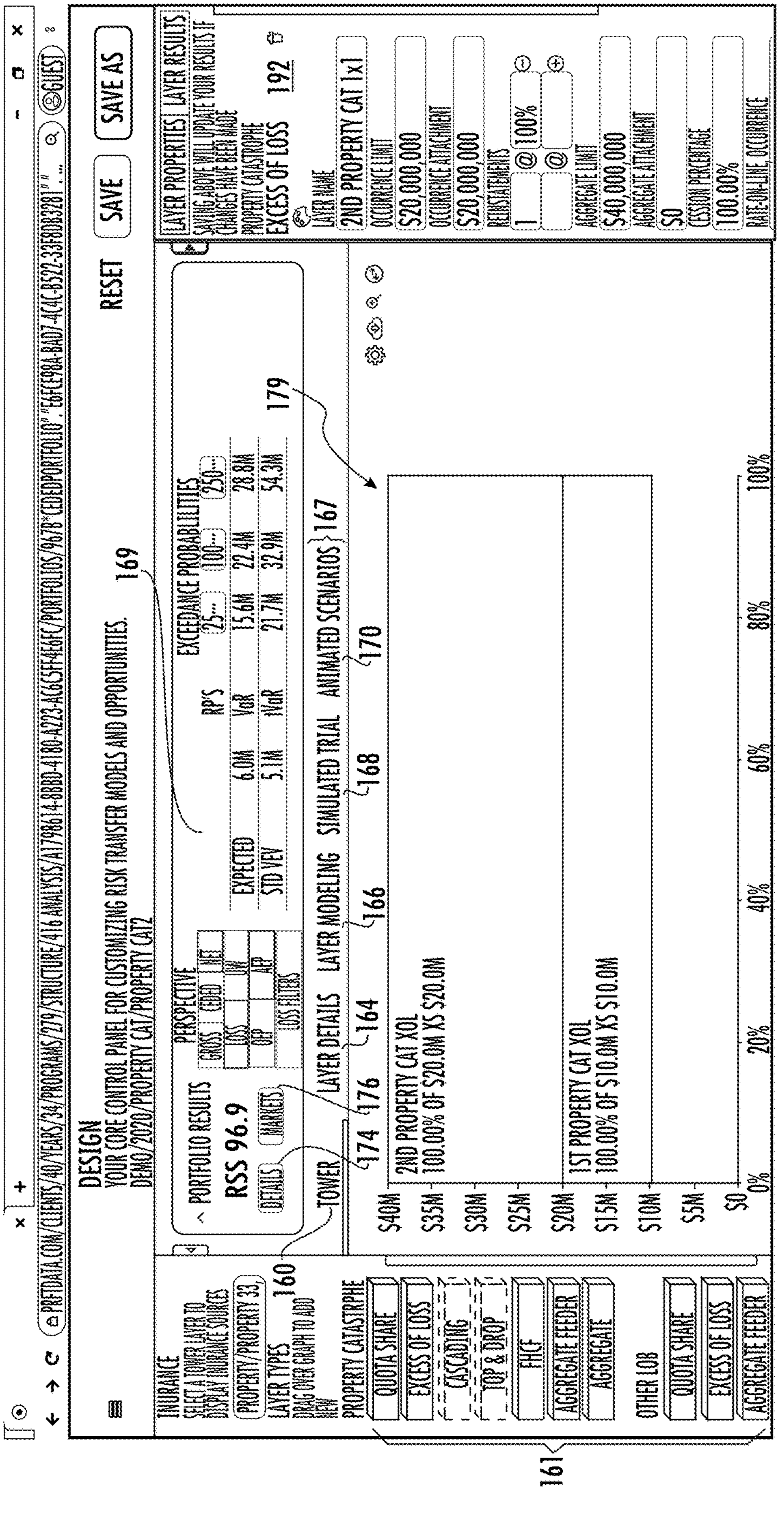
FIG. 14 is a graphical user interface and display of a proposed composite structure of insurance/reinsurance coverage created with one layer of the coverage structure highlighted and the numerical properties of the layer selected displayed immediately adjacent to the right of the structure for ease of reference, analysis and change by the user according to an aspect of the present disclosure.
Figure 15A:
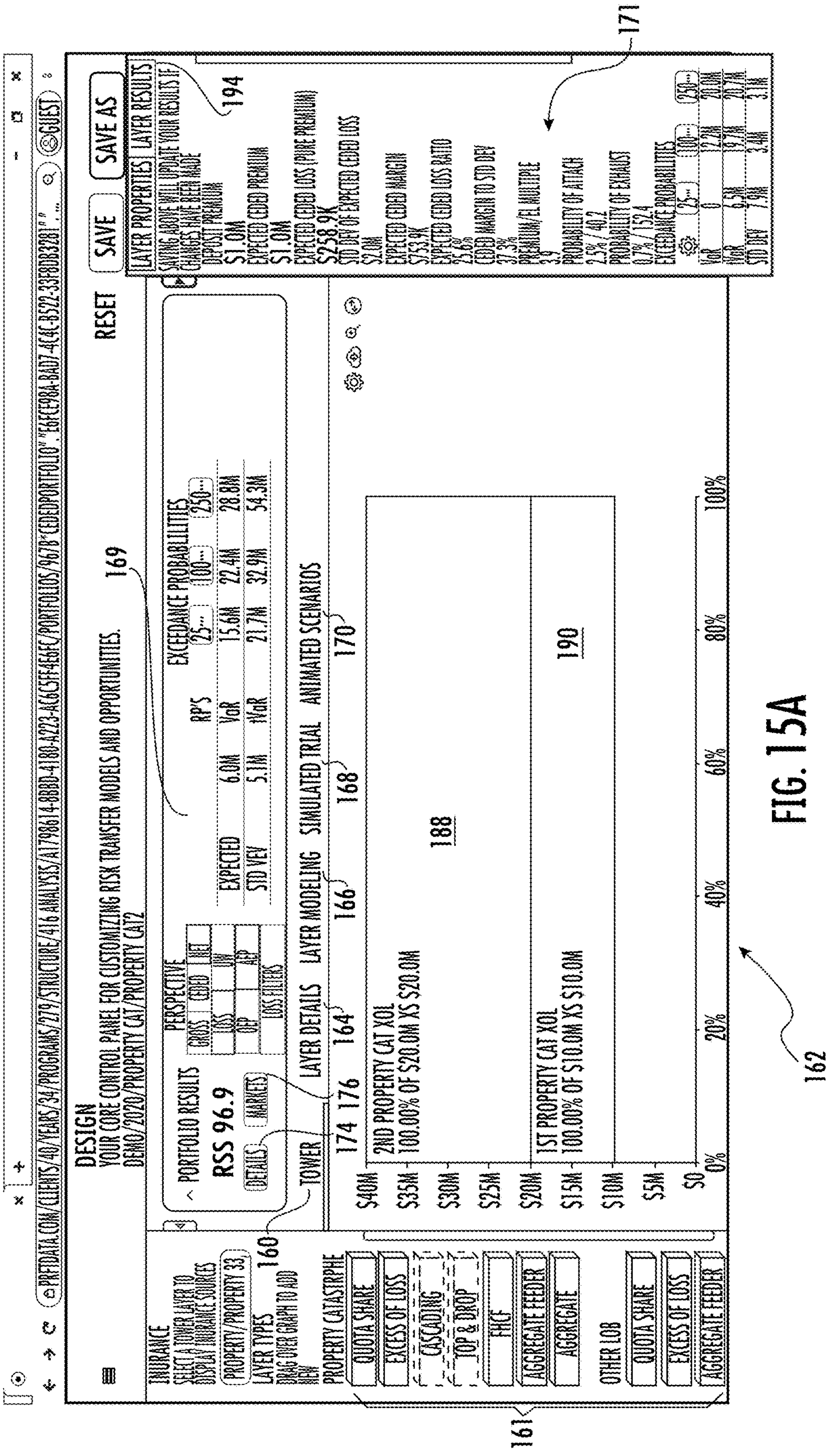
FIG. 15A is a graphical user interface and display of a proposed composite structure of insurance/reinsurance coverage created with one layer of the coverage structure highlighted and displaying the "layer results" data of quantitative evaluation analytics for the selected layer of the structure according to an aspect of the present disclosure.
Figure 15B:
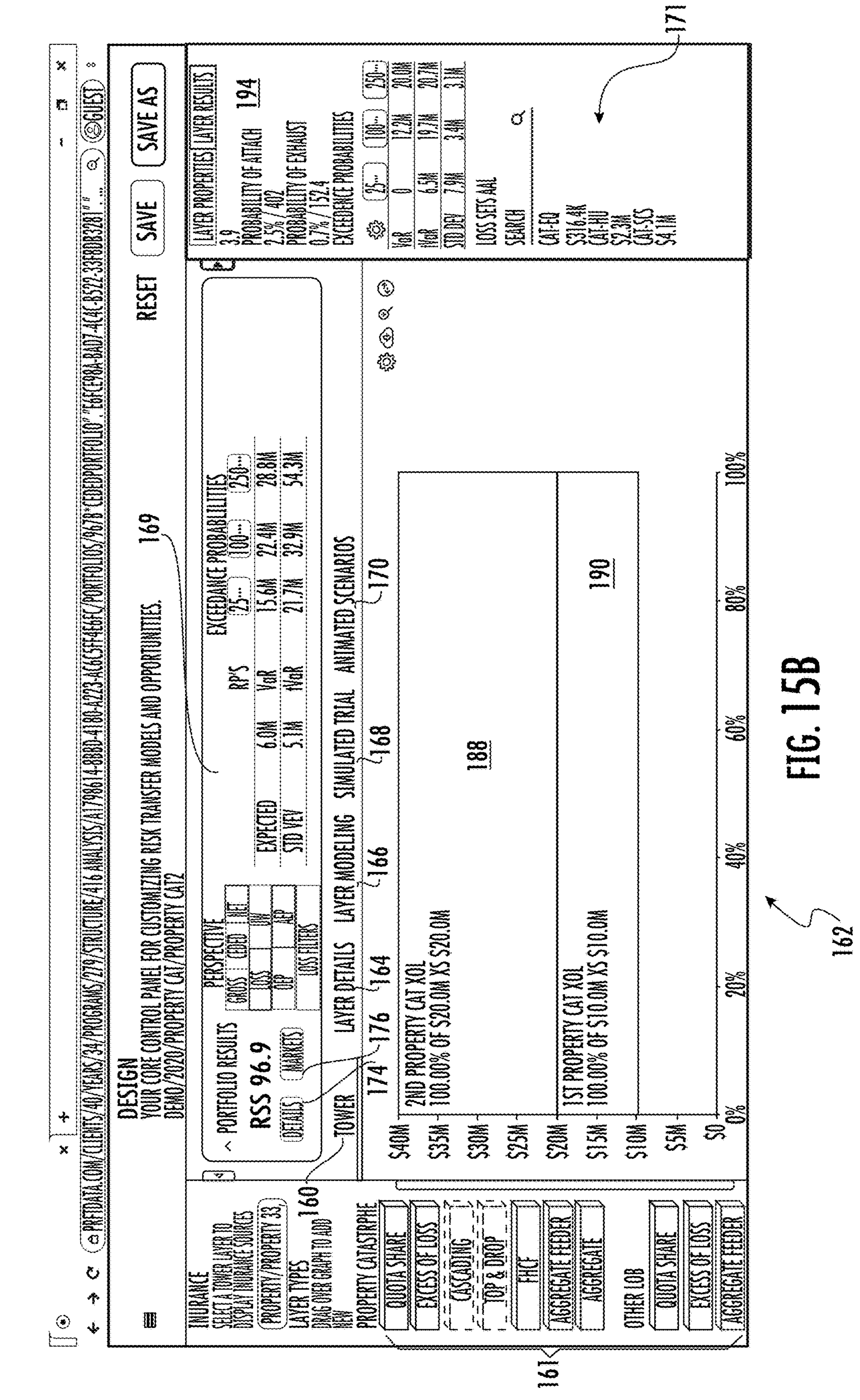
FIG. 15B is a graphical user interface and display of a proposed composite structure of insurance/reinsurance coverage created with one layer of the coverage structure highlighted and displaying the additional "layer results" data of quantitative evaluation analytics for the selected layer of the structure not shown in FIG. 15A, but accessed by the user by moving the side scroll portion downward according to an aspect of the present disclosure.

FIGS. 14, 15A and 15B show the layer of properties 192 (FIG. 14) for the selected layer, in this case the top layer ("2nd Property Cat XOL"), and the layer results 194 (See FIG. 15B) for the layer 188 in FIGS. 15A and 15B. FIGS. 15A and 15B show the entirety of the scrollable column on the right-hand side of the display to the user. As shown in FIG. 14, upon selecting a given layer, the quantity of details of the layer depicted by the rectangular block selected by the user are shown. Significantly, during the design process, there is no other location where a proposed layer may be placed in the user's graphical user interface, other than within the graph from 0% to 100% and along the Y axis. If a layer is to be amended, it can be done so within that confined area or deleted. In this manner, a more efficient use of space with the graphical user interface and clearer use parameters are provided to the user. This configuration also allows the layered properties and layered results and other numerical detailed information for the overall layer (shown immediately above the tower structure and the figures) to be displayed to the user simultaneous with the proposed insurance/reinsurance structure. As discussed elsewhere herein, the integration of the systems of the present disclosure with catastrophic predictive actuarial loss data provides immediate feedback in real-time for the likely effects of certain proposed insurance/reinsurance structures. The layer results details tab 194 displays details for a particular layer. These details include the probability of attachment and probability of loss.

Figure 27:
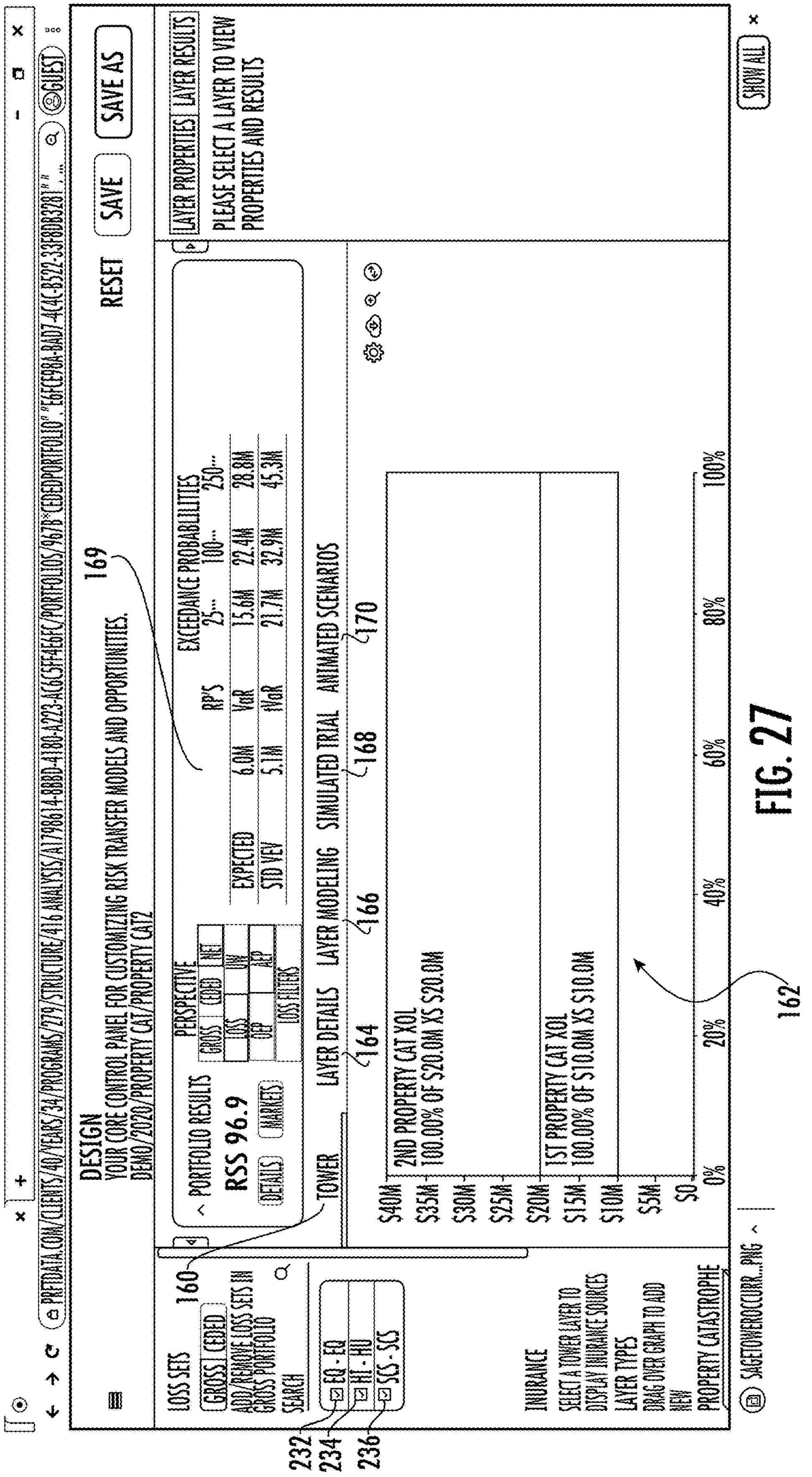
FIG. 27 is a graphical user interface of an aggregate tower of coverage created by the user according to an aspect of the present disclosure.

FIG. 14 presents a customizable graphical diagram for building new or modifying existing reinsurance constructs, as well as displaying relevant analytics obtained live and dynamically from a backend computation engine using a fixed defined loss(es) set of the present disclosure. Typically, as discussed previously, the data utilized is from both third-party databases on historical losses as well as data specific to the cedent and the data works conjunctively to provide dynamic predictive insurance/reinsurance coverage analytics. The user interface shown in FIGS. 14 and 27 show the design of the present system primarily designed around four core sections: a left-hand menu providing options (not all of which are shown in FIG. 14 due to the scrolling bar nature of the display of information) for reviewing associated loss sets by peril/event or other dimension, an insurance relationship summary, and a variety of drag and drop layer "LEGOS®" (rectangular portions 161) in support of building or editing activities for a given insurance structure; a center panel housing a tabular menu for accessing multiple features 167, including the primary reinsurance construct's visualization, a grid depicting relevant layer details 164, a bubble scatterplot with user customizable X, Y, and Z metric/dimension options under the layer modeling tab 166, and a simulated trial scatterplot which compares gross vs. ceded underwriting results in an interactive visualization under the simulated trial tab 168; a center panel banner 169, which hosts Portfolio Results and a series of interactive controls for reviewing expected loss, volatility, and exceedance probabilities across Gross, Ceded, Net perspectives, on a loss or underwriting basis, and for per occurrence vs. aggregate scenarios; and a right-hand menu 171 providing multiple panels for layer property data entry and layer metric results.

As discussed elsewhere herein, the aforementioned custom construct visualization provides the user with the ability to resize and reposition all layers within a reinsurance program using intuitive mouse-driven or tap-driven (mobile/tablet) operations. Users may click a single layer to display all associated properties in the right-hand menu. Users may specify a variety of graphing properties towards customizing the display including Y-axis intervals, alternative limit scales, layer snap to grid behavior and maximum tower limit. Users may also click to export tower renderings to a PDF or an image format. Users may also employ a zoom control at multiple scales for inspection of especially complex reinsurance structures. Save and Save As buttons permit the user to commit their changes and receive near instantaneous analytical feedback from an API-driven computation engine, such as ANALYZE RE™, using a fixed defined loss(es) set of the present disclosure. The systems of the present disclosure create a unique, interactive & dynamic interface for the design of reinsurance constructs. Users can intuitively change complicated structures by straightforward mouse (computer interface) or finger (tablet-based) interaction. Users can create structuring options and receive real-time financial output. This is typically done on a graphical diagram extending on the X-axis to no more than 100% coverage, without any display beyond this limit and with options of the various types of reinsurance coverage or lines of business pictured/displayed adjacent (typically to the left, but essentially anywhere typically within visual access when the user also views the graphical diagram) the graphical display. This enables easy drag and drop of a type of reinsurance into the charted graphical diagram of coverage construct being created by the user.

Figure 16:
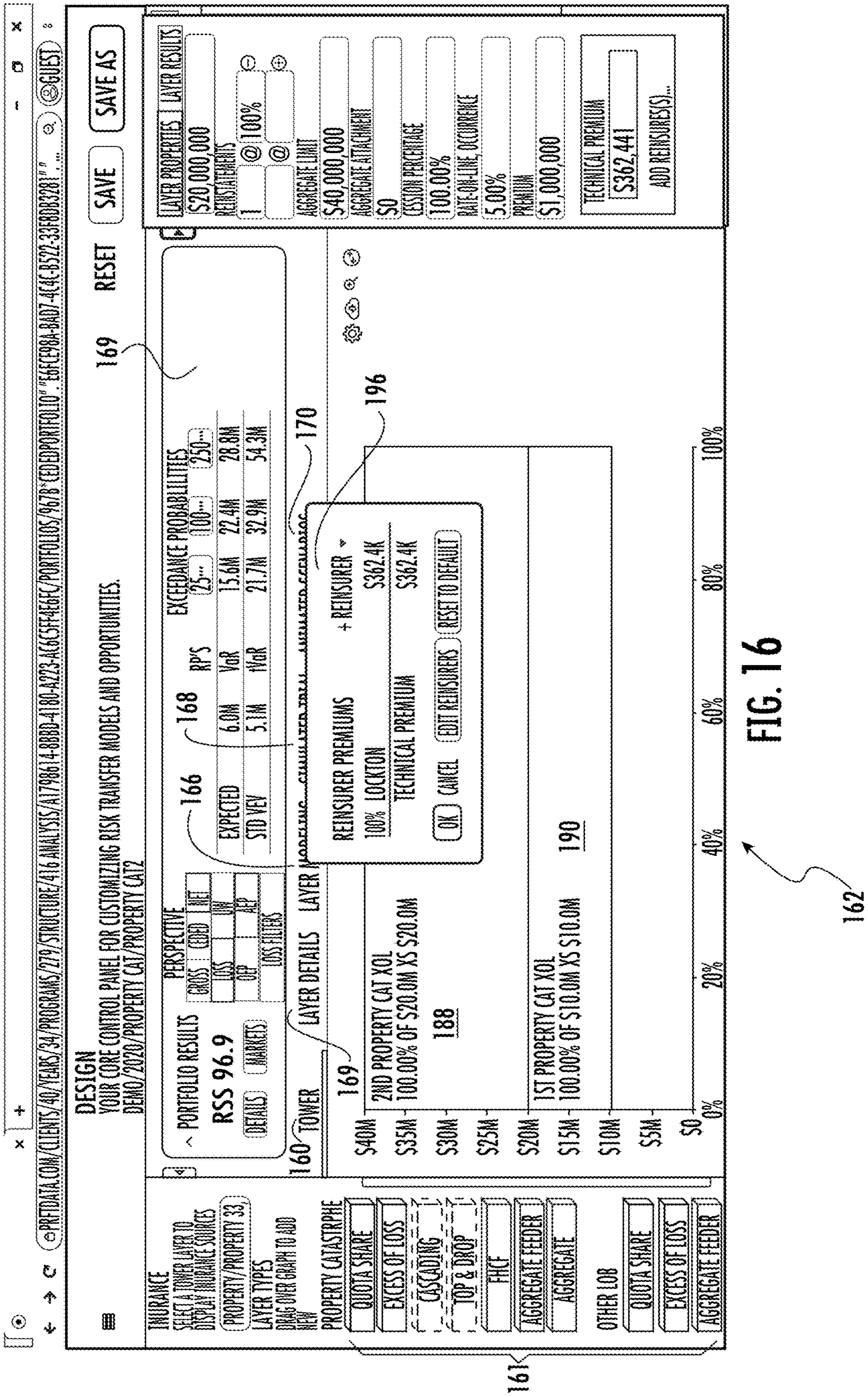
FIG. 16 is a graphical user interface and display of a proposed composite structure of insurance/reinsurance coverage created with one layer of the coverage structure highlighted and the numerical properties of the layer selected displayed immediately adjacent to the right of the structure for ease of reference, analysis and change by the user and displaying a detailed display of the broker anticipated quote for the premium for the coverage allowing real-time review of the anticipated premium for the coverage depicted by the layer selected according to an aspect of the present disclosure.

FIG. 16 shows one feature of the systems of the present disclosure within the layer properties tab of the design system. FIG. 16 shows the details of reinsurer's premiums in a pop-up window 196. This information provides an estimate for what each layer is likely to cost without affirmatively requesting a quote from any third-party insurer, based on past data for a given cedent and based on past figures and historical data of the likelihood of a given covered loss occurring. This information is uniquely provided by systems of the present disclosure due to its integration of both data received from the cedent and received from prior requests for quotes, based on similar layer constructs, as well as detailed historical data of frequency of past covered events occurring.

Figure 17:
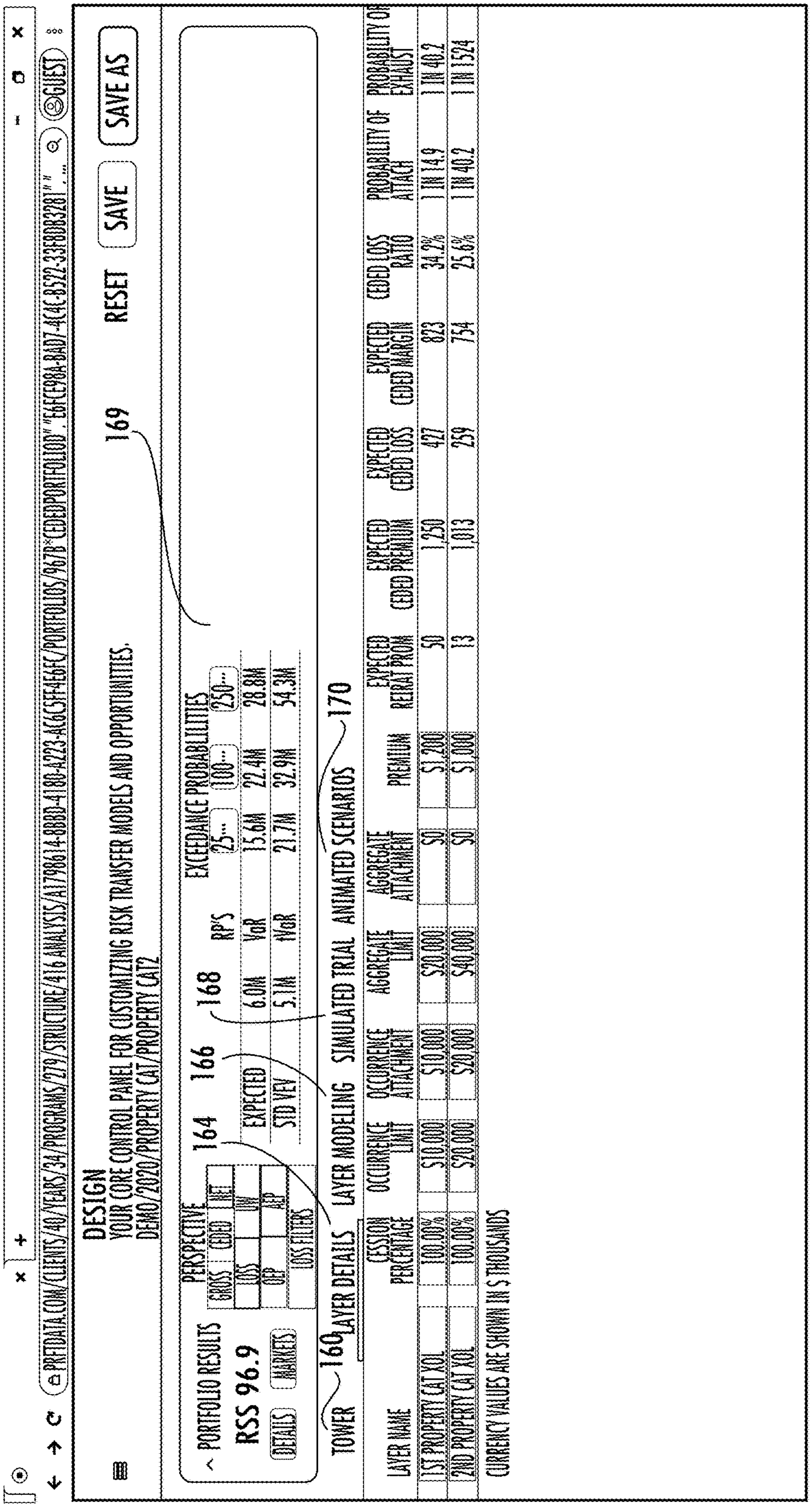
FIG. 17 is an alternative layer detail graphical display of the numerical data reflected by the structure layer(s) of the composite coverage structure shown by selecting the "layer details" tab of the graphical user interface instead of the "tower" tab graphical display of the same coverage structure layer(s) according to an aspect of the present disclosure.

As shown in FIG. 17, activation of the layer details tab 164 within the design sub-system of the present disclosure discloses quantitative details in a more traditional tabulated form than the graphical display shown previously in the tower tab view. This data is automatically adjusted and linked to the tower construct created by the user through dragging and dropping and adjusting boundaries using a user input device. Alternatively, these numbers can be adjusted, and the tower structure will be correspondingly modified automatically.

Figure 18A:
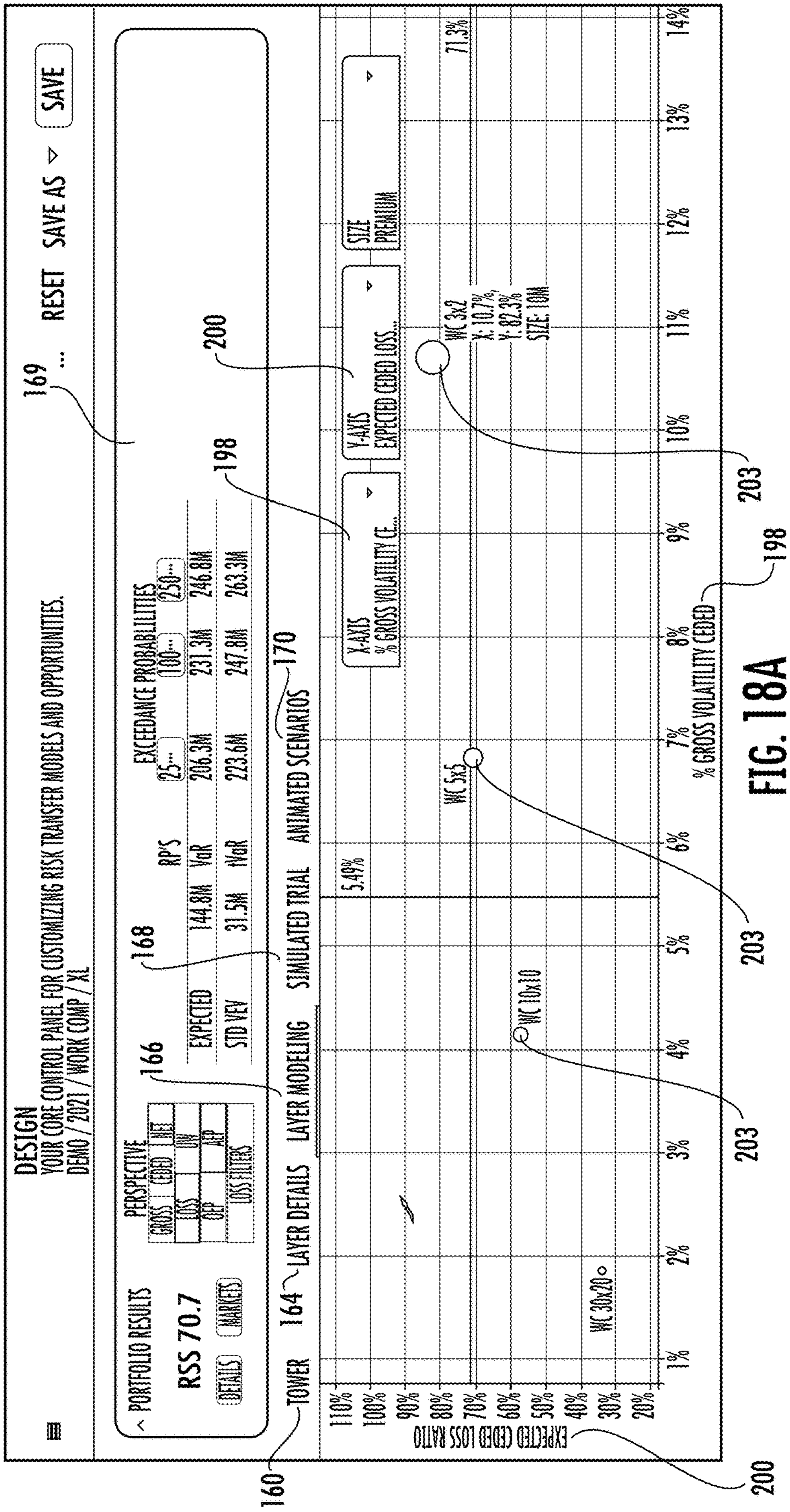
FIG. 18A is a graphical user interface that displays layer modeling based upon the user-selected parameters of the coverage structure created in the design tool to display visually in the graphical user interface along the X-axis and Y-axis and the size feature selected to display a representation of the layer modeled by the user according to an aspect of the present disclosure.
Figure 18B:
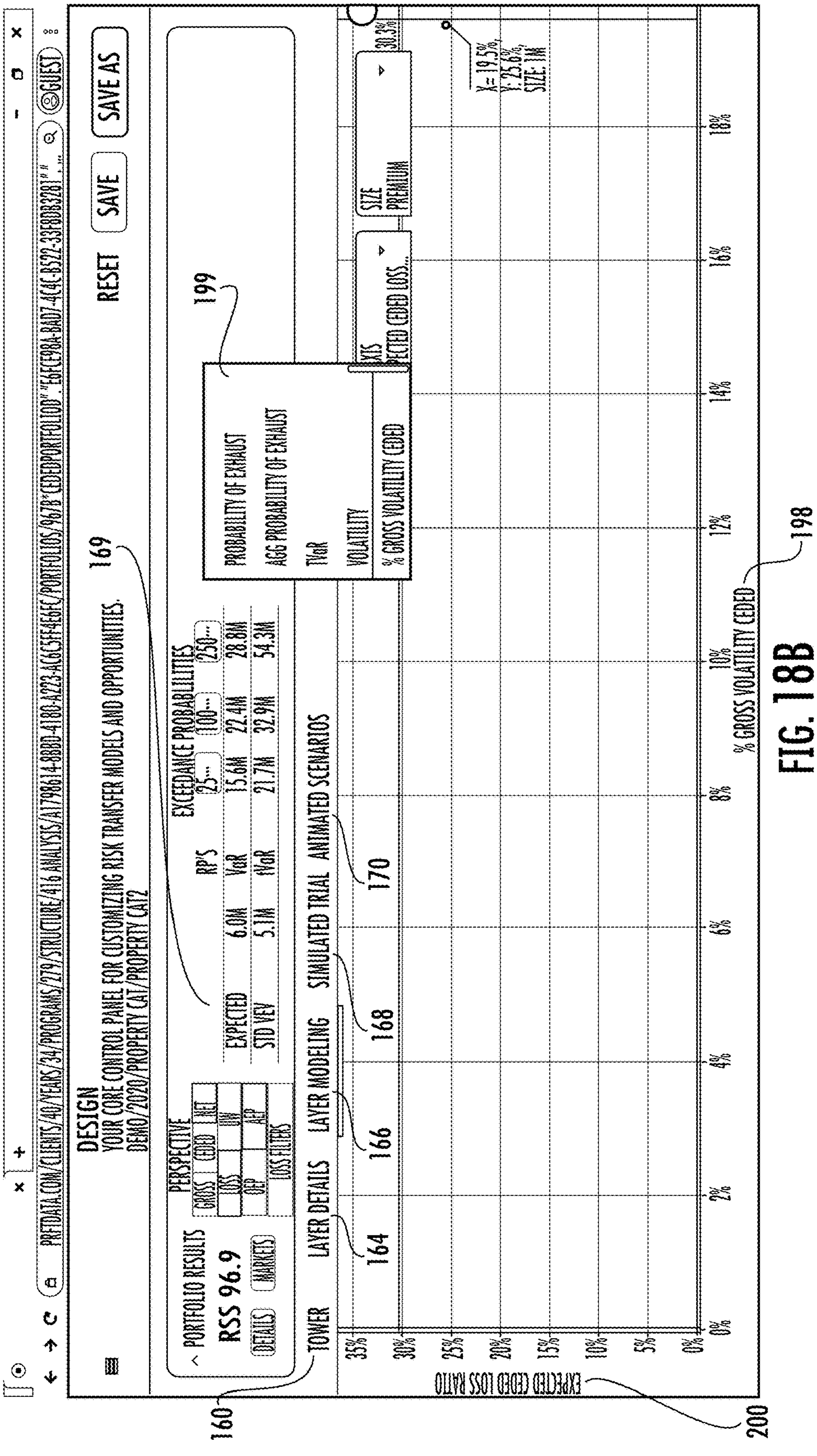
FIG. 18B is the graphical user interface shown in FIG. 18A and displaying the selectable features for the X-axis by the user to analyze the structure layer according to an aspect of the present disclosure.

As shown in FIG. 18A, the user can analyze the proposed insurance/reinsurance structure by layer modeling, selecting the layer modeling sub-tab 166. Within this tab, the user can adjust the X axis values 198 and the Y axis values 200 using user input boxes that produce drop down menus of alternative values to be used on either axis. Shown in FIG. 18A, the X axis depicts the percent gross volatility ceded and the Y axis the expected ceded loss ratio, whereas the size of the circular datapoints for a given layer 203 graphically depict the size of the premium for a given layer. Details of the given layer may be viewed by hovering over a given dot within the display or clicking on the circular dot, as well. FIG. 18B shows the drop-down menu selected values that can be changed for the X axis within the expanded user input box 199. These values can be changed by a system administrator and adjusted as necessary, but the systems of the present invention currently provide the ability to change the X axis to the percent volatility ceded, volatility, TVaR, the aggregate probability of exhaust, and the probability of exhaust. As discussed above, the systems of the present disclosure allow this graphic user interface to be customized to the individual insurance/reinsurance properties important to the user in conducting the valuation of a given layer of a proposed insurance/reinsurance structure.

Figure 19:
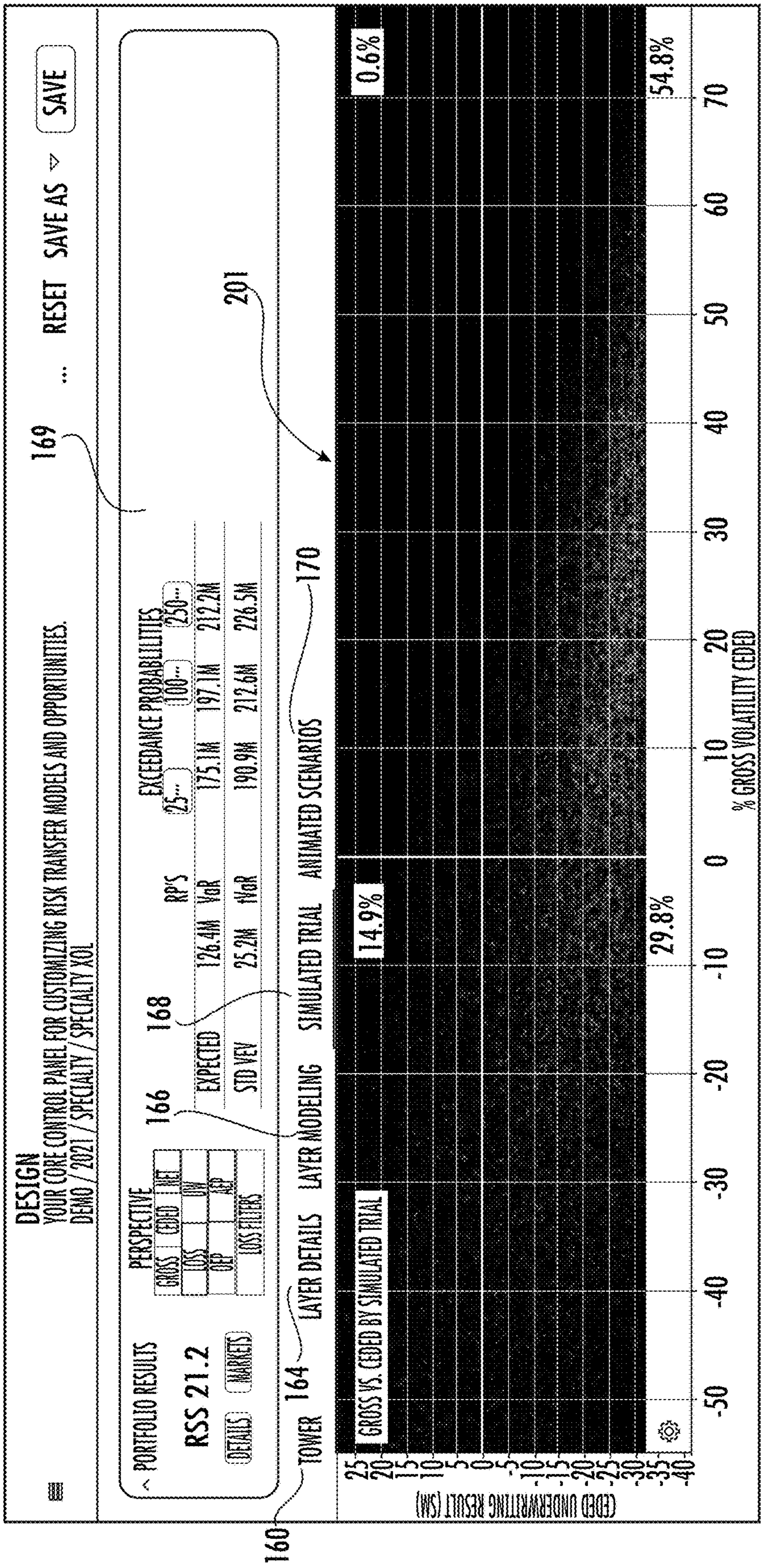
FIG. 19 is an interactive graphical user interface of a stochastic simulated trial/simulation of events based on a trial of 100,000 or more simulated events occurring with the results of each simulation shown in the scatter diagram with each dot representing a single simulation performed according to an aspect of the present disclosure.

FIG. 19 shows the view when the simulated trial tab 168 is selected. The simulated trial tab displays a stochastic modeling result 201. Stochastic modeling is used to help forecast the probability of various outcomes under different conditions using random variables. The systems of the present disclosure used stochastic modeling to review the results of coverage under a constructed insurance/reinsurance structure prepared by a user, based on randomized events occurring. Each simulation typically provides from 100,000 to 1,000,000 or more randomized scenarios, based upon historical data. In the case of catastrophic event coverage, this is historical data of the amount and type and location of various catastrophic events occurring and the effects of the occurrences of these events on the user-generated insurance/reinsurance structure. Each simulation result is shown as a dot on the X and Y axis of the simulated trial graphical display of FIG. 19.

Figure 20:
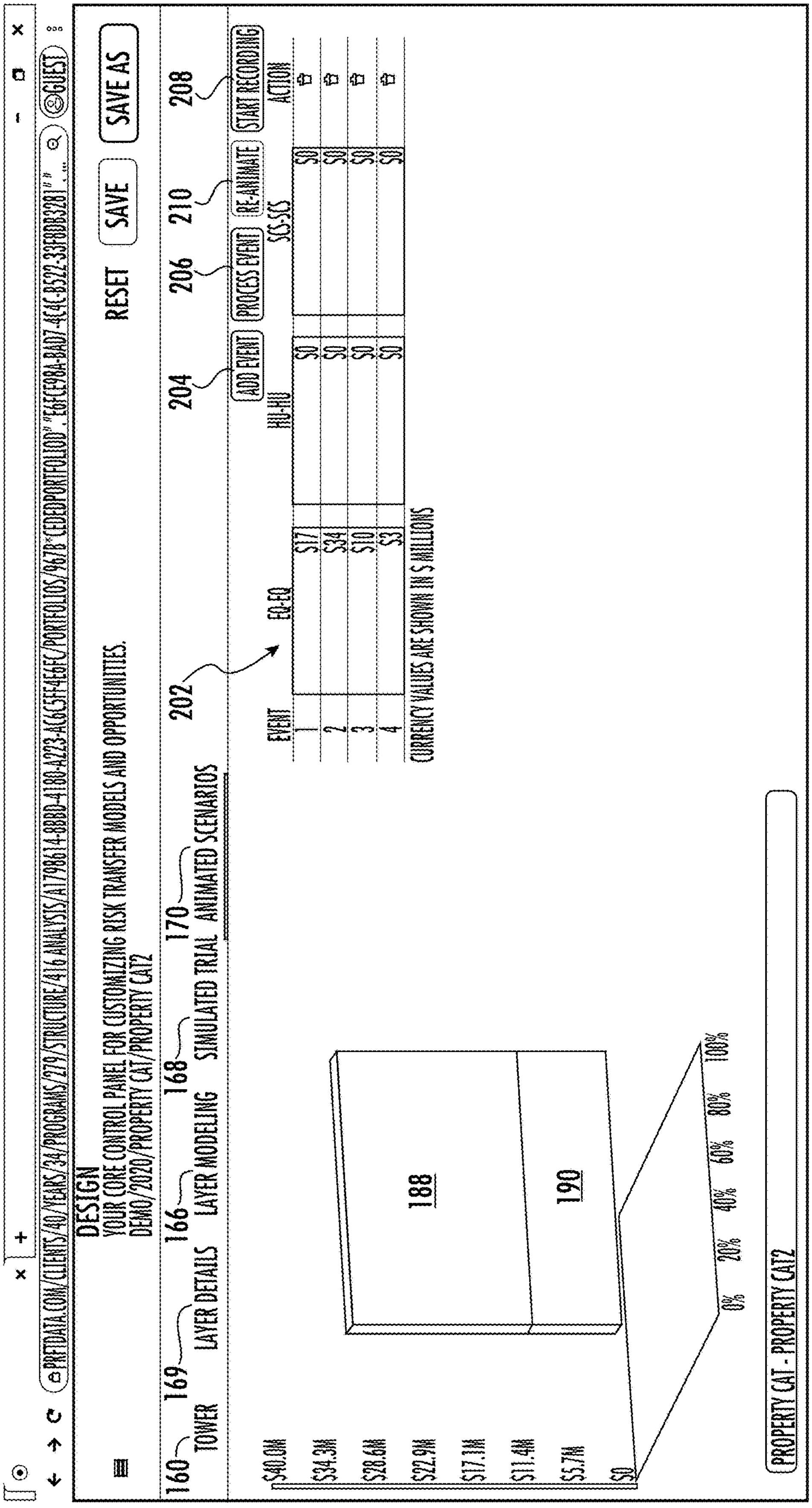
FIG. 20 shows a graphical user interface and representation of an exemplary two-layer insurance coverage structure shown in three-dimensional axis to render the designed insurance structure more readily viewed and the extent of coverage in a percentage and dollar mount more appreciated by the user according to an aspect of the present disclosure.

FIGS. 20-25 show various stages of an animated scenario run using a system of the present disclosure that shows the coverage impact of the created insurance structure(s) when a loss event or events are simulated. As shown in FIG. 20, the graphical user interface shows a three-dimensional depiction of the user-generated insurance/reinsurance structure. FIG. 20 also shows a table 202 of listing of various property and casualty events that hypothetically may occur. An additional event may be added by activating the "Add Event" button 204. Additionally, animated modeling may begin by activating the process events link 206. The animation may also be recorded for later use within or outside of the system by activating the start recording link 208. If the animation has already been conducted once, the reanimation link 210 may be activated to run the animation series sequence scenario again.

Figure 21:
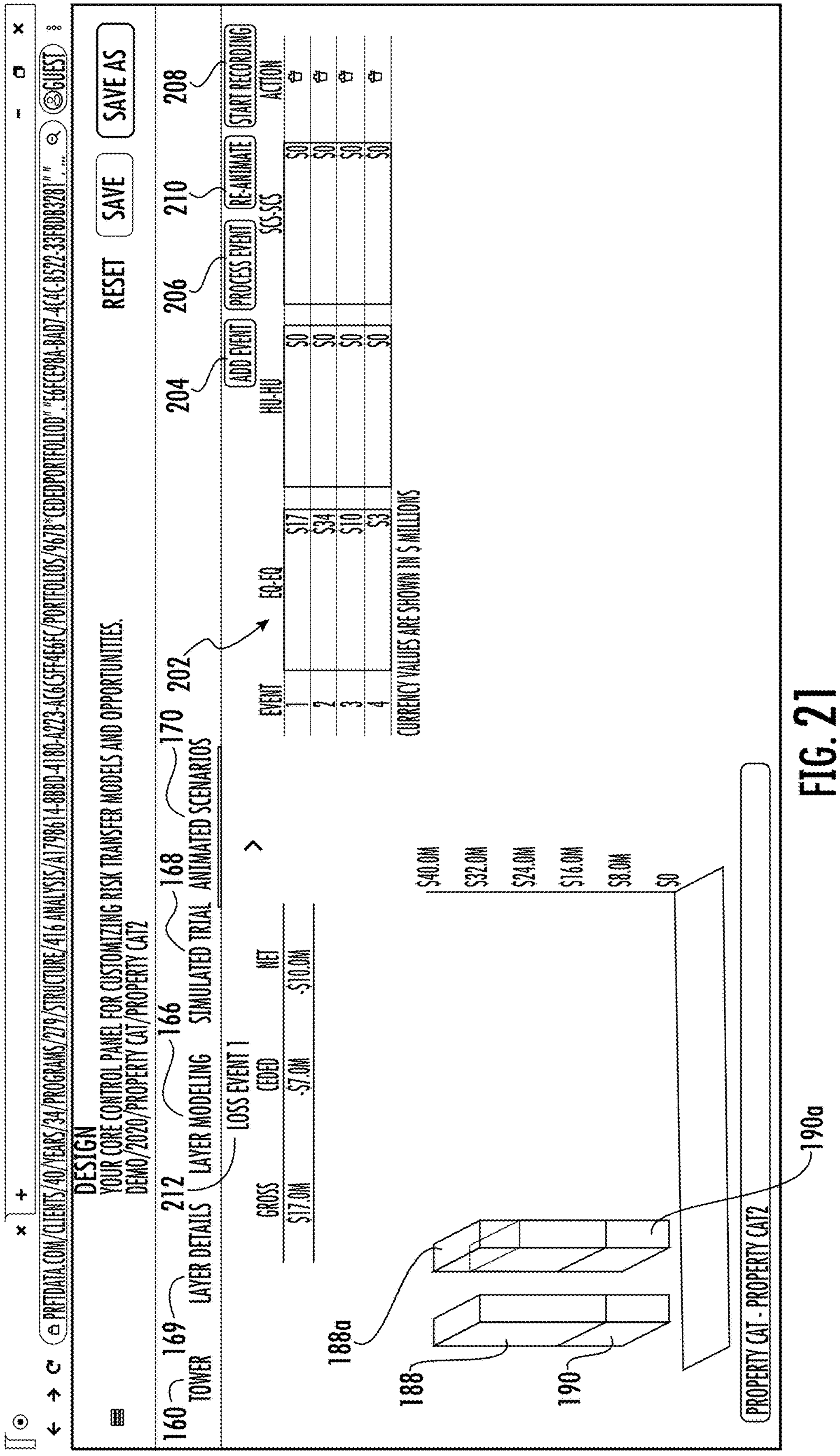
FIG. 21 shows the graphical user interface and representation of the exemplary two-layer coverage structure showing animated coverage allocation among layers in view of the first of four hypothetical property and casualty events such as a hurricane or earthquake where the coverage amounts are shown filling each layer as if it were a liquid reservoir over time/based on amount of loss from the first event according to an aspect of the present disclosure.
Figure 22:
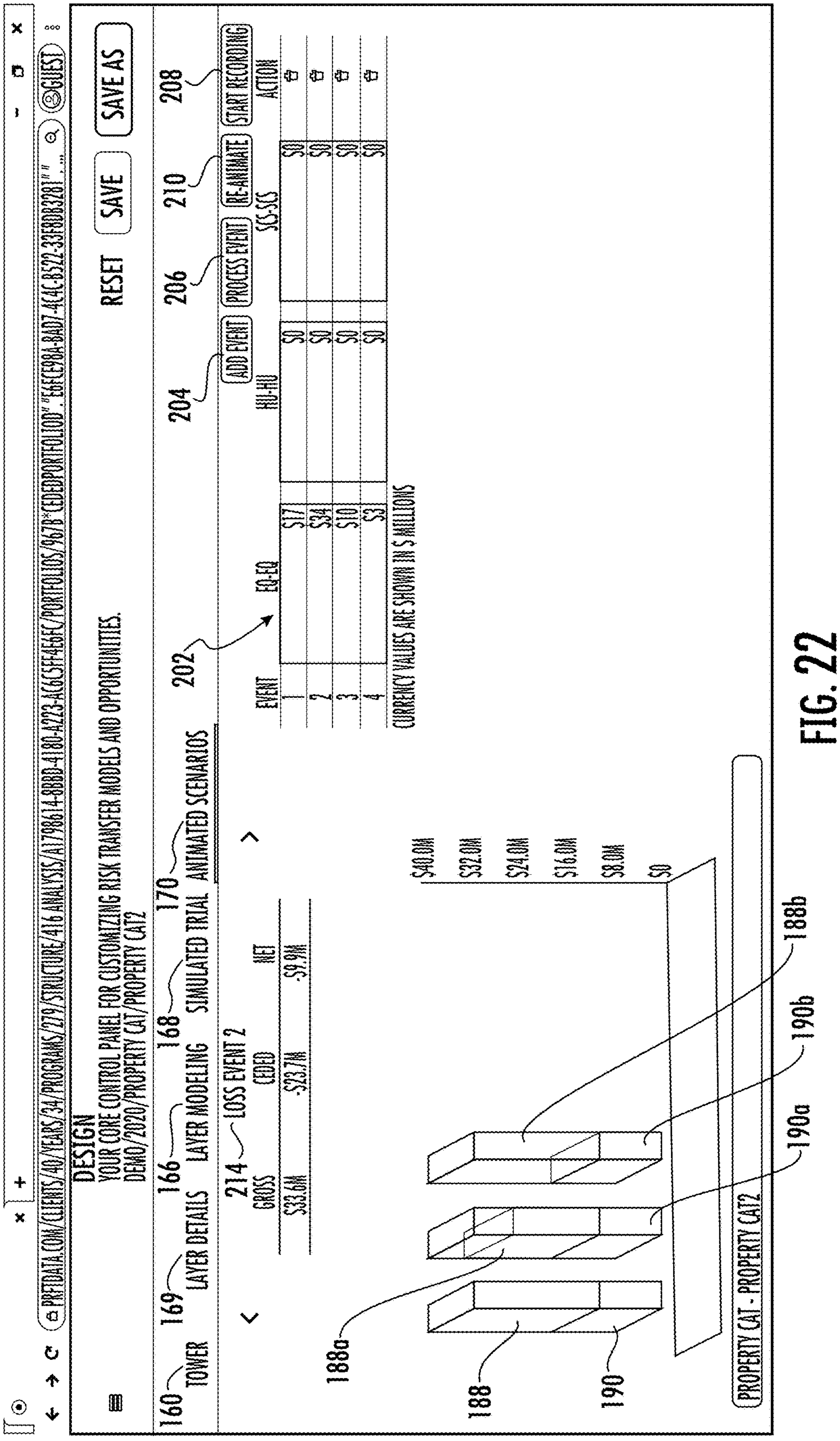
FIG. 22 shows the graphical user interface and representation of the exemplary two layer coverage structure showing animated coverage allocation among layers in view of a second of four hypothetical property and casualty events such as a hurricane or earthquake occurring after the first event where the remaining coverage of amounts ceded are shown filling each layer as if it were a liquid reservoir over time/based on amount of loss from the second event according to an aspect of the present disclosure.
Figure 23:
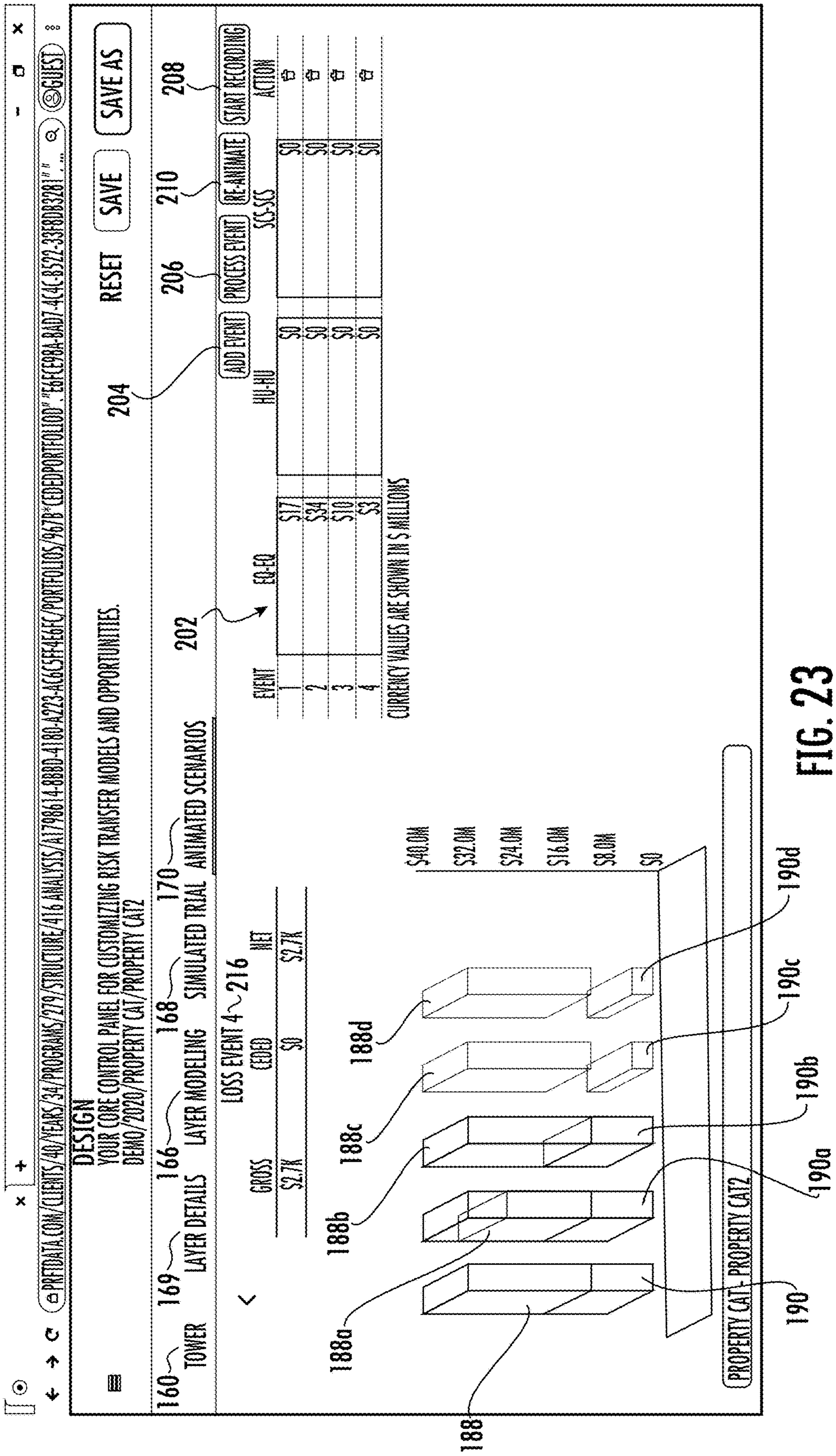
FIG. 23 shows the graphical user interface and representation of the exemplary two layer coverage structure showing animated coverage allocation among layers in view of a third of four hypothetical property and casualty events such as a hurricane or earthquake occurring after the first two events where the remaining coverage of amounts ceded are shown filling each layer as if it were a liquid reservoir over time/based on amount of loss from the third event (in this case showing now coverage remains) according to an aspect of the present disclosure.

FIG. 21 shows the graphic user interface display animating the reinsurance coverage in the presence of an ad hock loss scenario number one 212 defined by a user at run time. The graphical display fills each layer, which is either one color or a depicted hollow cuboid until filled as coverage is used when the color changes or the hollow cuboid is filled as coverage is applied to a given loss in a manner similar to a water being filled into a transparent container. The amount of loss ceded is shown graphically by shading the otherwise transparent layer of the proposed insurance/reinsurance structure as loss occurs from the first event. Subsequent events are shown in FIGS. 22 and 23. FIGS. 22 and 23 show the effects of a second loss event that is user defined in the Table 202 and a fourth loss event 216 that is defined in Table 202. FIG. 22 also shows the third loss event. The coverage shown for the first layer, based on the first event, shown by reference numeral 190*a* and the second layer 188*a*. The second event effects are shown on the first layer 190*b* and second layer 188*b*. Effects of the third event are shown in the first layer by 190*c* and second layer 188*c*. The effects of the fourth event on the first layer are shown by the block 190*d* and second layer by block 188*d*. The systems of the present disclosure allow user customization of enumerable numbers and types of catastrophic events. Earthquakes "EQ" are shown as the events occurring in the depicted animated scenarios of FIGS. 20-23.

Figure 24:
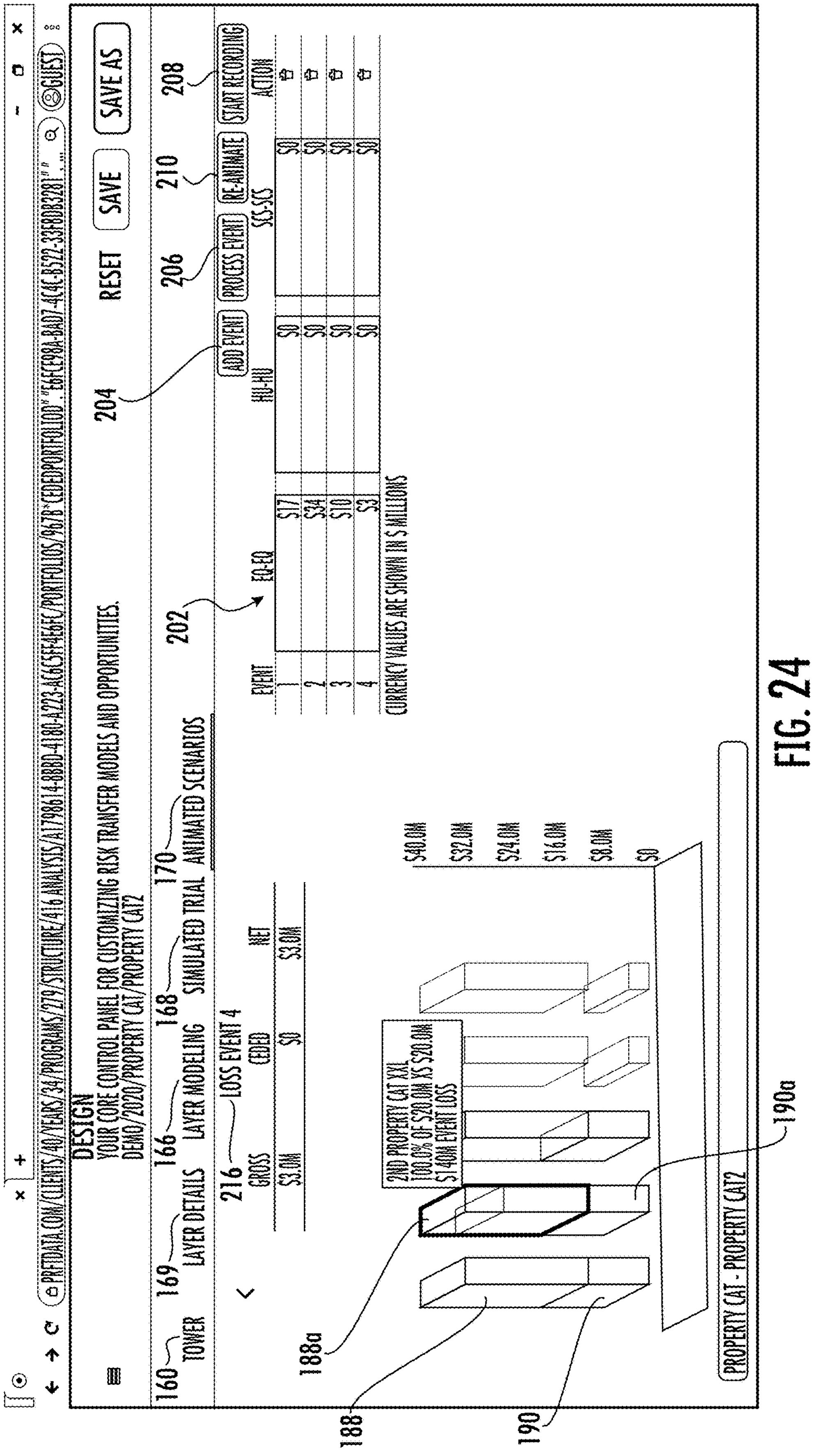
FIG. 24 shows the graphical user interface and representation of the exemplary two layer coverage structure showing animated coverage allocation among layers in view of a fourth of four hypothetical property and casualty events such as a hurricane or earthquake occurring after the first three events where the remaining coverage of amounts ceded are shown filling each layer as if it were a liquid reservoir over time/based on amount of loss from the fourth event (in this case showing now coverage remains) according to an aspect of the present disclosure.

FIG. 24 demonstrates that a user may select any of the layers, in this case layer 188*a*, and detailed information regarding that layer appears in a display to the user. The amount of coverage and the levels of coverage are typically shown. However, any relevant information about a user selected layer of an insurance structure could conceivably be displayed to the user that is directly related to the layer being selected by the user. The selection of the layer may be done during the animation of this scenario provided by the user or afterwards or before.

Figure 25:
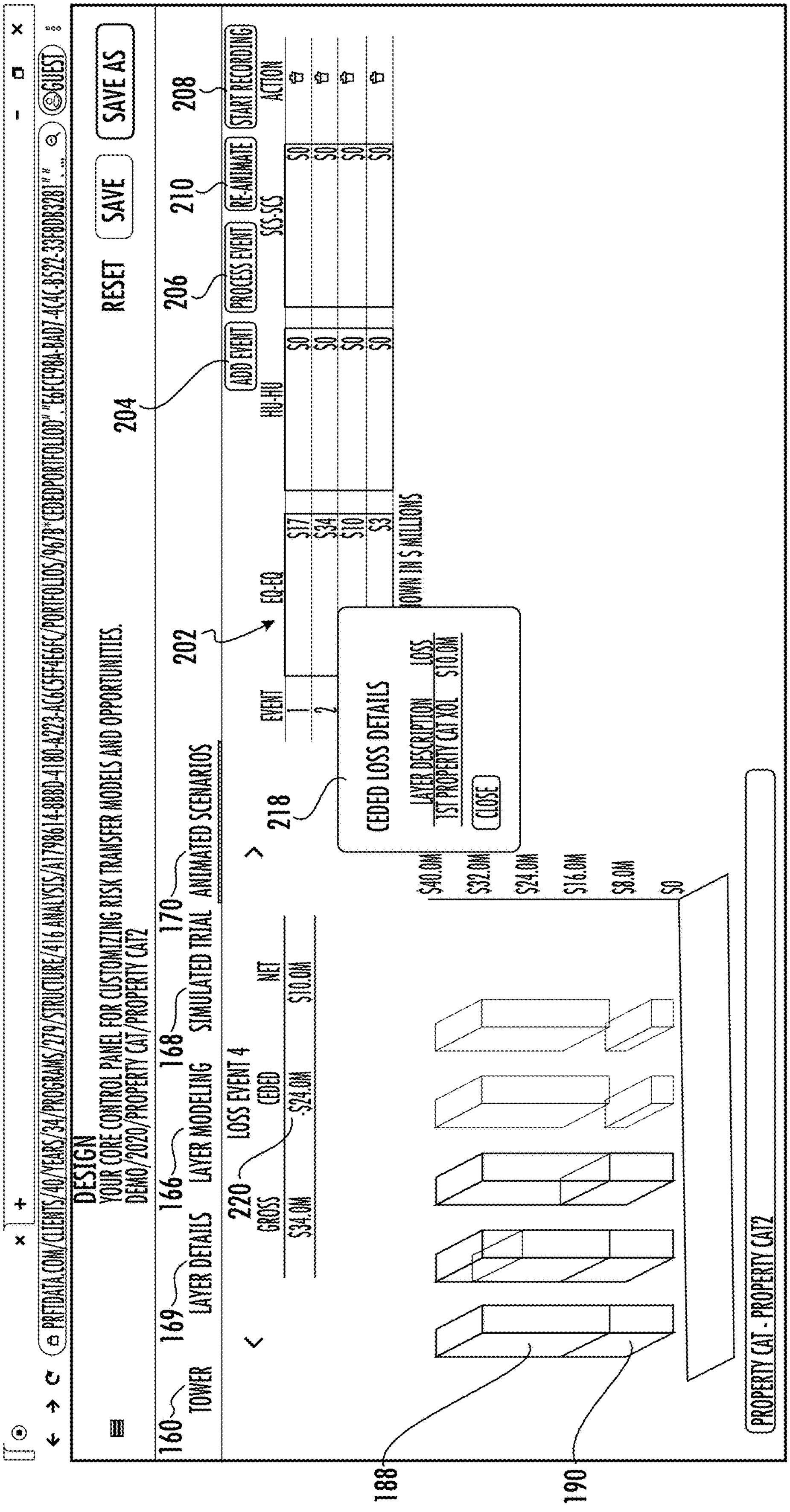
FIG. 25 is the graphical user interface and representation of the exemplary two-layer coverage structure where the details of the ceded loss from one of the two layers of the coverage structure based on the first property and casualty event is shown according to an aspect of the present disclosure.

FIG. 25 shows the end of the animation with the display of the amount of ceded loss for a given layer. In the case of the second event, a gross loss of $34 million dollars is proposed in the hypothetical event of which $24 million dollars was ceded under the insurance/reinsurance structure and a net loss of $10 million dollars realized. The ceded loss details are displayed by selecting the numeric value of ceded loss shown by reference numeral 220.

Figure 26:
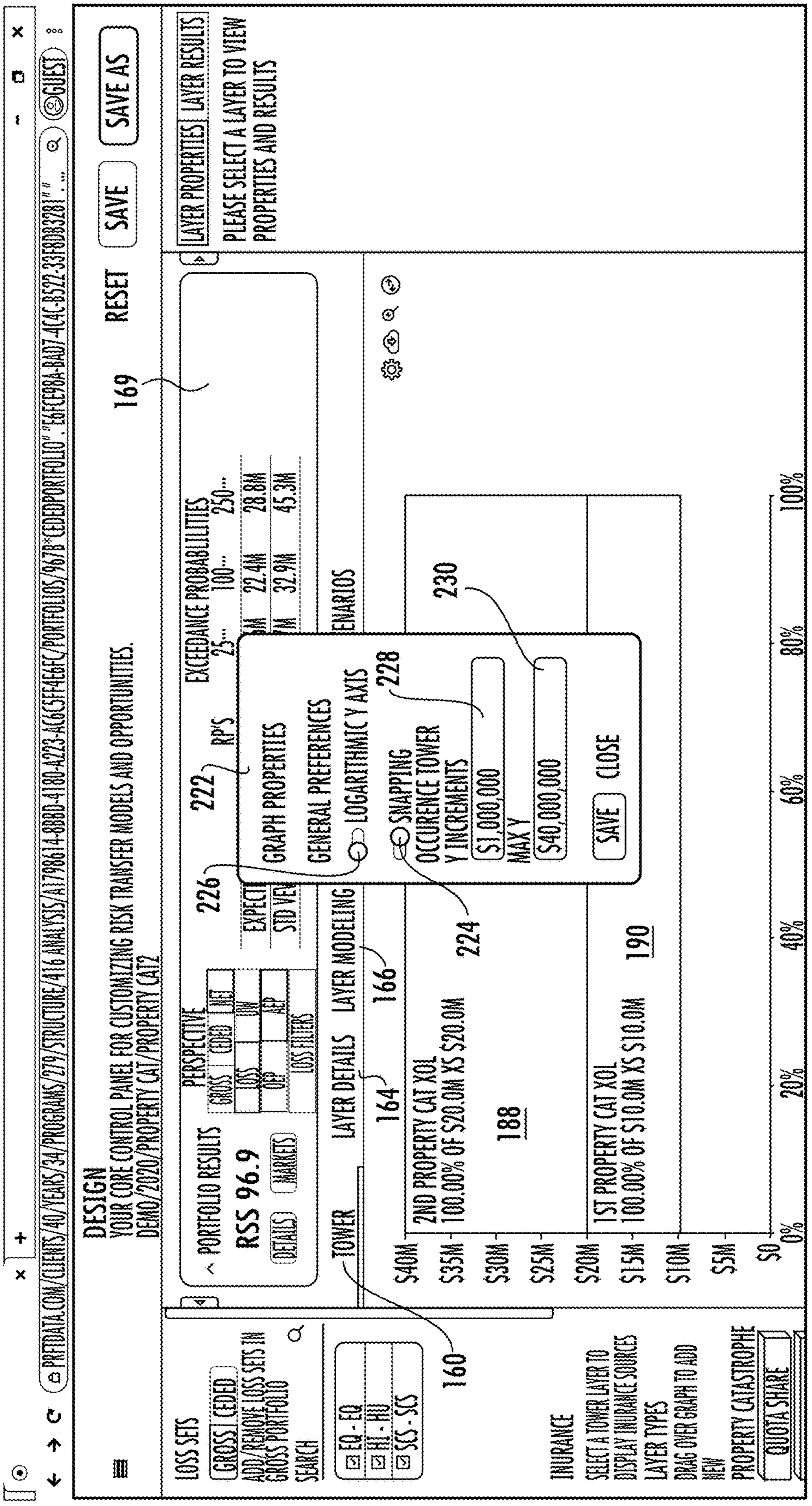
FIG. 26 is a graphical user interface of the design interface of FIGS. 10A and 10B where the user is allowed to change the dimensions of the graphical properties of the hypothetical tower structure generated by the user to allow for adjustments to the X and Y axis dimensions when viewing or running the animations of the present disclosure according to an aspect of the present disclosure.

FIG. 26 shows a graphical user interface for receiving input from the user in the design and configuration of an insurance/reinsurance structure with the graph properties display settings dialog box 222 displayed. Within this settings box, the user can select whether the rectangular grids for a given proposed coverage layer snap into a rectangular configuration by toggling the toggle switch 224. The user can also have the ability to turn off and on a logarithmic Y-axis scale to allow for easier visualization of certain structures where the range of coverage is very high at different orders of magnitude. This is done by the toggle switch 226. Additionally, the user can set the maximum coverage in increments of the coverage for the display along the Y-axis. When layer snapping is activated, the rectangular configuration created by the user will snap into a rectangular configuration based on the Y-axis increments and a percentage along the X-axis. As discussed above, the maximum percentage along the X-axis in the design systems of the present disclosure is 100% coverage.

FIG. 27 shows a single event insurance/reinsurance structure created by the user having a first property casually coverage layer 190 and a second property casually coverage layer 188. The user interface further includes a selection of the types of catastrophic events to be covered by the structure such as an earthquake (EQ) 232, a hurricane (HU) 234 and a severe convective storm (CS) 236.

Figure 28:
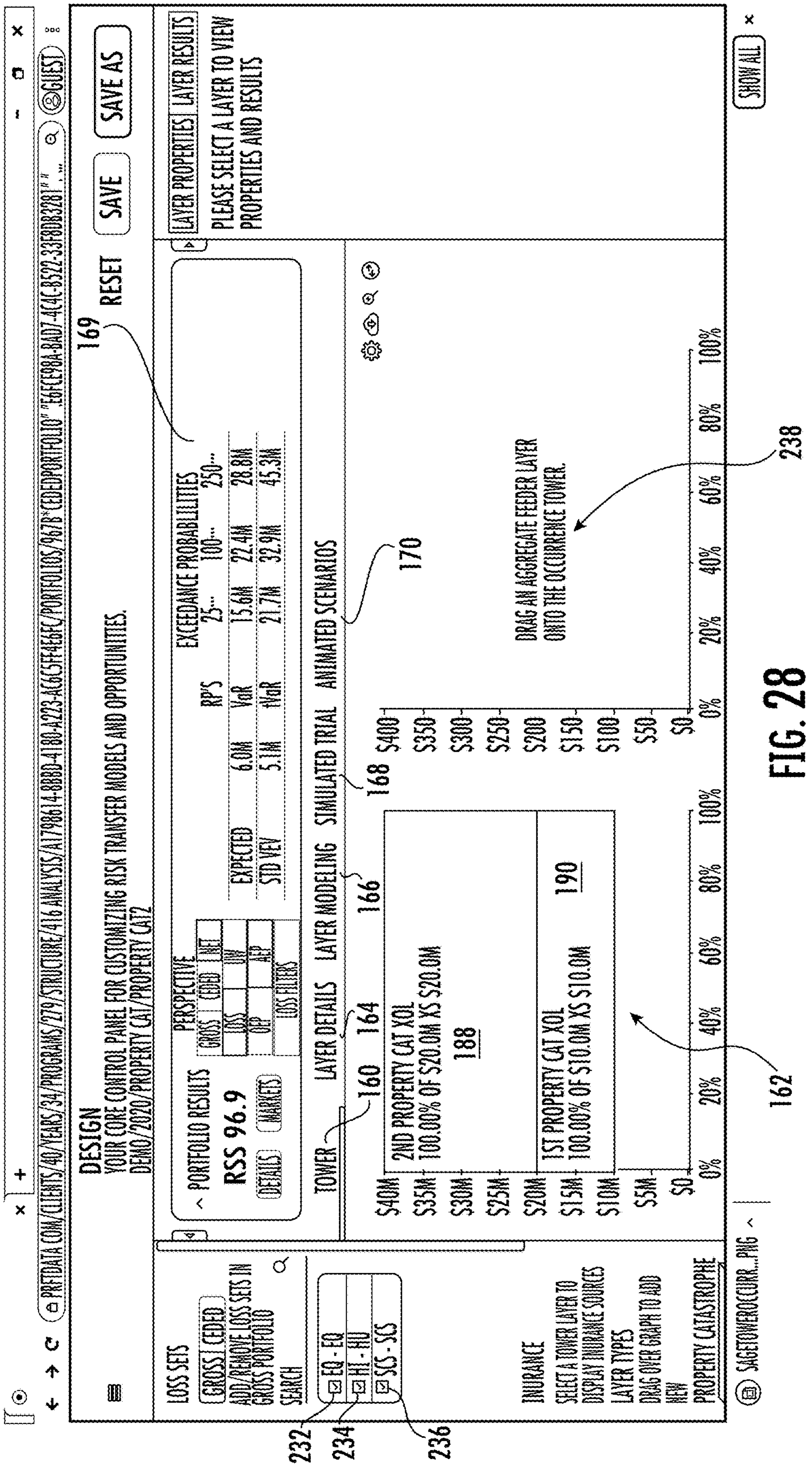
FIG. 28 is a graphical user interface of the present disclosure that allows two or any plurality of related proposed tower structures constructed by the user to be compared to one another simultaneously side by side with one another.

FIG. 28 is an aggregate display shown to the right of a single current structure. The aggregate display field shows the effect of the reinsurance structure over an aggregate of multiple insurable event occurrences. This allows the user to see the aggregate effect of events on an insurance structure as well immediately adjacent the insurance structure created by and being tested/evaluated by the user.

Figure 4:
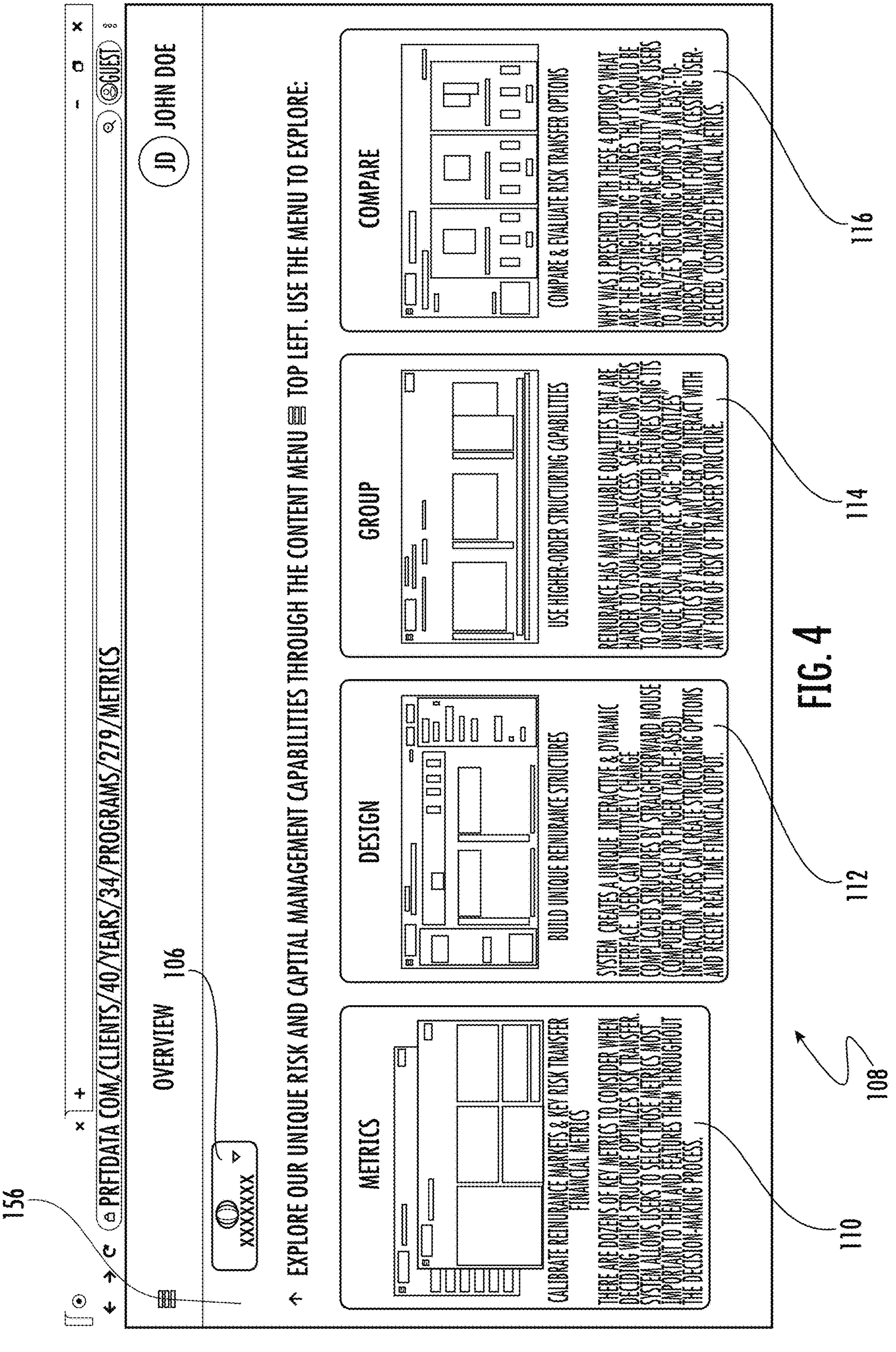
FIG. 4 is a user overview/summary of features, actions and selection interactive display according to an aspect of the present disclosure.

FIG. 29 is an exemplary structure group page displayed to a user upon activation of the group link 114 from the main landing page shown in FIG. 4. The group page 240 allows individual insurance/reinsurance structures to be grouped together to reflect the business model of a particular insurance carrier more accurately. Individual insurance/reinsurance structures may be grouped and viewed together based on geographic areas, the domicile's risks and perils. The structures and purchase of reinsurance may therefore be done in a manner that is optimized for a particular carrier's portfolio. The grouping capability of the systems of the present disclosure enables the insurance/reinsurance structures generated by the user to more accurately reflect coverages needed by the carrier. Additionally, these groupings allow individual researchers at the broker and the cedent to work together to customize groupings. The groups better mimic the way ceding parties consider and demark the risk of loss event such as property and casualty events. Property and casualty coverage may be grouped by geographic regions such as within a given country or all of North America or on a global basis. Grouping allows the user to address any number of programs at one time.

Figure 30:
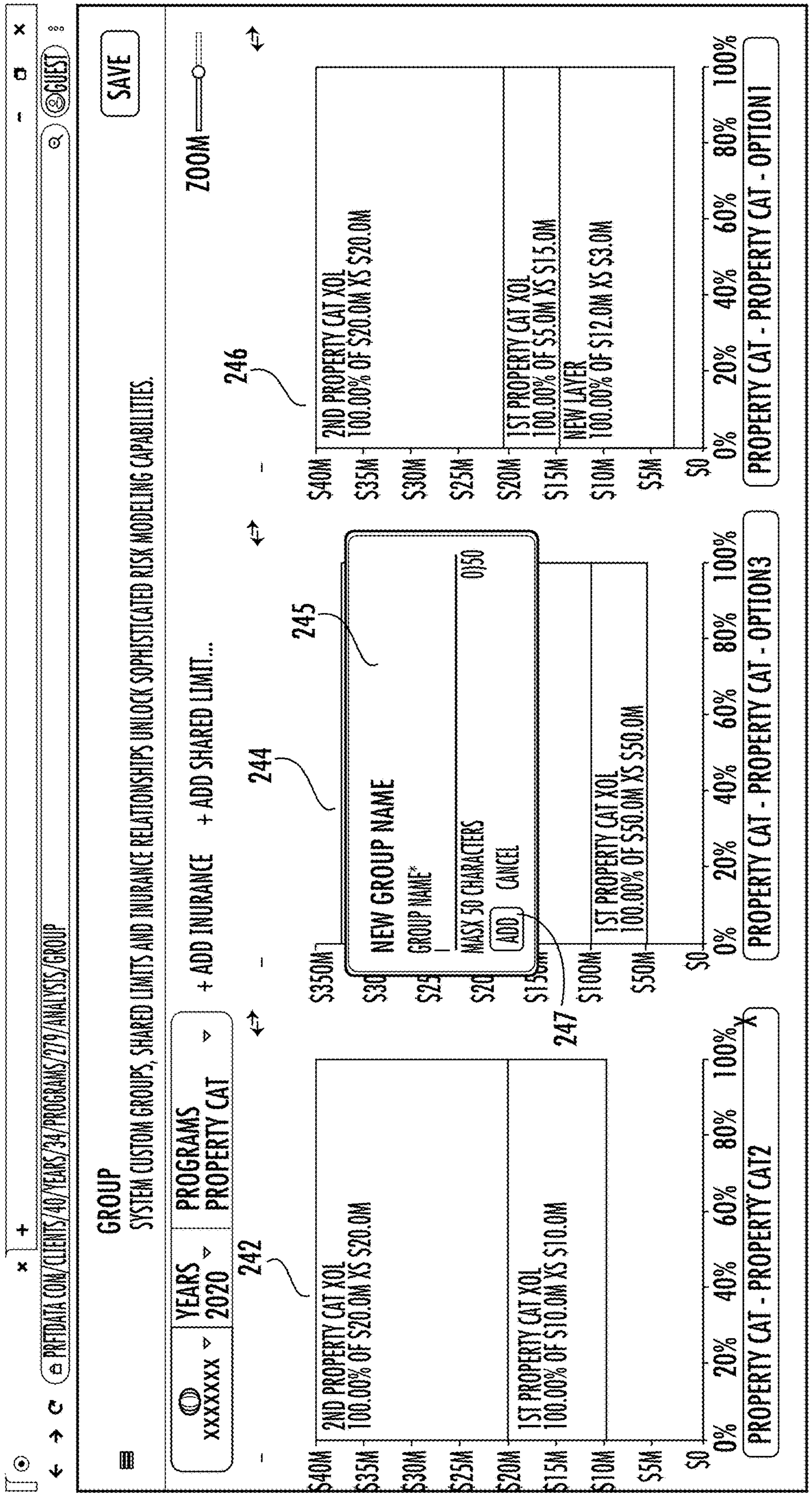
FIG. 30 is a depiction of the graphical user interface for grouping three different user constructed tower coverage structures together-shown are three different property casualty coverage structures with the user input window for the naming of the group of a plurality (in this case three) tower structures in a single group for analysis/review purposes by the user in connection with the systems of the present disclosure according to an aspect of the present disclosure.

FIG. 30 shows the result of selecting insurance/reinsurance structures 242, 244 and 246 by activating the selection boxes 243 for the corresponding structures from the group page shown in FIG. 29. The user is then allowed to name the grouping of individual structures so that they can be reorganized and bundled together. The reinsurance buyer, broker and cedent representatives can work together to create this grouping, but any one or combination of people may be included in this appraisal. As shown in FIG. 30, once selected, the user may provide the selected insurance/reinsurance structures a group name which may then be saved within the system.

Figure 31:
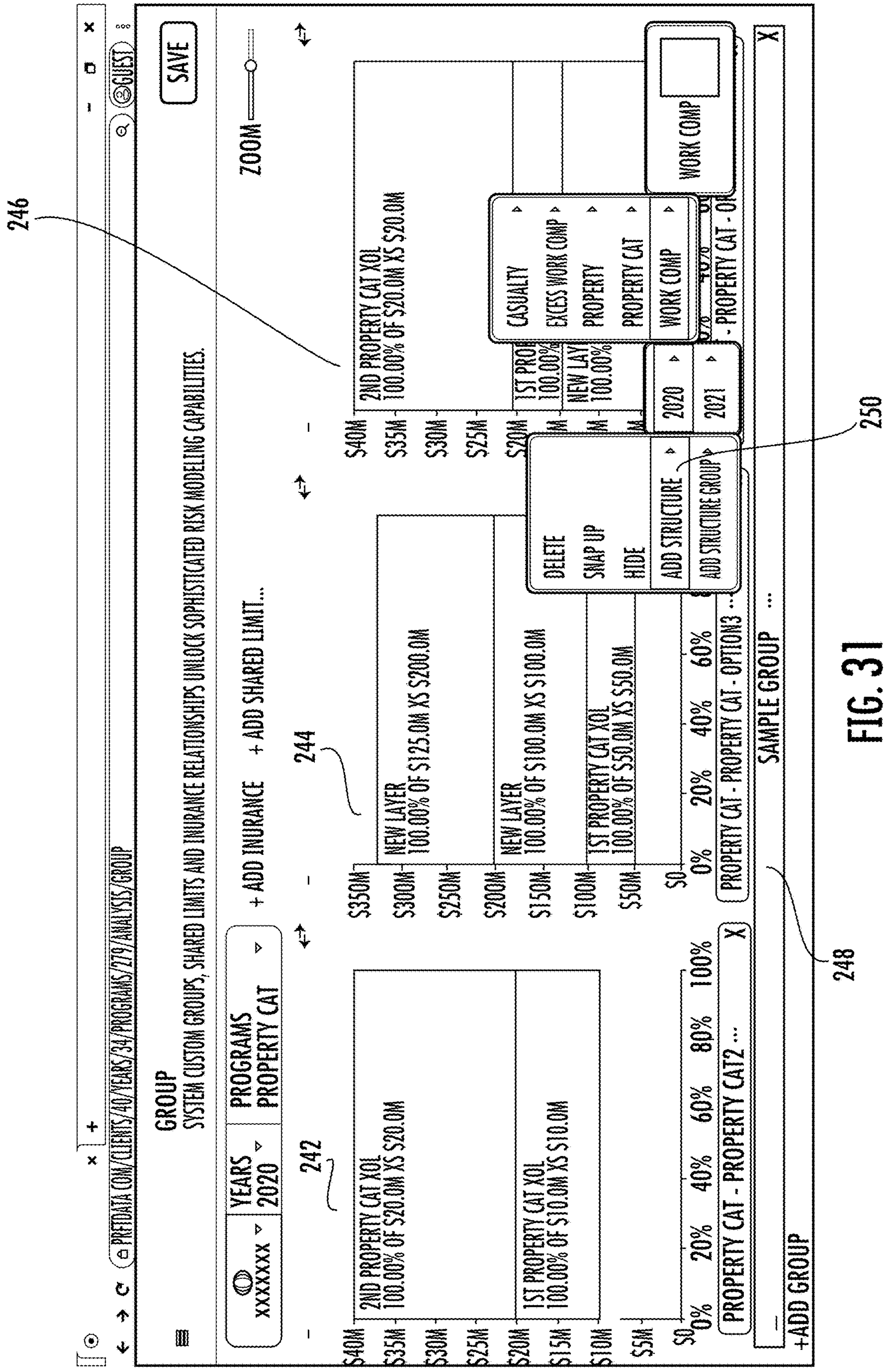
FIG. 31 is a graphical user interface submenu of the system of the present disclosure, in this case called "sample group," showing the options to change the group within a group or merge groups together according to an aspect of the present disclosure.

FIG. 31 shows a graphical user interface sub-menu, in this case called "sample group", which is accessed by clicking the sample group bar 248 at the bottom of the display, which shows various options to change the group within a group or merge groups. Activating a sample group link presents the user with a series of cascading selection menus for altering the group in a variety of ways. The grouping, as discussed above, allows for multiple contracts to be displayed on an aggregate basis based on carrier's possible losses. For example, one group could be a U.S. group with two structures, one for earthquake loss and one for hurricane loss. By combining groups, a reinsurance buyer can organize the groups by how the buyer purchases and show benefits and losses from the modeling. The system may treat geographic losses together for the buyer's internal purposes. For example, all North and South American coverages that exist.

Figure 32:
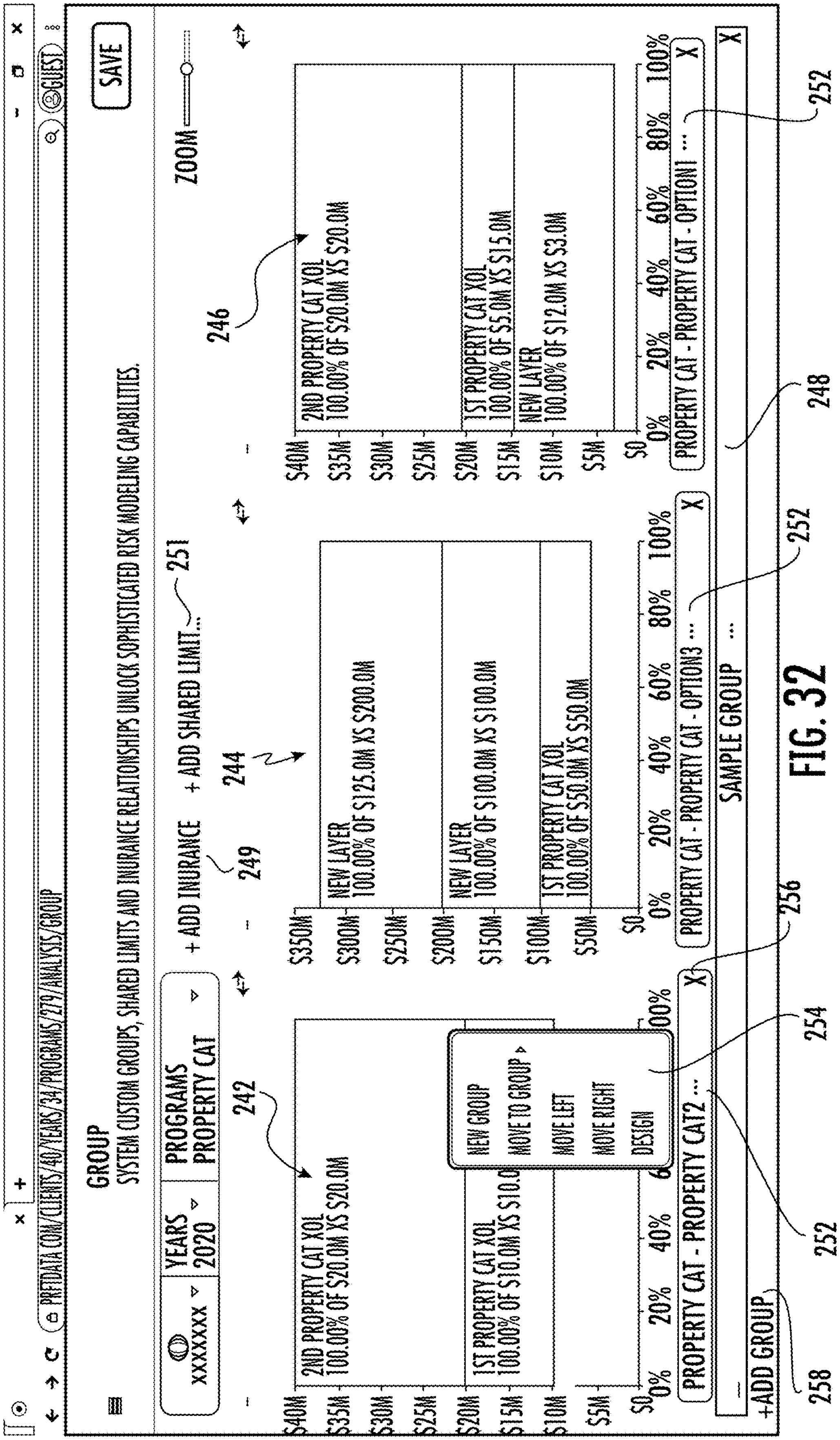
FIG. 32 showing activation of the ellipsis (" . . . ") icon of the display to show and provide options of user selectable actions to take against a specific tower structure according to an aspect of the present disclosure.

FIG. 32 shows the activation of an ellipsis ( . . . ) icon immediately adjacent the description of a given insurance/reinsurance structure, which causes the dialogue box 254 to appear and provide user selections for actions for a particular structure within a group. In this case, provides the user with the ability to move the structure to a different group, move it left, move it right, and reenter the design phase. Additionally, for each structure, a delete link, which in this case is a X, is provided to remove the structure from the grouping entirely. Additionally, in substantially all or all of the pages displayed within the group subsystems of the present disclosure, an add group link 258 is typically displayed which allows the user to begin the grouping process anew.

FIGS. 31 and 32 show the grouping functionality typically offered by the systems of the present disclosure. The grouping functionality provides the ability to add one or more reinsurer structures to custom groups which mirror the risk hierarchy desired by the ceding risk manager or actuary. This is accomplished through a dedicated grouping page where the user selects from an available list of individual structures or previously created structure groups. As an example, to create a new group made of three individual structures, the user selects the intended three using check boxes 243 on the list display control (see FIG. 29) corresponding to the structures and the system loads them into a carousel. If more structures or groups are chosen than may fit simultaneously on a single screen, the user may scroll through additional screens or pages as well as make use of a zoom control for zooming in and out for a particular view. The user clicks/activates/selects the "+Add Group" or other similar hyperlink and is prompted to assign a name to the new group within a user input dialogue box 245 and activating the "add" link 247. The new group (named "sample group" in FIG. 31) is generated and presented on screen as a colored band 248 below the carousel. By default, the new group includes all structures present on screen, but a group modifier control allows the user to add a structure, remove a structure, hide or show the group, etc.

As shown in FIGS. 32-37, to define an insurance relationship, the user clicks the "+Add Insurance" hyperlink 249 and is prompted to choose source 266 and target options 270. The user clicks Save 272 to commit this arrangement to the modeling and computation engine and all related financials and risk measures are revised where present in the application. To define a shared limit relationship, the user clicks the "+Add Shared Limit" hyperlink 251 and is prompted to select two or more layers across appropriate tower structures. The user is prompted to enter relevant limit and deductible parameters for the newly created shared limit relationship and then save the arrangement to the modeling and computation engine. Metric values are updated elsewhere in the application accordingly. Choices made with regard to custom groups and nested group alignments are written to an API for database storage when the user clicks the Save button.

Figure 33:
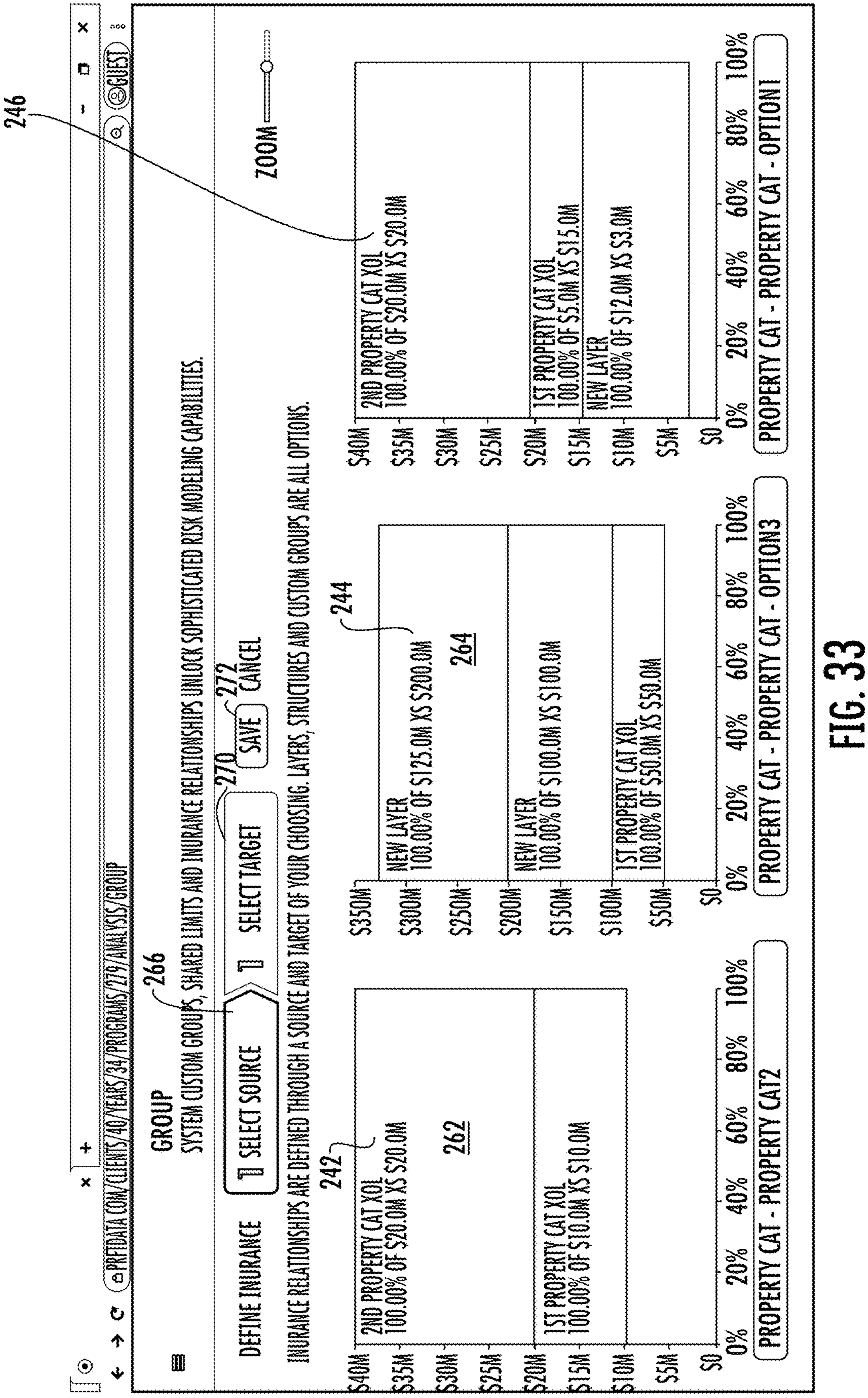
FIG. 33 shows the system's insurance page to create relationships between a plurality (in this case 3) tower structures or layers of another tower according to an aspect of the present disclosure.
Figure 34:
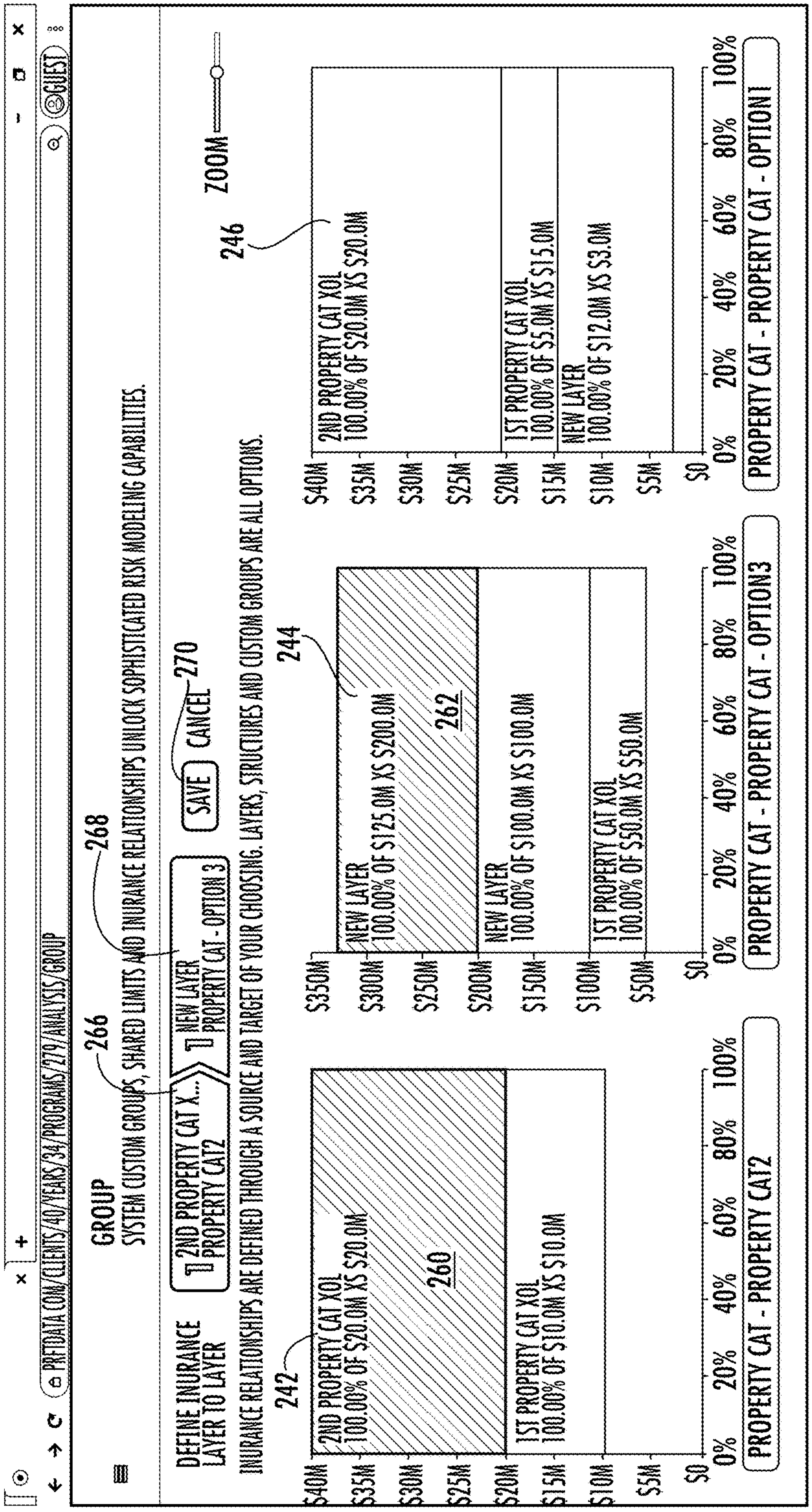
FIG. 34 shows the system's insurance page to create relationship between a plurality of coverage structures or layers of different coverage tow structures with one another where a layer of the first tower structure and the second tower structure are selected according to an aspect of the present disclosure.
Figure 35:
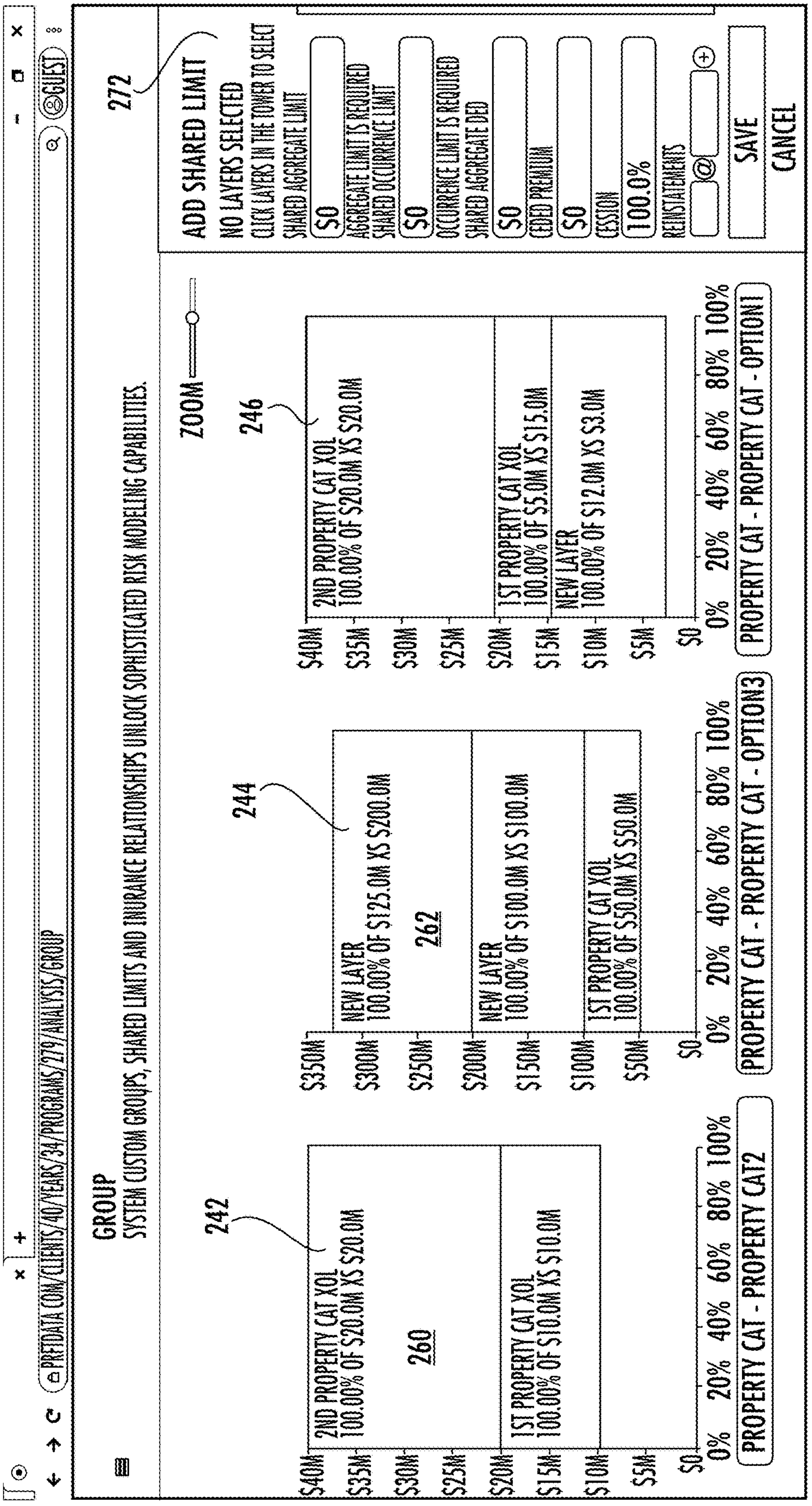
FIG. 35 is an exemplary graphical user interface of systems of the present disclosure showing the user determined detailed input regarding the nature of how one or more layers of two different coverage structures share loss equitably/experience loss in tandem essentially merging coverages up to a determined amount according to an aspect of the present disclosure.
Figure 36:
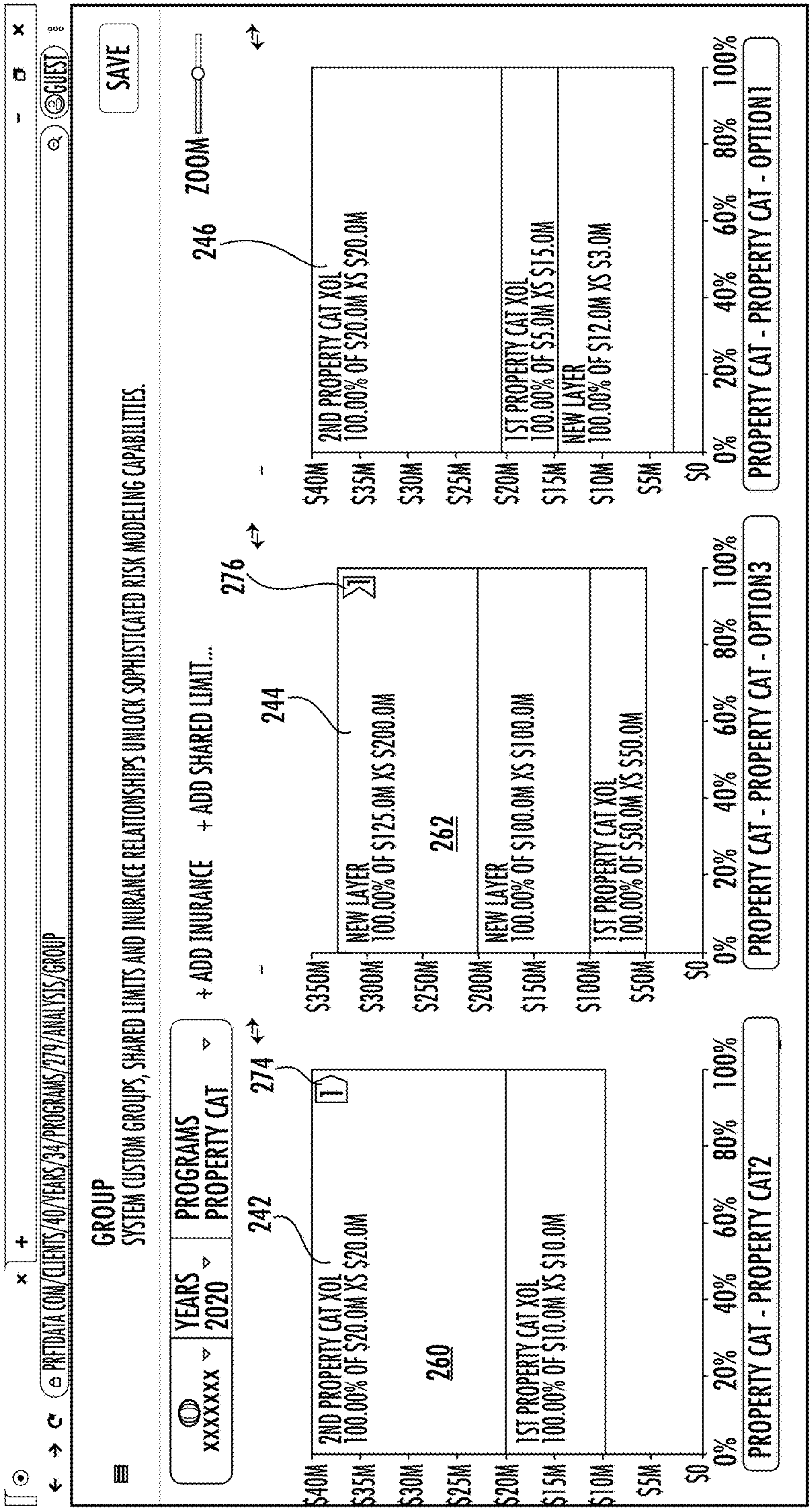
FIG. 36 is an exemplary graphical user interface of a system according to the present disclosure showing the established insurance relationship between the two layers by an indicator, in this case a chevron shape with the same numerical "1" designation according to an aspect of the present disclosure.
Figure 37:
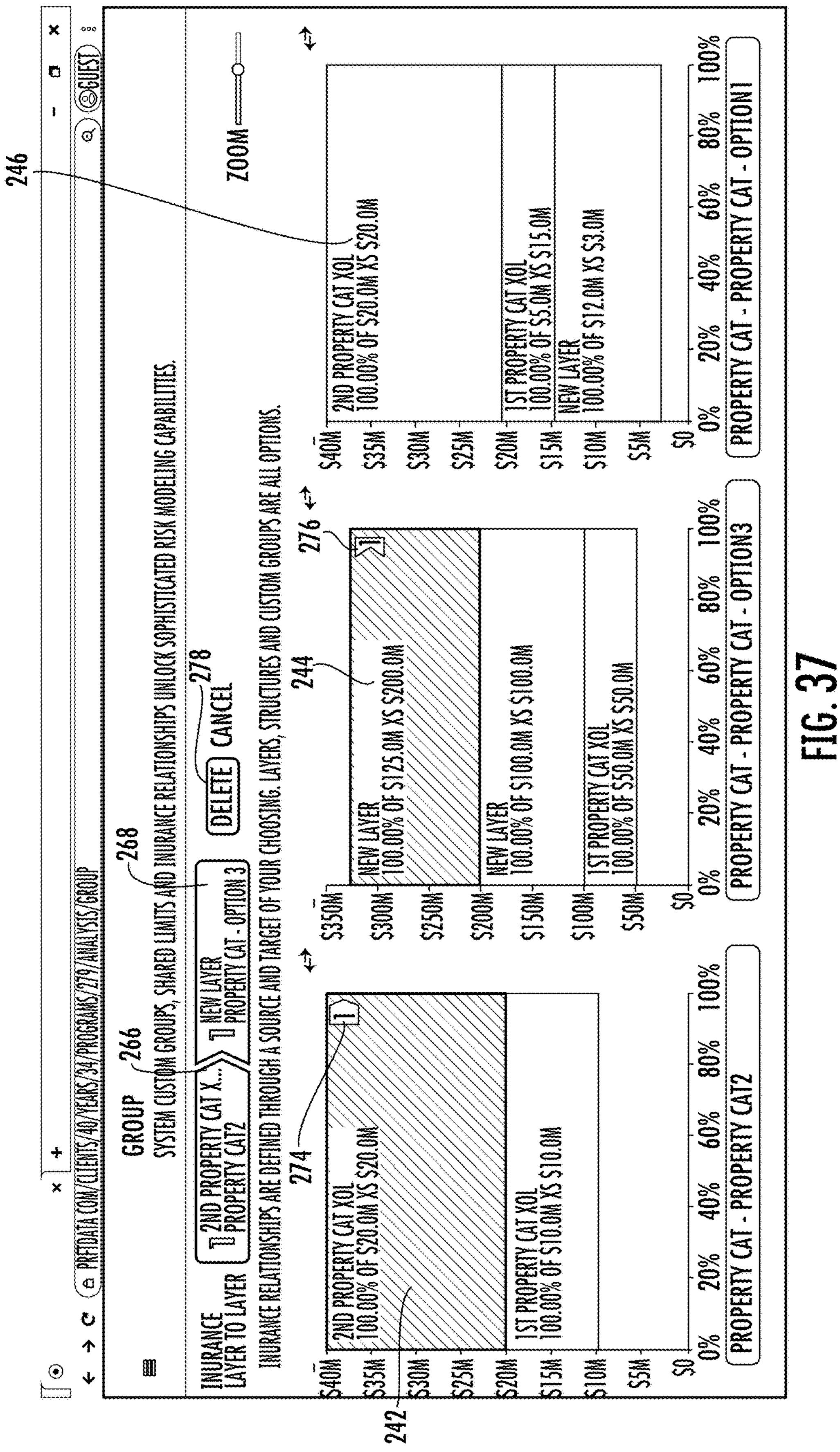
FIG. 37 is an exemplary graphical user interface of a system according to the present disclosure showing the process of deleting the insurance relationship via the interface according to an aspect of the present disclosure.

Stated another way, FIGS. 32-37 show a feature of the present systems, the ability to define an insurance relationship between at least two layers across different user-constructed insurance/reinsurance structures. As shown in FIG. 33, the first step is to select a source layer by selecting that layer. In the case of the present example, layer 262 is selected. Upon selection, as shown in FIG. 34, the layer information from layer 260 is displayed in the selection box 266. Upon selection of the target layer, in this example layer 262, the details of the target layer appear in box 268 where the instructions and label "select target" previously appeared. Upon selection of both the source and target a user can activate the save icon 270 to establish an insurance relationship. As shown in FIG. 35, the limitations of the insurance may be adjusted and defined through a user input screen 272 to allow the user to provide share aggregate limit limitations, shared occurrence limit amounts, shared aggregate deductible, ceded premium and suasion amounts as well as installments. Once an insurance relationship is established, as shown in FIG. 36, indicators 274 and 276, which have a corresponding shape to the "select source" shape and "select target" shape, shown in FIG. 33, to reflect the source and target correspondingly. In this example, the source is a chevron 274 labeled 1 for indicating the first insurance relationship and a corresponding mating chevron symbol 276 also labeled with a number 1 for layer 262. To delete the insurance relationship, the source is a chevron 274 labeled 1 for indicating the first insurance relationship and a corresponding mating chevron symbol 276 also labeled with a "1" for layer 262. To delete the insurance relationship, a user can select either of the chevrons indicated or the individual layer and activate the delete icon 278, which will remove the insurance relationship between the two layers. Shown in FIGS. 38-39, the compare subsystems of the present disclosure provide a unique analytical approach to evaluating a group of insurance/reinsurance tower structures, in this case structures 242, 244 and 246 from the previous group. The compare page utilizes the weighted metrics to analyze each of the proposed structures and rank them and provide them by order of preference in color coded fashion with green being the best, amber or yellow being less preferred and red being the least preferred.

Figure 38:
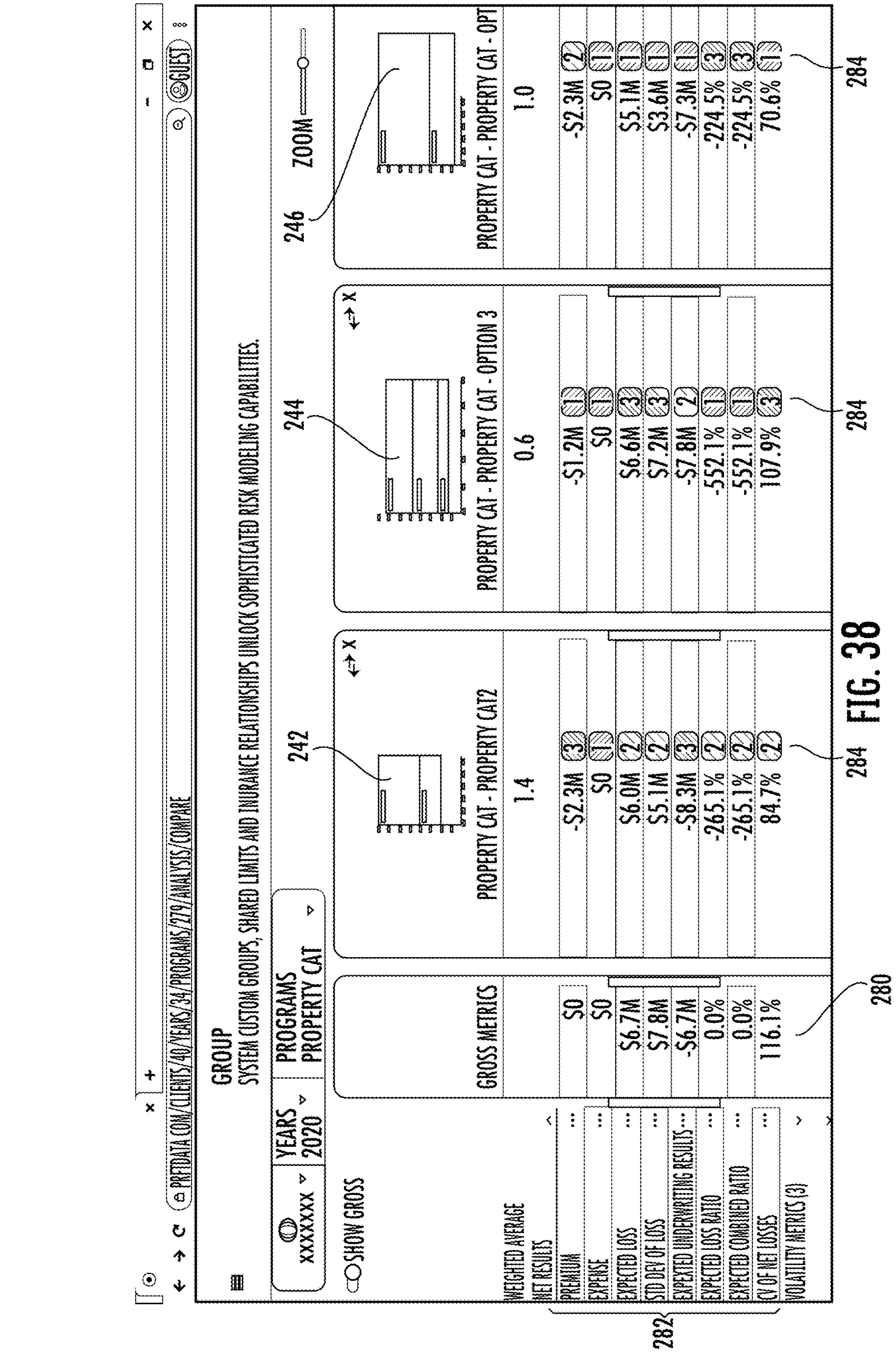
FIG. 38 is an exemplary "Compare" page showing the outcomes from the metrics (that may be weighted by the user in the initial metrics page) and based on actuarial data from an actuarial data engine of historical events according to an aspect of the present disclosure.

Regarding FIG. 38, this figure shows at least two functions of the systems of the present disclosure-a primary panel for loading individual structures and/or entire structure groups and a left-hand menu panel for listing metric families and their individual metric components. These include, but are not limited to, ceded cost metrics, net results metrics, measures of volatility, tail loss metrics, capital management and efficiency metrics. First, the user is presented with a mouse/tap driven menu for selecting one or more structures (and/or groups) by way of check boxes. When the desired choices have been made, the selection widget is hidden and each structure or group is depicted in a column format comprised of a custom tower structure thumbnail for visual reference purposes followed below by a scrollable vertical table that houses each corresponding value according to the left-hand metric panel. Structure groups containing multiple individual structure thumbnails can be perused using simple left and right pagination arrows. Structures including an aggregate coverage construct can be activated to display the additional construct(s) using a check box. A Gross Loss perspective can be toggled to display on screen (See FIG. 39) and each metric value can be enhanced with a percentage difference from Gross analytic. Typically, all metrics displayed are a function of elections made previously by the user on the system's Metrics page. To the right of each metric value is a weighted average color-coded ranking system, also defined by the user previously according to their desired weights. This ranking system enables the user to quickly visualize the quantitative or financial benefits of one structure proposal vs. all others. Ranks can be hidden if desired and a zoom control offers the ability to control the quantity of structures or structure groups being displayed at any one time. The systems of the present disclosure also typically provide for scoring as each structure or group's score compared to another.

FIG. 39 shows the estuarial data based on the model loss data received from a carrier. The user interface shown in FIG. 39 provides a pre-modeling evaluation of subject business risk through a series of simple tables and graphs. The initial selection widget prompts the user to choose a combination of program, structure, and line of business, and then displays the resulting Gross Loss Distribution table. This table includes percentile/return period fields alongside losses by type and in total plus expenses and underwriting results. Typically, ten rows are displayed, one for each percentile/return period and these can be customized according to the probability and return period preferences of the user through a mouse-driven slider control. Lastly, mean, standard deviation and covariance are depicted for statistical reference at the bottom of the first table. The second table depicts all values from the first table but as a percentage of premium. A graph display is also available which depicts the distribution of modeled losses by loss type in a probability density function format as a multi-series line chart. The interface shown in FIG. 39 is typically used for exploring gross or ground up loss modeling in the absence of reinsurance and is a significant modeling input for subsequent structures to be designed with the systems of the present disclosure.

Figure 40:
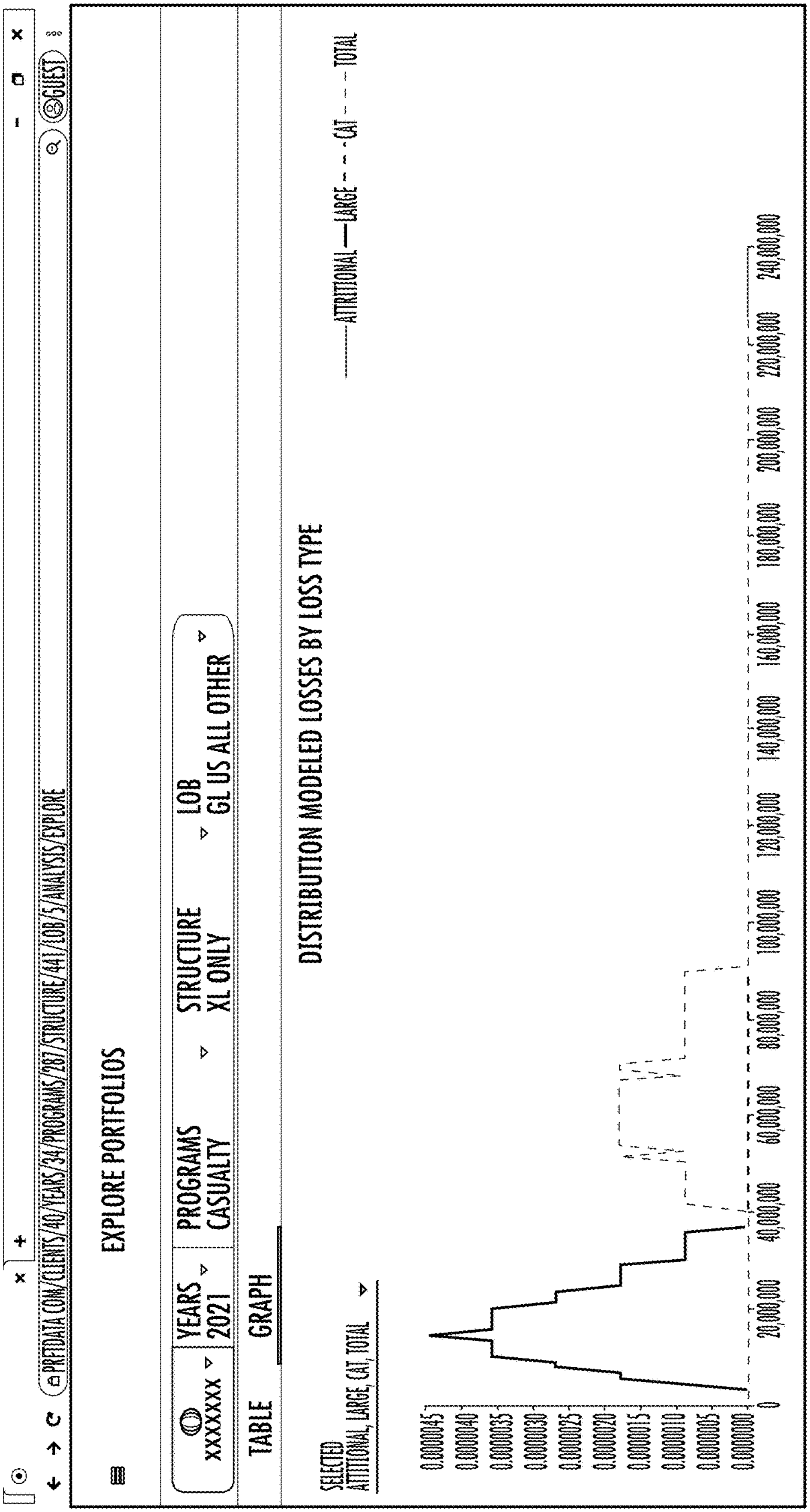
FIG. 40 is a graphical display of the exemplary gross loss distribution of modeled loss by type for a given event according to an aspect of the present disclosure.
Figure 41:
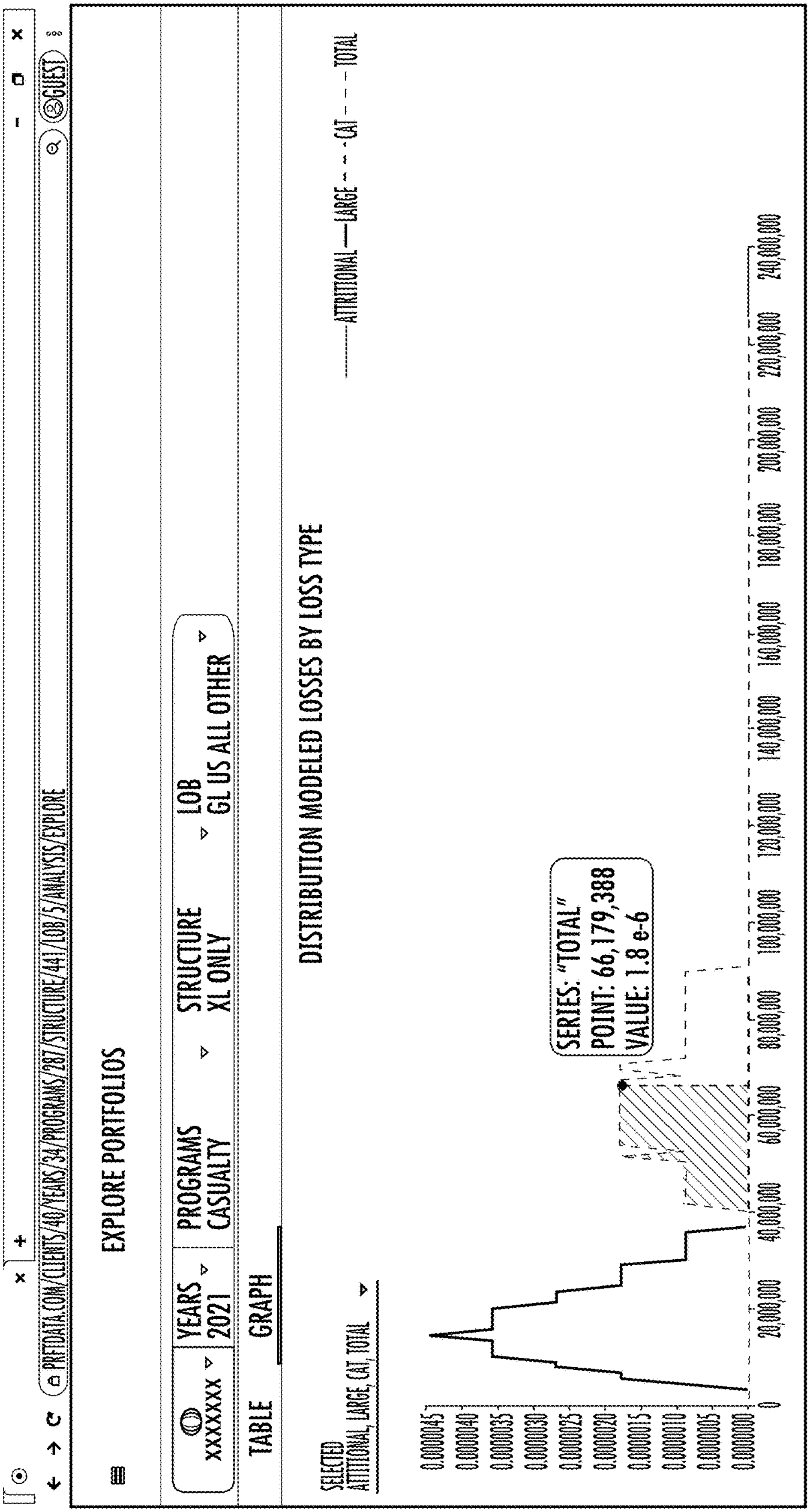
FIG. 41 is a graphical display of the exemplary gross loss distribution of modeled loss by type for a given event according to an aspect of the present disclosure showing selection of a portion of the coverage under the graphical curve displayed an associated data based on the user selection of any given portion of the graphical display selected.
Figure 42:
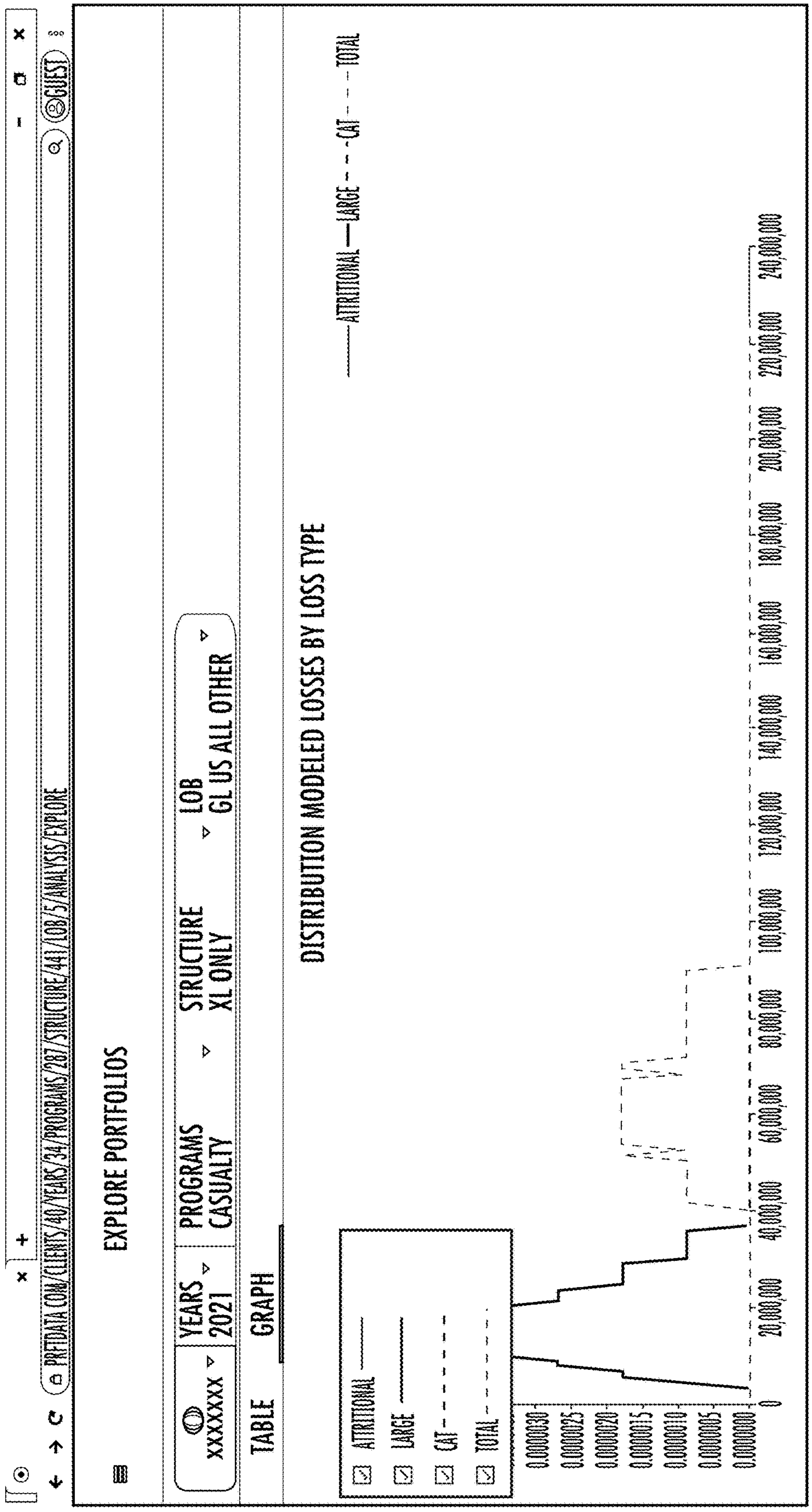
FIG. 42 shows the user selectable display portions of attritional, large, total and category according to an aspect of the present disclosure.
Figure 43:
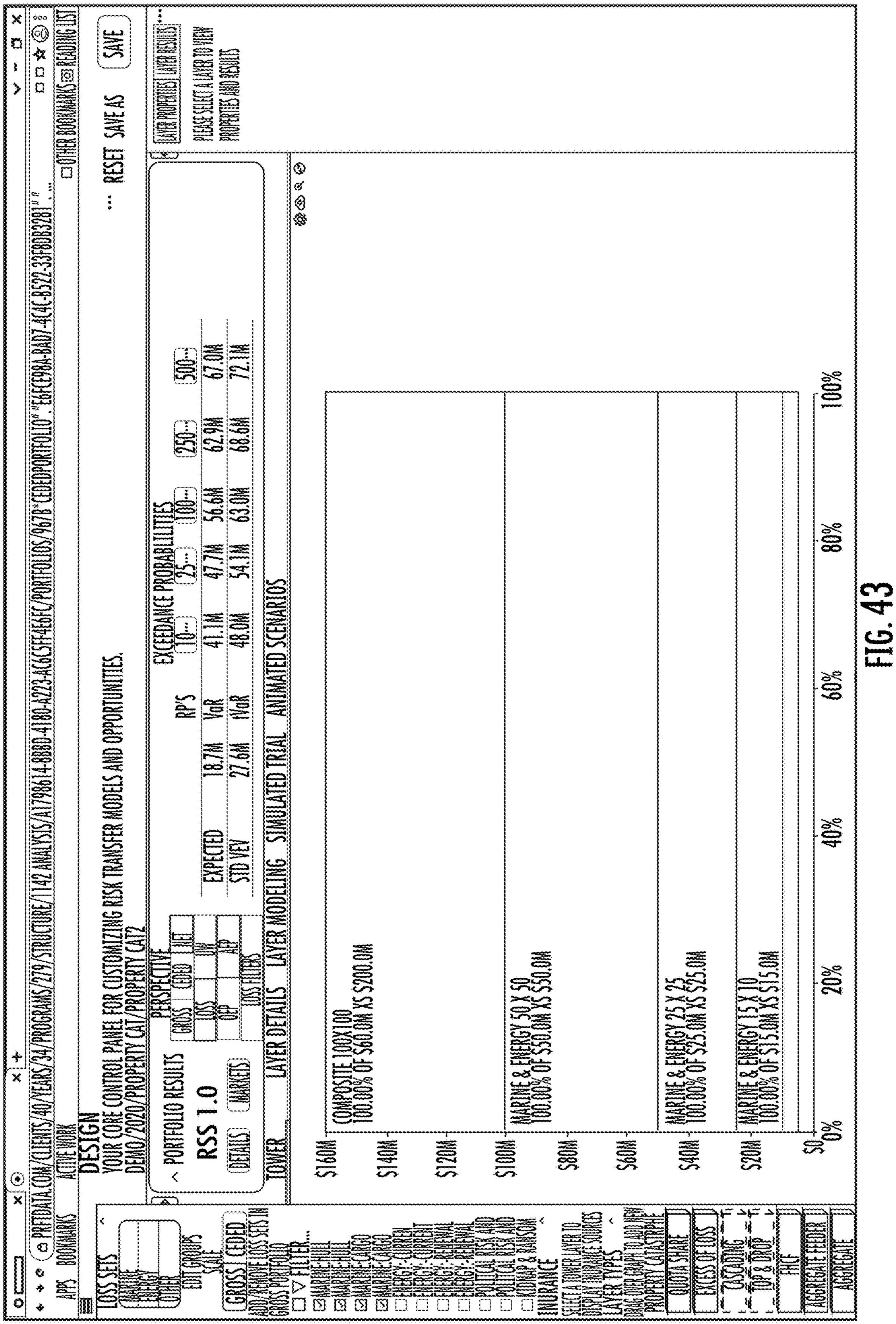
FIG. 43 shows a graphical user interface of a structure of reinsurance coverage having different types of insurance or other coverages for potential loss using the design features of the present disclosure.

FIG. 40 shows a distribution of modeled loss by type. A user can hover over the curve and select a portion under the curve as shown in FIG. 41 to evaluate the distribution of the modeled loss by loss type further.

Figure 44:
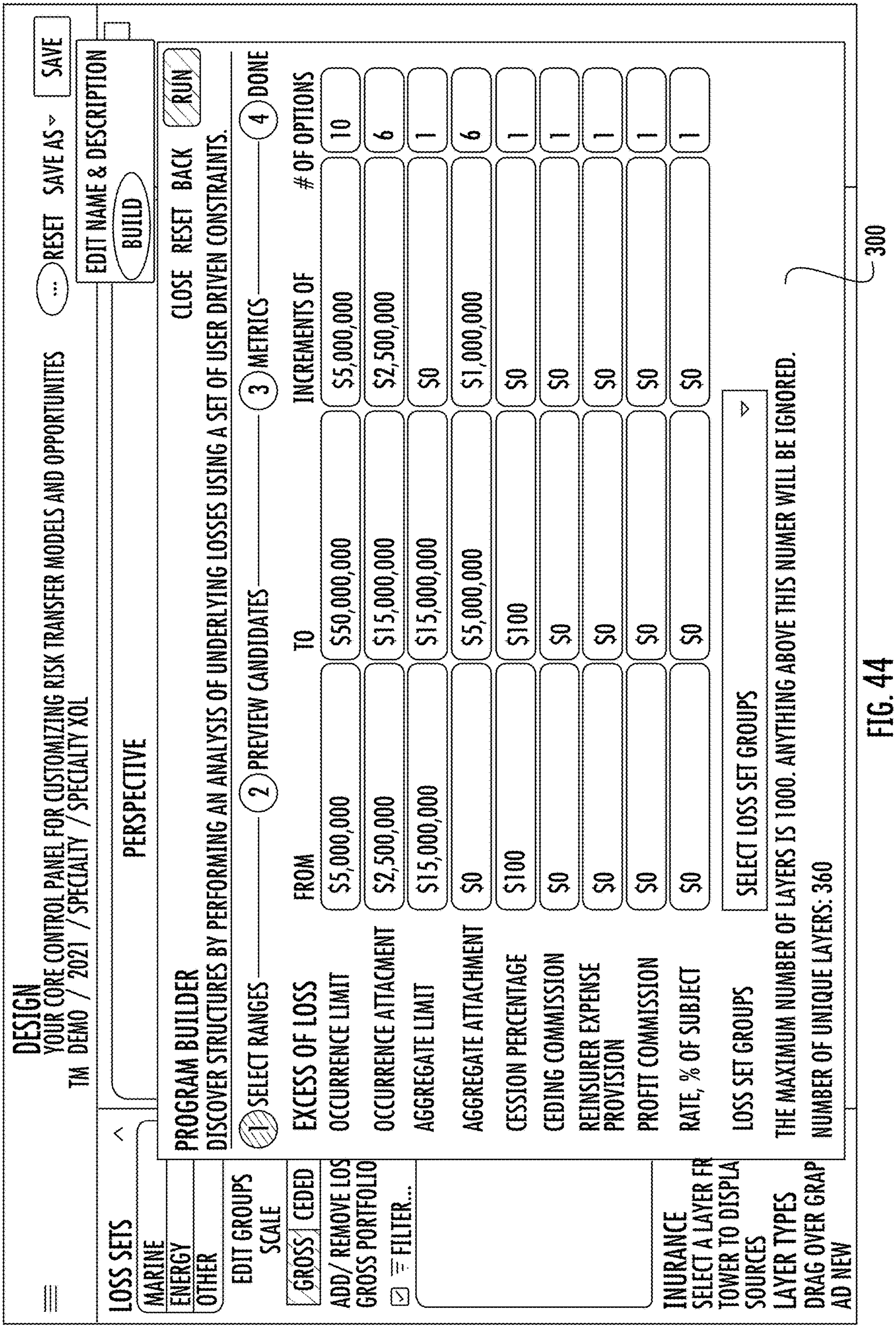
FIG. 44 is graphical user interface of the insurance program builder aspect of the present disclosure that displays user input fields for the selection of a range of various factors that can be used as variables selected by the user of the systems of the present disclosure to provide alternatives for consideration by the user based on the variables selected by the user and optionally also the metrics of the user input into the systems of the present disclosure using the user submitted metrics aspects to weight various factors and features of insurance/reinsurance potentially available/to be used.
Figure 45:
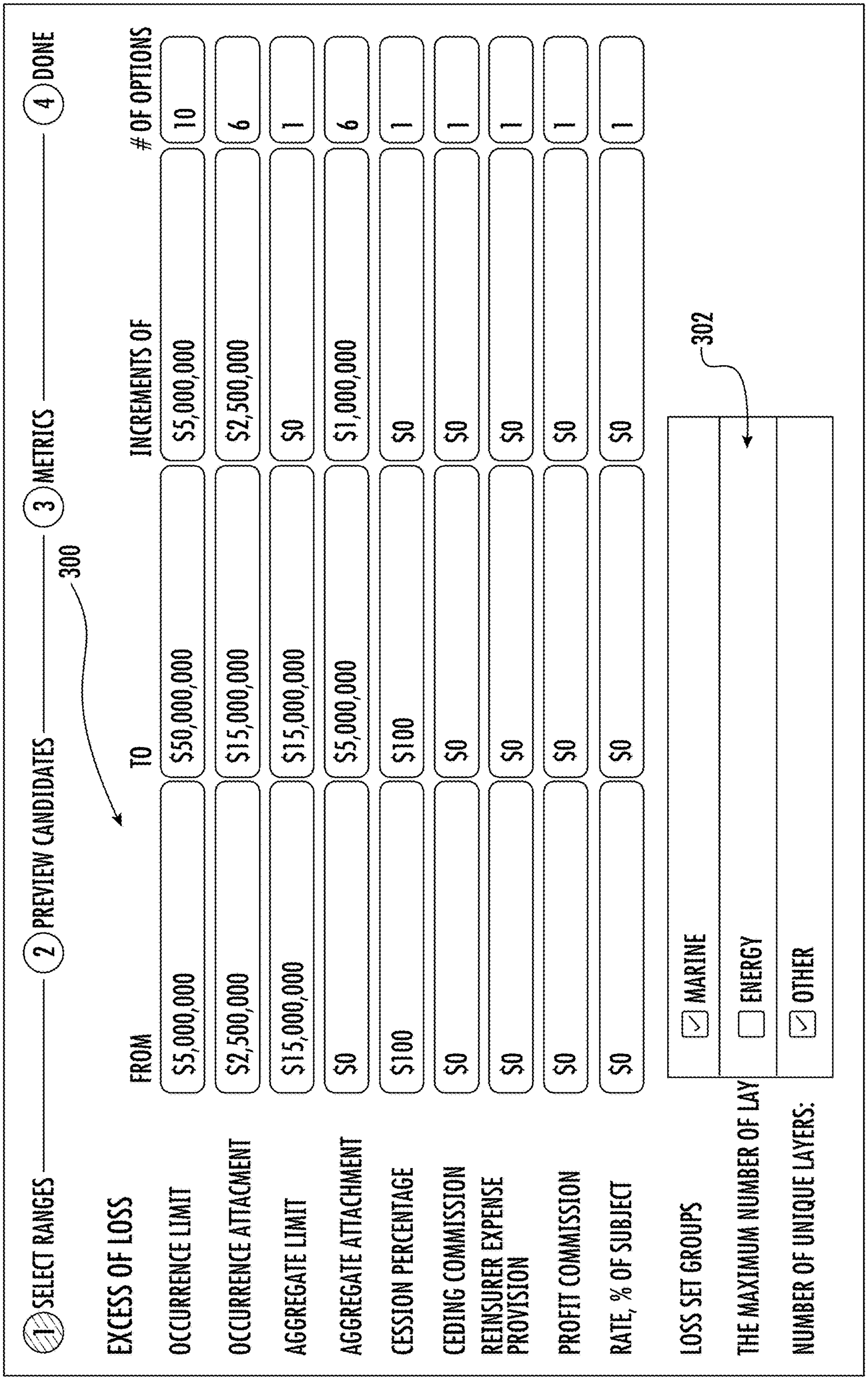
FIG. 45 is another view of the graphical user interface of the insurance program builder aspect of the present disclosure that displays user input fields for the selection of a range of various factors that can be used as variables selected by the user of the systems of the present disclosure and showing the dialogue box selection of the "Loss set groups" having an associated filter section user input field shown in the drawing as "marine," "energy," and "other" loss. Similar user input dialogue boxes may be used for the maximum number of layers permitted by the program builder module of the system of the present invention or a precise limit of the number of layers may be manual input into the input field.

FIGS. 43-47B show various exemplary displays of the program builder function of the systems of the present disclosure. The program builder takes a created insurance/reinsurance structure created in the design phase (see FIG. 43) and allows a user to select a given layer to review and evaluate various other alternative structures for a given layer based on various system created variations on the construct of the layer the user previously constructed. In this manner, the system can provide further statistical variabilities for the user to consider and evaluate. FIGS. 44-45 show the user data input screen 300 for the initial step in the program builder. The user inputs or changes the parameters for a level such as the "increments of" value, which then changes the "# of options" column automatically to correspond to the new user defined value entered. The user may also select or the system may set the maximum number of layer options it will present, which in the example shown is 1000. The system also displays the resultant number of additional unique layers it can create given the parameters set by the user for alternative possible layer presentations based on the data entered by the user. The user can also set the loss set group(s) the system will evaluate using the drop-down menu 302, which in the example shown in FIG. 45 is "marine" and "other".

Figure 46:
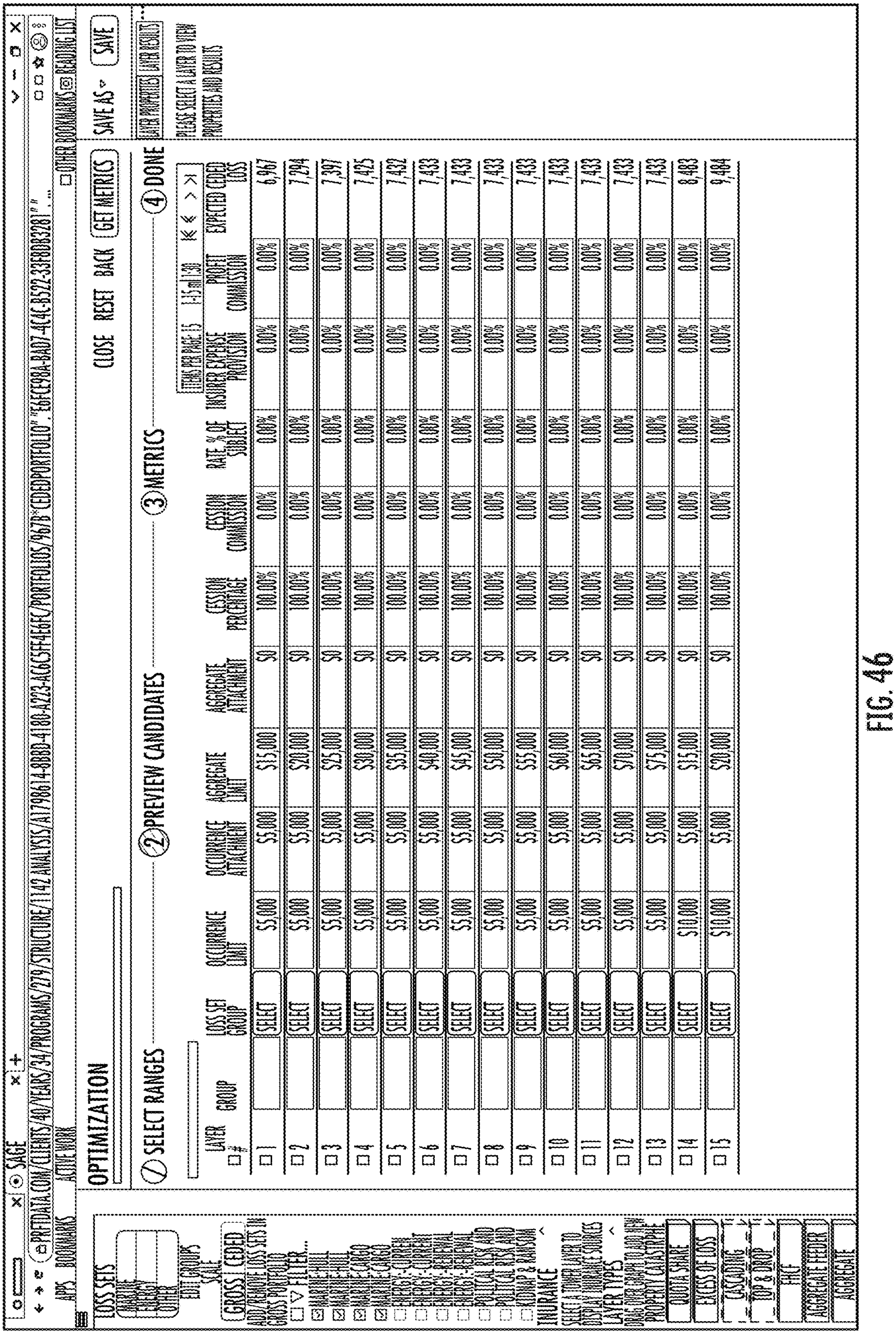
FIG. 46 shows the graphical user interface for the preview of candidates of the program builder based on the user input selected ranges.

Once the selected ranges for various parameters and the increments of the parameters are set, the system automatically runs and shows a preview listing of the resultant possible layer variants as shown in FIG. 46. Once those previewed variants are selected, the metrics for the selected variants for the user created layer of a given construct are displayed to the user. An example of such a graphical user interface display is shown in FIGS. 47A and 47B.

FIGS. 48A and 48B show the ability of the systems of the present disclosure to request and automatically transmit a request for quote to any of a variety of user selected markets electronically linked to the systems of the present disclosure without any further interaction from the user with other systems as discussed above. This avoids any incorrect data from being transmitted due to manual conversion or conversion from the present system to another third-party system by manual data entry.

What is claimed is:

1. A method of creating and visually displaying an overall insurance or reinsurance structure created by a user comprising the steps of:

animating application of an insurance or reinsurance coverage represented by an overall insurance or reinsurance structure displayed to a user wherein the overall insurance or reinsurance structure has a plurality of coverage layer types and also comprises at least one rectangular-shaped coverage structure layers comprising: (1) a first rectangular-shaped coverage structure layer; (2) optionally an optional second rectangular-shaped coverage structure layer; and (3) optionally, one or more additional rectangular-shaped coverage structure layer;

wherein the step of animating application of the insurance or reinsurance coverage represented by the overall insurance or reinsurance structure depicts whether each of the at least one rectangular-shaped coverage structure layers provide coverage of at least one user defined loss scenario by showing the at least one rectangular-shaped coverage structure layers that provide coverage for the at least one user defined loss scenario by changing a color of or filling from a bottom of the first rectangular-shaped coverage structure layer where coverage represented by each of the at least one rectangular-shaped coverage structure layers attaches and the changing a color or filling effect moves upward as the coverage provided by each of the at least one rectangular-shaped coverage structure layers are applied and until an amount of coverage covered by each of the at least one rectangular-shaped coverage structure layers for the at least one user defined loss scenario is no longer applicable or the amount of coverage for each of the at least one rectangular-shaped coverage structure layers has been exhausted; and wherein an overall insurance or reinsurance structure creation and analysis system uses data to create a graphical or pictorial insurance or reinsurance analysis and review display, the data comprising:

a fixed loss set of future probability of loss(es) based on historical insurable loss event data received from a ceding party; and separate historical event loss data from a second data source.

2. The method of claim 1, wherein the first rectangular-shaped coverage structure layer; the optional second rectangular-shaped coverage structure layer; and optionally the one or more additional rectangular-shaped coverage structure layer added subsequent to the optional second rectangular-shaped coverage structure layer that each correspond to one of the plurality of coverage layer types are each visually illustrated in real-time on an insurance or reinsurance visual design graphical user interface and form a proposed insurance or reinsurance construct;

wherein the first rectangular-shaped coverage structure layer, the optional second rectangular-shaped coverage structure layer, and the one or more additional rectangular-shaped coverage structure layer are each graphically displayed to the user as a hollow cuboid and are initially displayed to the user in an initial visual appearance corresponding to a time when coverage has not been applied to cover the at least one user defined loss scenario, and the hollow cuboid transitions into a final visual appearance corresponding to a time when coverage has been applied to cover the at least one user defined loss scenario; and wherein the step of animating the application of the insurance or reinsurance coverage represented by the at least one rectangular-shaped coverage structure layers to cover the at least one user defined loss scenario is done by showing the hollow cuboid filling from a bottom of the hollow cuboid where coverage attaches upward until an amount of coverage covered by the first rectangular-shaped coverage structure layer has been reached or no further coverage is needed.

3. The method of claim 1 further comprising the steps of using the overall insurance or reinsurance structure creation and analysis system to create the overall insurance or reinsurance structure wherein the overall insurance or reinsurance structure creation and analysis system comprises an insurance or reinsurance visual design graphical user interface displayed to the user on a display of a user computing device; wherein the insurance or reinsurance visual design graphical user interface comprises the plurality of coverage layer types visually illustrated on the insurance or reinsurance visual design graphical user interface outside of a graphical diagram;

selecting a first coverage layer type from the plurality of coverage layer types and moving the first coverage layer type from outside the graphical diagram onto the graphical diagram whereby the overall insurance or reinsurance structure creation and analysis system automatically forms the first rectangular-shaped coverage structure layer having boundaries positioned within the graphical diagram and having the boundaries associated with the first coverage layer type that automatically has initial data associated with the boundaries of the first rectangular-shaped coverage structure layer corresponding to a first rectangular-shaped coverage structure layer position within the graphical diagram;

optionally selecting a second coverage layer type from the plurality of coverage layer types and moving the second coverage layer type from outside the graphical diagram onto the graphical diagram whereby the overall insurance or reinsurance structure creation and analysis system automatically forms the optional second rectangular-shaped coverage structure layer having boundaries portioned within the graphical diagram and the optional second rectangular-shaped coverage structure layer has the boundaries associated with the second coverage layer type and automatically has initial data associated with the boundaries of the optional second rectangular-shaped coverage structure layer corresponding to a second rectangular-shaped coverage structure layer position within the graphical diagram;

wherein the first rectangular-shaped coverage structure layer; the optional second rectangular-shaped coverage structure layer; and optionally the one or more additional rectangular-shaped coverage structure layer added subsequent to the optional second rectangular-shaped coverage structure layer that each correspond to one of the plurality of coverage layer types are each visually illustrated in real-time on the insurance or reinsurance visual design graphical user interface and form a proposed insurance or reinsurance construct; and wherein the step of the user selecting a user selected coverage structure layer and the user selected coverage structure layer is chosen from the group consisting of: the first rectangular-shaped coverage structure layer, the optional second rectangular-shaped coverage structure layer, and the one or more additional rectangular-shaped coverage structure layer; and wherein the step of the user selecting the user selected coverage structure layer is done before or during the step of animating application and the overall insurance or reinsurance structure creation and analysis system automatically displays numerical data corresponding to the user selected coverage structure layer; and effects of the at least one user defined loss scenario are each based on historical insurable loss event data received from the ceding party and the separate historical event loss data from the second data source.

4. The method of claim 1, wherein the first rectangular-shaped coverage structure layer, the optional second rectangular-shaped coverage structure layer, and the one or more additional rectangular-shaped coverage structure layer are each graphically displayed to the user as an initial color corresponding to a time when coverage has not been applied to cover the at least one user defined loss scenario, and an initial color transitions into a different color than the initial color where the different color corresponds to a time when coverage has been applied to cover the at least one user defined loss scenario.

5. The method of claim 1 further comprising the step of animating comprises animating application of coverage represented by the at least one rectangular-shaped coverage structure layers to cover the at least one user defined loss scenario by showing a hollow cuboid filling from the bottom of the hollow cuboid upward until an amount of coverage covered by the first rectangular-shaped coverage structure layer has been reached.

6. The method of claim 3, wherein the plurality of coverage layer types is chosen from the coverage; and wherein the graphical diagram depicts a percentage of covered loss in a range of from 0% to 100% along an X-axis and a financial value of an insurable loss along a Y-axis wherein the X-axis the Y-axis are at 90 degrees from one another.

7. The method of claim 3 further comprising the step of:

creating an at least one user defined loss by the user selecting a defined loss link displayed on a design construction user interface, wherein the at least one user defined loss is defined by the user prior to the step of animating application, and wherein the at least one user defined loss is displayed on the insurance or reinsurance visual design graphical user interface proximate the graphical diagram.

8. The method of claim 7, wherein the at least one user defined loss comprises at least one property/casualty event and wherein the step of animating application begins when the user selects an animation activation link within the insurance or reinsurance visual design graphical user interface and activates the animation activation link and wherein the animation activation link is positioned proximate the proposed insurance or reinsurance construct or a plurality of proposed insurance or reinsurance constructs and wherein the animation activation link is also proximate a first property/casualty event depiction corresponding to a first property/casualty event of the at least one property/casualty event wherein the first property/casualty event depiction comprises a display of a currency value of the damage caused by the first property/casualty event and a descriptor of the first property/casualty event.

9. The method of claim 8 further comprising a step of recording an animation of the overall insurance or reinsurance structure by activation of a link to create a recording of the animation of the overall insurance or reinsurance structure; and wherein the step of creating the at least one user defined loss comprises creating a number of user defined loss scenarios by the user repeating the step of creating the at least one user defined loss a number of times corresponding to the number of user defined loss scenarios.

10. The method of claim 1, wherein the at least one user defined loss scenario is a plurality of property/casualty events and the at least one rectangular-shaped coverage structure layer is a plurality of rectangular-shaped coverage structure layers, and wherein one of the plurality of rectangular-shaped coverage structure layers corresponds to one of the plurality of property/casualty events without simultaneously corresponding to another one of the plurality of property/casualty events, and wherein the step of animating application of the insurance or reinsurance coverage represented by the overall insurance or reinsurance structure causes an insurance or reinsurance visual design graphical user interface displayed to the user on the display of a user computing device of the overall insurance or reinsurance structure creation and analysis system to display effects of the one of the plurality of property/casualty events on the one of the plurality of rectangular-shaped coverage structure layers.

11. The method of claim 1, wherein the overall insurance or reinsurance structure creation and analysis system separately displays and animates the application of a plurality of user defined loss scenarios to the same overall insurance or reinsurance structure created by the user.

12. A method of creating and visually displaying an overall insurance or reinsurance structure created by a user comprising the steps of:

using an overall insurance or reinsurance structure creation and analysis system to create the overall insurance or reinsurance structure wherein the overall insurance or reinsurance structure creation and analysis system comprises an insurance or reinsurance visual design graphical user interface displayed to a user on a display of a user computing device; wherein the insurance or reinsurance visual design graphical user interface comprises a plurality of coverage layer types visually illustrated on the insurance or reinsurance visual design graphical user interface outside of a graphical diagram; and animating the overall insurance or reinsurance structure having a first coverage structure layer by gradually changing a color of an increasing amount of the first coverage structure layer or depicting filling an increasing amount of the first coverage structure layer when it is originally depicted as hollow where the changing a color or filling effect depicts coverage provided by the first coverage structure layer until an amount of coverage covered by the first coverage structure layer for at least one user defined loss scenario is no longer applicable or the amount of coverage for the first coverage structure layer has been exhausted.

13. The method of claim 12 further comprises the step of selecting a first coverage layer type from the plurality of coverage layer types and moving the first coverage layer type from outside the graphical diagram onto the graphical diagram whereby the overall insurance or reinsurance structure creation and analysis system automatically forms a first coverage structure layer corresponding to the first coverage layer type and wherein the first coverage structure layer has boundaries positioned within the graphical diagram and automatically has initial data associated with the boundaries of the first coverage structure layer; and wherein the first coverage structure layer is a hollow cuboid, and the first coverage structure layer is depicted as a partially filled hollow cuboid or a filled hollow cuboid after the step of animating application of an insurance or reinsurance coverage represented by the overall insurance or reinsurance structure is completed.

14. The method of claim 12 further comprising the step of the user selecting the first coverage structure layer before or during the step of animating the overall insurance or reinsurance structure and the overall insurance or reinsurance structure creation and analysis system automatically displays numerical data corresponding to the first coverage structure layer in addition to the display of the gradually changing a color of an increasing amount of the first coverage structure layer or depicting filling an increasing amount of the first coverage structure layer.

15. The method of claim 12, wherein the plurality of coverage layer types is chosen from the coverage; and wherein the graphical diagram depicts a percentage of covered loss in a range of from 0% to 100% along an X-axis and a financial value of an insurable loss along a Y-axis wherein the X-axis and the Y-axis are at 90 degrees from one another.

16. A method of creating an animated trial for analyzing an overall insurance or reinsurance structure created by a user comprising the steps of:

providing an overall insurance or reinsurance structure creation and analysis system that comprises an insurance or reinsurance visual design graphical user interface displayed to a user on a display of a user computing device wherein the insurance or reinsurance visual design graphical user interface comprises a plurality of coverage layer types visually illustrated on the insurance or reinsurance visual design graphical user interface outside of a graphical diagram wherein the graphical diagram depicts a percentage of covered loss in a range along an X-axis and a financial value of an insurable loss along a Y-axis wherein the X-axis and the Y-axis are at 90 degrees from one another;

creating an overall insurance or reinsurance structure that comprises at least a first coverage structure layer within the graphical diagram by selecting a first coverage layer type from the plurality of coverage layer types and moving the first coverage layer type visually illustrated on the insurance or reinsurance visual design graphical user interface from outside the graphical diagram onto the graphical diagram thereby automatically forming the first coverage structure layer within the graphical diagram, and wherein the first coverage structure layer has initial data that is automatically associated with boundaries of the first coverage structure layer;

visually animating the overall insurance or reinsurance structure by gradually changing a visual appearance of the first coverage structure layer where the gradually changing visual appearance depicts coverage provided by the first coverage structure layer being applied to the first coverage structure layer until an amount of coverage covered by the first coverage structure layer is displayed for at least one user defined loss scenario or the amount of coverage for the first coverage structure layer has been exhausted for the at least one user defined loss scenario; and wherein the step of visually animating the overall insurance or reinsurance structure comprises gradually changing a color of an increasing amount of the first coverage structure layer or depicting filling an increasing amount of the first coverage structure layer when it is originally depicted as hollow where the changing a color or filling effect depicts the coverage provided by the first coverage structure layer until the amount of coverage covered by the first coverage structure layer is exhausted for the at least one user defined loss scenario.

17. The method of claim 16, wherein the first coverage structure layer is either (1) a rectangular-shaped coverage structure layer or (2) a cuboid shaped coverage structure layer.

18. The method of claim 17 further comprising the step of the user selecting the first coverage structure layer before or during the step of animating the overall insurance or reinsurance structure and the overall insurance or reinsurance structure creation and analysis system automatically displays numerical data corresponding to the first coverage structure layer in addition to the display of a gradually changing color of an increasing amount of the first coverage structure layer or depicting filling an increasing amount of the first coverage structure layer.

19. The method of claim 17, wherein the step of creating an overall insurance or reinsurance structure further comprises a second coverage structure layer that is created by the user selecting a second coverage layer type from the plurality of coverage layer types and moving the second coverage layer type visually illustrated on the insurance or reinsurance visual design graphical user interface from outside the graphical diagram onto the graphical diagram thereby automatically forming the second coverage structure layer within the graphical diagram, and wherein the second coverage structure layer has initial data that is automatically associated with boundaries of the second coverage structure layer.

20. The method of claim 19, wherein the first coverage structure layer is visually depicted on the graphical diagram as a cuboid and the second coverage structure layer is visually depicted on the graphical diagram as a cuboid;

wherein the step of visually animating the overall insurance or reinsurance structure by gradually changing the visual appearance of the first coverage structure layer utilizes:

an actuarial computation engine, application support database information;

at least one data management application programing interface that facilitates an automatic interaction and standardization of input data received from the group consisting of: (1) a ceding party data system; (2) a reinsurer data system; (3) a third-party market data system; and (4) any combination of data systems of 1-3 above; and a graphics rendering engine to display an effect of selected events on the overall insurance or reinsurance structure.

* * * * *